US007822539B2

(12) United States Patent
Akiyoshi et al.

(10) Patent No.: US 7,822,539 B2
(45) Date of Patent: Oct. 26, 2010

(54) GUIDE ROUTE SEARCH DEVICE AND GUIDE ROUTE SEARCH METHOD

(75) Inventors: Hiromi Akiyoshi, Machida (JP); Masaki Kaneda, Machida (JP); Masahiro Ueno, Tokyo (JP); Yuko Iwami, Kawasaki (JP); Youko Mabuchi, Hachiouji (JP)

(73) Assignee: Kabushiki Kaisha Kenwood, Hachiouji-shi, Tokyo (JP)

( * ) Notice: Subject to any disclaimer, the term of this patent is extended or adjusted under 35 U.S.C. 154(b) by 125 days.

(21) Appl. No.: 10/574,015

(22) PCT Filed: Sep. 30, 2004

(86) PCT No.: PCT/JP2004/014762

§ 371 (c)(1),
(2), (4) Date: Oct. 19, 2006

(87) PCT Pub. No.: WO2005/031263

PCT Pub. Date: Apr. 7, 2005

(65) Prior Publication Data

US 2008/0033633 A1   Feb. 7, 2008

(30) Foreign Application Priority Data

| Sep. 30, 2003 | (JP) | ............................. 2003-339797 |
| Feb. 17, 2004 | (JP) | ............................. 2004-039334 |
| Feb. 17, 2004 | (JP) | ............................. 2004-039337 |
| Feb. 17, 2004 | (JP) | ............................. 2004-039338 |
| Feb. 17, 2004 | (JP) | ............................. 2004-039340 |

(51) Int. Cl.
*G01C 21/00* (2006.01)

(52) U.S. Cl. ........................ 701/201; 701/202; 701/207; 701/209; 701/213; 340/989; 340/990; 340/995.19; 705/5; 705/6; 705/7; 705/8; 705/9; 455/456.1

(58) Field of Classification Search ................. 701/201, 701/210; 340/995, 989, 990; 705/5, 6, 9
See application file for complete search history.

(56) References Cited

U.S. PATENT DOCUMENTS

| 5,272,638 A | 12/1993 | Martin et al. |
| 6,049,754 A * | 4/2000 | Beaton et al. ................ 701/204 |
| 6,119,095 A * | 9/2000 | Morita ........................... 705/5 |
| 7,747,291 B2 * | 6/2010 | Himmelstein ............ 455/569.2 |
| 2001/0029429 A1 * | 10/2001 | Katayama et al. ........... 701/209 |
| 2002/0004700 A1 * | 1/2002 | Klein ........................... 701/200 |
| 2004/0260466 A1 | 12/2004 | Ichihara et al. |

FOREIGN PATENT DOCUMENTS

EP   0 795 835   9/1997

(Continued)

OTHER PUBLICATIONS

European Search Report (Application No. 04773640.0) dated Dec. 28, 2007.

(Continued)

*Primary Examiner*—Tuan C To
*Assistant Examiner*—Redhwan Mawari
(74) *Attorney, Agent, or Firm*—Eric J. Robinson; Robinson Intellectual Property Law Office, P.C.

(57) ABSTRACT

There are provided a guide route search device and a guide route search method for searching a guide route via a plurality of points as well as a computer program for realizing the method. A guide route satisfying the route point condition such as a stay time at each point is searched. According to another aspect of the invention, after searching a guide route, an operator can perform a correction such as addition, deletion, or modification of the route points or rearrangement of the arrival order at the points. It is possible to judge whether the guide route after the correction satisfies the route point condition. According to still another aspect of the invention, a guide route is superimposed together with the current position on the map image. The map color and/or brightness is changed according to the arrival time at a route point.

10 Claims, 55 Drawing Sheets

FOREIGN PATENT DOCUMENTS

| | | |
|---|---|---|
| EP | 1 106 968 | 6/2001 |
| EP | 1 467 182 | 10/2004 |
| JP | 08-005391 | 1/1996 |
| JP | 09-218643 | 8/1997 |
| JP | 11-094578 | 4/1999 |
| JP | 11-160086 | 6/1999 |
| JP | 11-201766 | 7/1999 |
| JP | 11-211486 | 8/1999 |
| JP | 11-271067 | 10/1999 |
| JP | 2000-011047 | 1/2000 |
| JP | 2000-346667 | 12/2000 |
| JP | 2001-147130 | 5/2001 |
| JP | 2002-123519 | 4/2002 |
| JP | 2002-149763 | 5/2002 |
| JP | 2002-168632 | 6/2002 |
| JP | 2002-181573 | 6/2002 |
| JP | 2003-185455 | 7/2003 |
| JP | 2004-309368 | 11/2004 |
| JP | 2005-069857 | 3/2005 |

OTHER PUBLICATIONS

Office Action (Japanese Patent Application No. 2004-039334) dated May 29, 2008.
Office Action (Japanese Patent Application No. 2004-039337) dated May 29, 2008.
Office Action (Japanese Patent Application No. 2004-039338) dated May 29, 2008.
Office Action (Japanese Patent Application No. 2004-039340) dated May 29, 2008.
Office Action (Application No. 2004-039334) dated Jul. 14, 2009.
Office Action (Application No. 2004-039338) dated Jul. 14, 2009.
Office Action (Application No. 2004-039337) Dated Jul. 14, 2009.
International Search Report of Nov. 22, 2004 for PCT/JP2004/014762.
Office Action (Application No. 2004-039340) dated July 14, 2009.

* cited by examiner

| | NAME | GENRE | HOLIDAY | BUSINESS HOUR |
|---|---|---|---|---|
| A | ○△ HOTEL | HOTEL | NONE | |
| B | RESTAURANT ○ ■ | RESTAURANT | MONDAY | 11:00 – 14:00, 18:00 – 24:00 |
| C | ○○ DEPARTMENT STORE | DEPARTMENT STORE | WEDNESDAY | 10:00 – 20:00 |
| D | □○ CAFE | CAFE | NONE | 8:00 – 22:00 |
| E | □ TUMULUS | FAMOUS PLACE | MONDAY | 10:00 – 18:00 |
| F | RISTORANTE △ | RESTAURANT | THURSDAY | 18:00 – 21:00 |

FIG. 4

| GENRE NAME | GUIDE TIME | STAY TIME | STAYABLE TIME | FINAL DESTINATION ADVISABILITY | TIME ADJUSTMENT ADVISABILITY | FOOD AND DRINK GENRE |
|---|---|---|---|---|---|---|
| HOTEL | 15:00 – 24:00 | TWO HOURS | TWO HOURS AND THIRTY MINUTES | ○ | ○ | × |
| RESTAURANT | 11:00 – 13:00  18:00 – 20:00 | ONE HOUR | | × | ○ | ○ |
| CURRY HOUSE | 11:00 – 13:00  18:00 – 20:00 | THIRTY MINUTES | | × | × | ○ |
| CONVENIENCE STORE | | TEN MINUTES | | × | × | × |
| FAMOUS PLACE | | ONE HOUR | | × | ○ | × |
| DEPARTMENT STORE | | ONE HOUR | TWO HOURS | × | ○ | × |
| CAFE | 8:00 – 11:00  15:00 – 18:00 | THIRTY MINUTES | ONE HOUR | × | ○ | ○ |
| BOOK STORE | | | | × | ○ | × |
| OIL DEPOT | | | | × | ○ | × |
| BANK | | | | × | × | × |

ARRIVAL TIME

| | ROUTE PATTERN | A | B | C | D | E |
|---|---|---|---|---|---|---|
| 1 | B→C→D→E→A | 18:00 | 10:30 | 12:00 | 14:00 | 15:00 |
| 2 | B→C→E→D→A | 18:15 | 10:30 | 12:00 | 17:10 | 14:10 |
| 3 | C→B→E→D→A | 19:00 | 12:30 | 11:00 | 17:55 | 14:55 |
| ⋮ | ⋮ | ⋮ | ⋮ | ⋮ | ⋮ | ⋮ |
| N | | | | | | |

ARRIVAL TIME

| | ROUTE PATTERN | A | B | C | D | E |
|---|---|---|---|---|---|---|
| 1 | B→C→D→E→A | 19:00 | 11:00 | 12:30 | 15:00 | 16:00 |
| 2 | B→C→E→D→A | 18:45 | 11:00 | 12:30 | 17:40 | 14:40 |
| 3 | C→B→E→D→A | 19:00 | 12:30 | 11:00 | 17:55 | 14:55 |
| ⋮ | ⋮ | ⋮ | ⋮ | ⋮ | ⋮ | ⋮ |
| N | | | | | | |

| | NAME | CONDITION | | | | SPOT INFORMATION |
|---|---|---|---|---|---|---|
| | | GENRE | DESTINATION | GUIDE TIME | STAY TIME | |
| A | SEA PARADISE | AMUSEMENT | ○ | 10:00 – 22:00 | – | |
| B | BAY SIDE MARINA | SHOP | × | 11:00 – 21:00 | THREE HOURS | |
| | | RESTAURANT | × | 11:00 – 13:00<br>18:00 – 21:00 | ONE HOUR | |
| C | YAMASHITA PARK | FAMOUS PLACE | × | – | ONE HOUR | |
| D | ART MUSEUM | FACILITY | × | 10:00 – 17:00 | THIRTY MINUTES | |
| E | CHINESE NOODLES RESTAURANT | RESTAURANT/FAMOUS PLACE | × | 11:00 – 23:00 | TWO HOURS | |

FIG. 15

| | ROUTE PATTERN | A | B | C | D | E | HOME |
|---|---|---|---|---|---|---|---|
| 1 | E→D→C→B→A→(HOME) | 18:30 | 15:00 | 14:30 | 13:30 | 11:00 | 22:00 |
| 2 | B→E→C→D→A→(HOME) | 18:10 | 10:50 | 15:20 | 16:10 | 14:10 | 22:10 |
| 3 | E→D→C→A→B→(HOME) | 15:30 | 17:50 | 14:20 | 13:30 | 10:50 | 20:50 |

FIG. 17

| | ROUTE PLAN | | A | | B | | C | D | | E | | HOME |
|---|---|---|---|---|---|---|---|---|---|---|---|---|
| 1 | E→D→C→B→A→(HOME) | ○ | 18:30 | ○ | 15:00 | ○ | 14:30 | 13:30 | ○ | 11:00 | ○ | 22:00 | ○ |
| 2 | B→E→C→D→A→(HOME) | △ | 18:10 | ○ | 10:50 | × | 15:20 | 16:10 | ○ | 14:10 | ○ | 22:10 | ○ |
| 3 | E→D→C→A→B→(HOME) | × | 15:30 | ○ | 17:50 | × | 14:20 | 13:30 | ○ | 10:50 | × | 20:50 | ○ |

| | NAME C21 | GENRE C22 | DESTINATION C23 | GUIDE TIME ZONE C24 | POINT C25 |
|---|---|---|---|---|---|
| A | ○△ HOTEL | HOTEL | ○ | 15:00 – | 1234 |
| B | RESTAURANT ○ ■ | RESTAURANT | × | 11:00 – 13:00, 18:00 – 21:00 | 4587 |
| C | ○○ DEPARTMENT STORE | DEPARTMENT STORE | × | | 1223 |
| D | □○ CAFE | CAFE | × | 8:00 – 11:00, 15:00 – 19:00 | 1446 |
| E | □ ■ CASTLE | FAMOUS PLACE | | | 4683 |
| F | RISTORANTE △ | RESTAURANT | | 11:00 – 13:00, 18:00 – 21:00 | 1597 |

| GENRE | STAY TIME | | | | | | | | | | | | |
|---|---|---|---|---|---|---|---|---|---|---|---|---|---|
| | INITIAL VALUE | ONE | TWO | | | THREE TO FOUR | | | | | FIVE TO EIGHT | | NINE OR MORE | |
| | | | LOVER | MARRIED COUPLE | WITH CHILDREN | FAMILY | | | WITH NEIGH-BORS | WITH FRIENDS | FAMILY | WITH FRIENDS | FAMILY | WITH FRIENDS |
| | | | | | | FAMILY | WITH GRANDFATHER AND GRANDMOTHER | WITH RELATION | | | | | | |
| HOTEL | EIGHTEEN HOURS | THIRTEEN HOURS | | | TWELVE HOURS | TWELVE HOURS | FIFTEEN HOURS | THIRTEEN HOURS | | | | | | |
| RESTAURANT | ONE HOUR | FORTY AND FIVE MINUTES | ONE AND HALF HOURS | | ONE AND HALF HOURS | ONE AND HALF HOURS | TWO HOURS | TWO HOURS | TWO HOURS | ONE AND HALF HOURS | TWO HOURS | TWO HOURS | TWO HOURS | TWO HOURS |
| DEPARTMENT STORE | ONE HOUR | TWO HOURS | THREE HOURS | TWO HOURS | FOUR HOURS | FOUR HOURS | FIVE HOURS | TWO HOURS | FIVE HOURS | SIX HOURS | SIX HOURS | SIX HOURS | SIX HOURS | SIX HOURS |
| CAFE | THIRTY MINUTES | THIRTY MINUTES | ONE HOUR | | ONE HOUR | ONE AND HALF HOURS | ONE HOUR | ONE HOUR | TWO HOURS | ONE HOUR | ONE AND HALF HOURS | ONE AND HALF HOURS | ONE AND HALF HOURS | ONE AND HALF HOURS |
| FAMOUS PLACE | TWO HOURS | | | | THREE HOURS | THREE HOURS | ONE HOUR | | ONE HOUR | | THREE HOURS | FOUR HOURS | THREE HOURS | FOUR HOURS |

|   | ROUTE PATTERN | A | B | C | D | E |
|---|---|---|---|---|---|---|
|   | (C61) | (C62) | (C62) | (C62) | (C62) | (C62) |
| 1 | B→C→D→E→A | 18:00 | 10:30 | 12:00 | 14:00 | 15:00 |
| 2 | B→C→E→D→A | 18:15 | 10:30 | 12:00 | 17:10 | 14:10 |
| 3 | C→B→E→D→A | 19:00 | 12:30 | 11:00 | 17:55 | 14:55 |

D15

| GENRE | STAY TIME |
|---|---|
| HOTEL | EIGHTEEN HOURS |
| RESTAURANT | ONE HOUR |
| DEPARTMENT STORE | ONE HOUR |
| CAFE | THIRTY MINUTES |
| FAMOUS PLACE | TWO HOURS |

FIG. 46
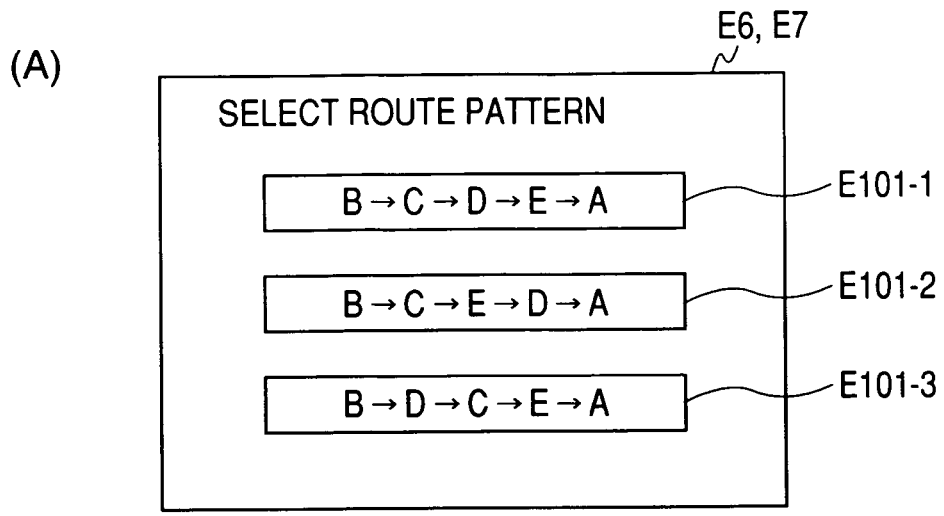
(A)
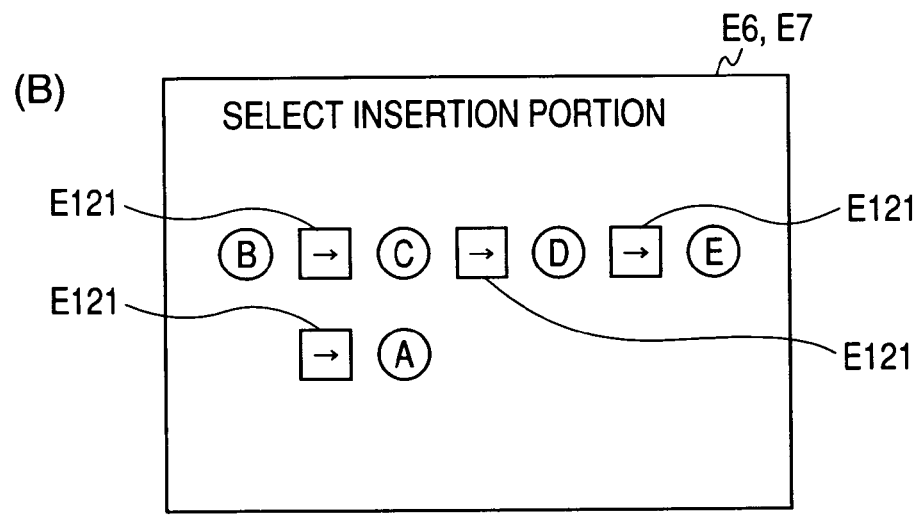
(B)
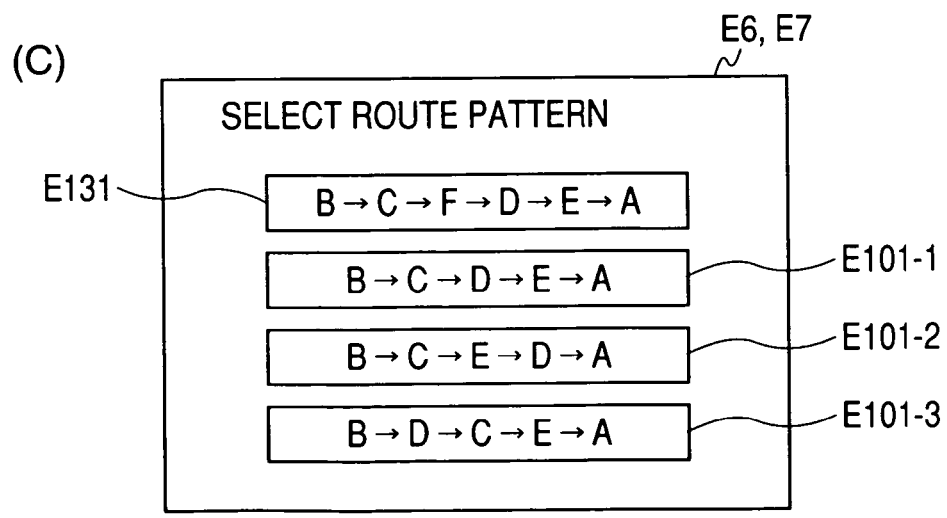
(C)

GUIDE ROUTE SEARCH DEVICE AND GUIDE ROUTE SEARCH METHOD

TECHNICAL FIELD

The present invention relates to a guide route search device, a navigation device, and a guide route search method for searching for a guide route via plural route points.

A route search method of searching for a guide route via plural route points is disclosed in Japanese Patent Application Laid-Open No. 2001-221647 (Patent Document 1). In the conventional route search method disclosed in this Patent Document 1, a passing order of the plural route points is determined on the basis of a search condition set for searching for a route and a dependency relation among specific route points. A route leading to a destination passing through the plural route points in the passing order is searched. This Patent Document 1 discloses an example in which the search condition set for searching for a route is selected out of time (shortness of a required time), a distance (shortness of a traveling distance), and a toll (lowness of a toll).

However, if a user actually moves in accordance with a guide route searched using the conventional route search method disclosed in this Patent Document 1, for example, even when the user desires to have lunch at a restaurant, the user cannot arrive at the restaurant at a desired time or cannot search a sufficient time to have a meal even if the user arrives at the restaurant in some cases.

The invention has been devised in view of such a problem and it is a first object of the invention to obtain a guide route search device, a navigation device, and a guide route search method for finding a guide route via plural route points such that a user can arrive at the respective route points in a desired state.

In the conventional route search method of the Patent Document 1, information such as traffic jams, traffic control, and weather conditions in VICS information to calculate moving cost for respective passing orders at a route point list on the basis of a search condition and the moving cost calculated is added to the route point list.

The conventional route search method disclosed in the Patent Document 1 is a method of searching for a route going around plural route points. Thus, when a user actually moves in accordance with a guide route by this conventional route search method, for example, because the user consumes a long time at a route point where the user arrives earlier, the user cannot arrive at a restaurant that is the next route point or cannot secure a sufficient time to have a meal even if the user can arrive at the restaurant late. Eventually, it is likely that the user fails to have lunch.

Moreover, a traffic jam may occur on a route at the time when the user actually heads for the respective route points. If a traffic jam occurs on a route in this way, it is likely that the user runs short of time and, eventually, cannot go around all the desired route points.

Furthermore, a stay time at such respective route points significantly changes depending on the number of people actually visiting the route points, a type of passengers (e.g., a lover, a family member, a friend), or the like. Thus, the problem is serious. For example, even when the same person visits the same restaurant, a stay time at the time when the person visits the restaurant with his/her child and a stay time at the time when the person visits the restaurant alone are different.

The invention has been devised in view of such a problem and it is a second object of the invention to obtain a guide route search device, a navigation device, and a guide route search method for finding a guide route via plural route points such that a user can stay at respective route points in a desired state.

In Japanese Patent Application Laid-Open No. Hei 11-160086 (Patent Document 2), there is a description that a route search processing unit searches for a predetermined traveling route connecting a start point and a destination on the basis of map data stored in a map buffer. A guide route rendering unit displays a halfway passage estimated time for each predetermined time along a traveling route set by the route search processing unit and displays a route for traveling in the daytime and a route for traveling at night with different colors.

In this Patent Document 2, a guide route is displayed with different colors for the daytime and the night. However, simply by switching a display color for the guide route, it is not easy for a user to understand what is indicated because display of the guide route is linear and thin. In addition, when the user checks the guide route before route guide, that is, before departure, it is difficult to intuitively check in what kind of state respective points on the guide route are at the time when the user arrives at the points.

The invention has been devised in view of such a problem and it is a third object of the invention to obtain a guide route simulation display device, a navigation device, and a guide route simulation display method with which a user is capable of intuitively checking, in checking a guide route before route guide, that is, before departure, in what kinds of states respective points on the guide route are at the time when the user arrives at the points.

Moreover, when the user actually moves in accordance with a guide route searched using the conventional route search method described above, it is likely that the user is guided to a route point at ineligible timing, for example, at time when a facility at the route point is not open. In other words, even if the user desires to have lunch at a restaurant, the user cannot arrive at the restaurant at a desired time or cannot secure a sufficient time to have a meal even if the user arrives at the restaurant in some cases.

The invention has been devised in view of such a problem and it is a fourth object of the invention to obtain a guide route search device, a navigation device, and a guide route search method for finding a guide route to reach a destination via one or plural route points desired by a user while the user visits route points desired by the user at appropriate timing.

DISCLOSURE OF THE INVENTION

In order to attain the objects of the invention, in a first aspect of the invention, a guide route search device basically includes: designating means for designating at least two or more destinations; creating means for creating plural route patterns in which orders of visit to the plural destinations are different from one another; and judging means for judging whether the plural route patterns are route patterns, route patterns are route patterns that satisfy destination conditions in all the destinations.

The guide route search device in the first aspect of the invention further includes selecting means for selecting a guide pattern that satisfies the destination conditions in all the destinations as a guide route.

The guide route search device further includes: adjusting means for performing, for route patterns judged as not satisfying the destination conditions at least at one destination by the judging means, adjustment of a non-traveling time such that the route patterns satisfy the destination conditions in all the destinations; and selecting means for selecting a specific route pattern out of the route patterns judged as satisfying the destination conditions in all the destinations by the judging means and the route patterns updated by the adjusting means.

The guide route search device further includes: updating means for updating, for route patterns judged as not satisfying the destination conditions at least at one destination by the judging means, the route patterns such that the route patterns satisfy the destination conditions in all the destinations; and selecting means for selecting a specific route pattern out of the route patterns judged as satisfying the destination conditions in all the destinations by the judging means and the route patterns updated by the updating means.

The guide route search device further includes: updating means for updating, for route patterns judged as not satisfying the destination conditions at least at one destination by the judging means, the route patterns such that the route patterns satisfy the destination conditions in all the destinations; and means for displaying at least two route patterns out of the route patterns judged as satisfying the destination conditions in all the destinations by the judging means and the route patterns updated by the updating means.

The guide route search device further includes route pattern editing means for executing, for route patterns in which destinations are judged as satisfying the destination conditions by the judging means, any one of addition of destinations, deletion of destinations, change of destinations, and rearrangement of destinations as correction of the route patterns and causing the judging means to judge whether destinations in the route patterns after the correction satisfy the destination conditions.

The guide route search device further includes: display means for superimposing the guide route selected by the selecting means on a map image together with an image indicating a location of the guide route search device itself before route guide; moving means for moving the image indicating a location of the guide route search device itself along the guide route; time calculating means for calculating an arrival time at a location of the image moved by the moving means; and updating means for changing a color and/or brightness of the map image according to the arrival time calculated.

In the guide route search device, the judging means operates to judge whether route patterns are route patterns that satisfy the destination conditions in all the destinations on the basis of destination conditions for each genre of the destinations.

In the guide route search device, preferably, the judging means includes destination condition updating means for updating, when the destination for each genre is not in a business hour of the destination, updating the destination conditions for each genre such that the destination conditions for each genre are in a business hour of the route point.

In the guide route search device, preferably, the selecting means operates to judge whether route points of identical or similar genres continue in the route pattern and, when destinations of identical or similar genres do not continue, select the route pattern as the guide route.

In the guide route search device, preferably, the route pattern editing means operates to insert, in the case in which a new destination is inserted in a certain insertion place in route patterns in which destinations are judged as satisfying the destination conditions by the judging means, when it is judged by the judging means that destinations in the route patterns after correction do not satisfy the destination conditions, the new destination in another insertion place on the guide route.

In the guide route search device, preferably, when the route pattern editing means executes addition of a destination, a new destination is inserted in each of plural insertion places, in which a destination can be inserted, on route patterns in which destinations are judged as satisfying the destination conditions by the judging means to create plural route patterns and the judging means is caused to judge whether destinations satisfy the destination conditions for each of the plural route patterns created.

In a second aspect of the invention, there is provided a guide route search device including: designating means for designating at least two or more destinations; creating means for creating plural route patterns in which orders of visiting the plural destinations are different from one another; and display means for displaying at least two route patterns among the plural route patterns created by the creating means.

In a third aspect of the invention, there is provided a guide route search device basically including: designating means for designating at least two or more destinations; means for designating a stay time in each of the plural destinations; creating means for creating route patterns including visiting order information and guide time information of the plural destinations taking into account the stay time designated in each of the destinations; and route pattern selecting means for setting one of the route patterns created by the creating means as a guide route.

In the guide route search device according to the third aspect of the invention, the means for designating a stay time includes means for selecting one stay time data out of plural stay time data at the destination and the stay time in each of the destinations is taken into account on the basis of the stay time data selected.

In the guide route search device, the means for designating a stay time includes stay time learning means for setting and/or updating the stay time data for each of the destinations on the basis of an actual stay time at the destination and the stay time is taken into account on the basis of the stay time data in each of the destinations.

In the guide route search device, preferably, the stay time selecting means operates to select optimum one stay time data out of plural stay time data provided for each driver, each male or female, each fellow passenger group, each age, each season, each day of week, each time frame, or each number of people and/or passenger type of people guided on the guide route.

In another viewpoint, it is possible to grasp the invention as a guide route search method including a series of signal processing steps carried out in the guide route search device described above.

In this case, in the first aspect, the invention provides a guide route search method including: a step of designating at least two or more destinations; a step of creating plural route patterns in which orders of visiting the plural destinations are different from one another; and a step of judging whether the plural route patterns are route patterns, route patterns are route patterns that satisfy destination conditions in all the destinations.

In the second aspect, there is provided a guide route search method including: a step of designating at least two or more destinations; a step of creating plural route patterns in which orders of visiting the plural destinations are different from one another; and a step of displaying at least two route patterns among the plural route patterns created in the creating step.

In the third aspect, there is provided a guide route search method including: a step of designating at least two or more destinations; a step of designating a stay time in each of the destinations; a step of creating route patterns including visiting order information and guide time information of the plural destinations taking into account the stay time designated in each of the destinations; and a step of selecting one of the route patterns created in the creating step as a guide route.

In still another viewpoint, it is possible to grasp the invention as a computer program for causing the guide route search device described above to operate.

In this case, for example, in the first aspect of the invention, there is provided a computer program for causing a guide route search method to operate, the guide route search method including: a step of designating at least two or more destinations; a step of creating plural route patterns in which orders of visiting the plural destinations are different from one another; and a step of judging whether the plural route patterns are route patterns, route patterns are route patterns that satisfy destination conditions in all the destinations. In the other aspects of the invention, there is also provided a computer program for causing a predetermined guide route search method to operate in the same manner.

BRIEF DESCRIPTION OF THE DRAWINGS

FIG. 3 shows a part of a data structure of a proposed route point database in FIG. 2;

FIG. 4 shows a part of a data structure of a route point condition table for genre in FIG. 2;

FIG. 5 shows an example of a route pattern list created by a route pattern alignment unit in FIG. 2;

FIG. 7 shows a route pattern list updated by update processing of a route pattern update unit in FIG. 6;

FIG. 14 is a table showing a data structure of a proposed route point database in FIG. 13;

FIG. 15 is a table showing a part of plural route patterns created by a route pattern creation unit when five proposed route points indicated by A to E in FIG. 14 and a home are registered at a route point list;

FIG. 17 is a table showing a judgment result for plural route patterns in FIG. 16;

FIG. 26 is a diagram for explaining an example of a proposed route point search data;

FIG. 27 is a diagram for explaining an example of a route point condition table for genre;

FIG. 31 is a table showing an example of plural route patterns created by a route pattern creation unit in FIG. 28;

FIG. 46 is a diagram showing an example of display by a display unit at the time when a route point is added to a route pattern usable as guide route data in the first embodiment of the invention IV;

EMBODIMENTS THE INVENTION

Embodiments of the invention will be hereinafter explained in detail with reference to the drawings.

The invention is roughly classified into four inventions (inventions I, II, III, and IV) according to objects thereof. The invention I attains the first object of the invention. The invention II, the invention III, and the invention IV mainly attain the second object, the third object, and the fourth object, respectively.

Concerning each of the inventions I, II, III, and IV, embodiments thereof will be hereinafter explained in order.

Guide route search devices, navigation device, and guide route search methods according to the embodiments of the invention will be specifically explained on the basis of the drawings. The navigation devices will be explained with vehicle-mounted navigation devices mounted on vehicles such as automobiles, motorcycles, and airplanes as examples. The guide route search devices will be explained as a part of constitutions of the vehicle-mounted navigation devices. The guide route search methods will be explained as a part of operations of the vehicle-mounted navigation devices.

[Invention I]

First Embodiment

Figure 1:
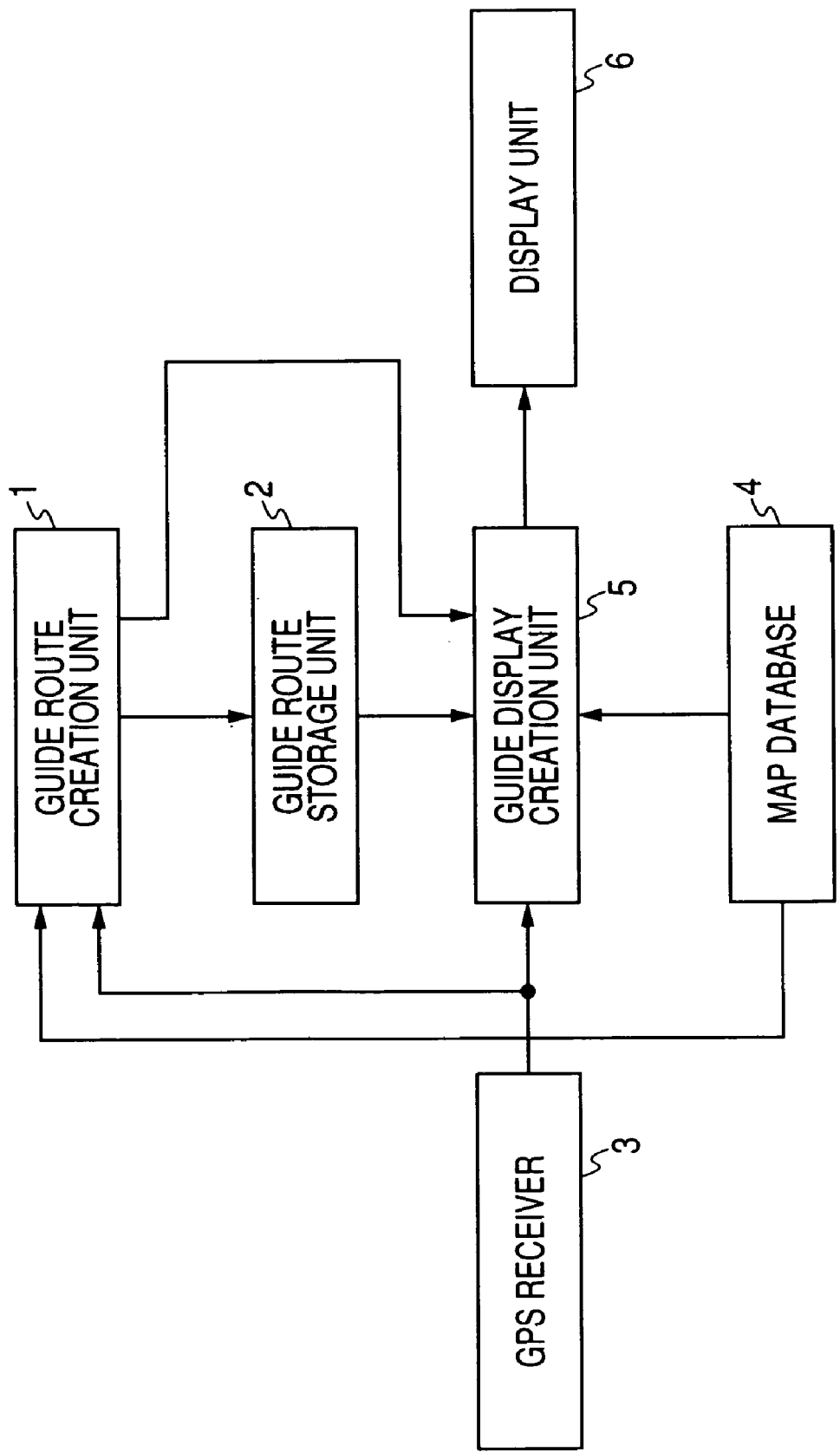
FIG. 1 is a block diagram showing a constitution of a navigation device according to a first embodiment of the invention I.

FIG. 1 is a block diagram showing a block constitution of a navigation device according to a first embodiment of the invention I. The navigation device includes a guide route creation unit 1 serving as a guide route search device that creates guide route data, a guide route storage unit 2 serving as guide route storing means for storing guide route data, a GPS (Global Positioning System) receiver 3, a map database 4, a guide display creation unit 5 serving as guide data creating means for creating display data for route guide, and a display unit 6 serving as output means for displaying display data, that is, photographs, figures, characters, and the like for guide.

The GPS receiver 3 is a receiver that receives radio waves of location information from satellites not shown in the figure. The GPS receiver 3 receives radio waves of location information from, for example, four or more satellites to output latitude and longitude data indicating a location on the earth of the GPS receiver 3.

The map database 4 has stored therein map information concerning a predetermined region on the earth such as the entire Japan or the Kanto district. Specifically, the map database 4 includes display map data in which natural features, roads, structures, and the like in the predetermined region on the earth are imaged, latitude and longitude data for specifying an arbitrary location in the predetermined region on the earth, and road search data in the predetermined region on the earth.

The road search data includes, for example, road attribute data indicating each road between intersections and intersection data indicating intersections. In the road attribute data, moving time data of the road is included together with distance data of the road. Consequently, roads in the region are stored in the road search data as mesh-like data formed by the road attribute data and the intersection data. Plural moving time data corresponding to, for example, seasons and time zones may be included in the road attribute data.

Figure 2:
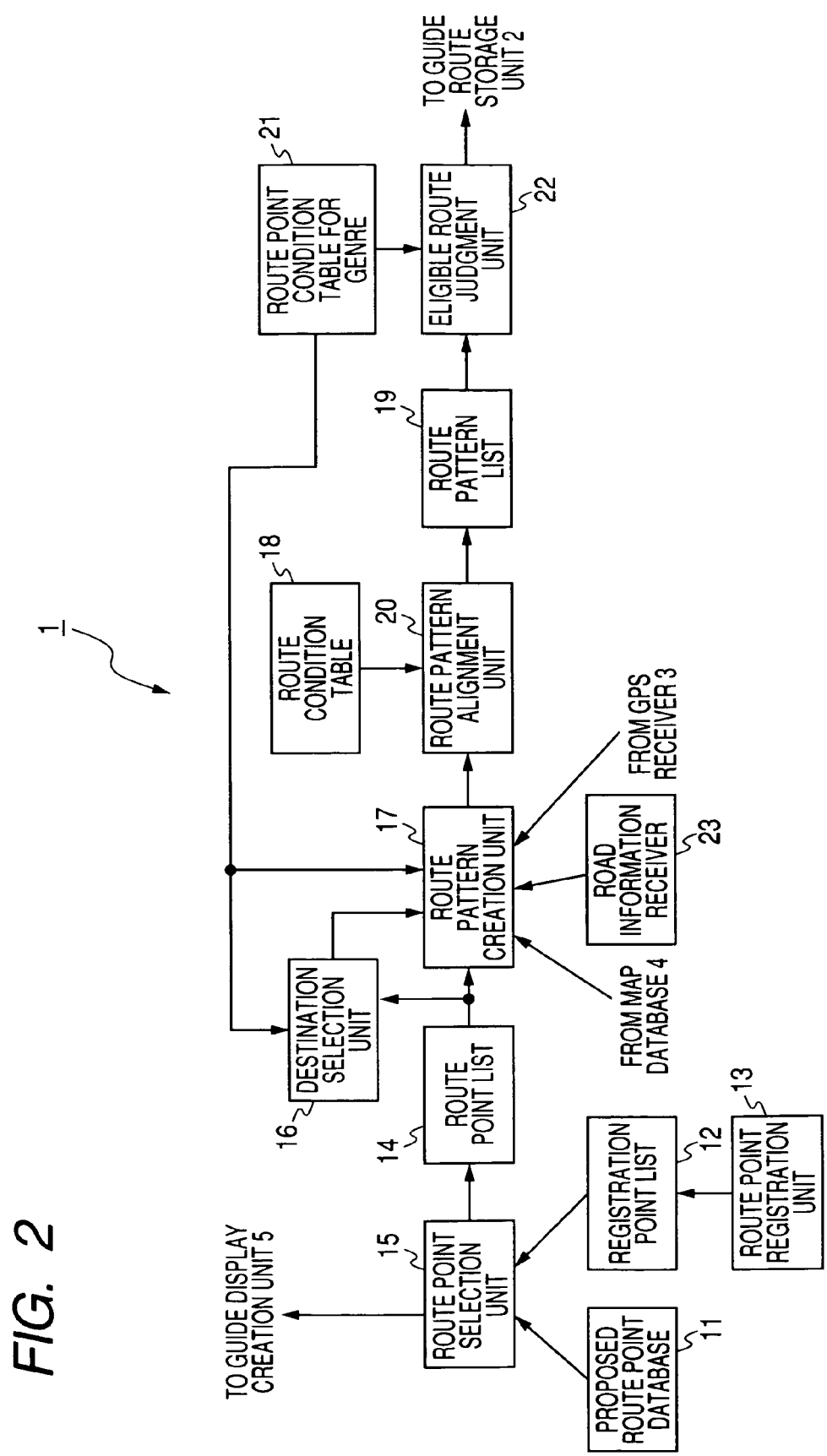
FIG. 2 is a block diagram showing a detailed constitution of a guide route creation unit in FIG. 1.

FIG. 2 is a block diagram showing a detailed block constitution of the guide route creation unit 1 in FIG. 1. The guide route creation unit 1 includes a proposed route point database 11, a route point registration unit 13 that creates a registered point list 12, a route point selection unit 15 that creates a route point list 14, a destination selection unit 16, a route pattern creation unit 17 serving as creating means for creating a route pattern, a route point condition table 18, a route pattern alignment unit 20 that creates a route pattern list 19, a route point condition table for genre 21, and an eligible route judgment unit 22 serving as selecting means.

FIG. 3 shows a part of a data structure of the proposed route point database 11 in FIG. 2. As an example, records of six proposed route points A to F are shown in respective rows in FIG. 3. In the records of the respective proposed route points, attribute data of a proposed route point such as name data of the proposed route point, a facility present in the proposed route point, or the like, genre data indicating a genre (i.e., classification for each type of industry) of the facility present in the proposed route point or the like, holiday data of the facility present in the proposed route point or the like, and business hour data of the facility present in the proposed route point and the like are included therein. Besides, latitude and longitude, an address, a telephone number, and the like not shown in the figure of the proposed route point are included in the respective records. Specifically, for example, in attribute data of a record of a proposed route point B, "restaurant ○■" is included as the name data of a facility present in the proposed route point, "restaurant" is included as the genre data of the facility present in the proposed route point, "Monday" is included as the holiday data of the facility present in the proposed route point, and "11:00 to 14:00, 18:00 to 24:00" is included as the business hour data of the facility present in the proposed route point.

The registered point list 12 includes, for example, name data of a place registered by a user and latitude and longitude data of the place.

FIG. 4 shows a part of a data structure of the route point condition table for genre 21 in FIG. 2. In a table shown in FIG. 4, as an example, records of ten genres are shown in respective rows. In the records of the respective genres, attribute data of genres such as genre name data, guide time data, stay time data, stayable time data, final destination advisability data, time adjustment advisability data, and food and drink genre data are included therein. The guide time data is data indicating a time frame in which a user is guided to a route point of the genre. The stay time data is data indicating time during which the user stays at the route point of the genre. The stayable time data is data indicating a maximum time during which the user stays at the route point of the genre. The final destination advisability data is data indicating that it is allowed or prohibited to set the route point of the genre as a final destination. The time adjustment advisability data is data indicating that it is prohibited to adjust time of a stay time at the route point of the genre. The food and drink genre data is data indicating whether the route point of the genre belongs to a restaurant. For example, in attribute data of a record on a second row, "restaurant" is included as the genre name data, "11:00 to 13:00, 18:00 to 20:00" is included as the guide time data, "two hours" is included as the stay time data, "two hours and thirty minutes" is included as the stayable time data, "X (not allowed)" is included as the final destination advisability data, "○ (allowed)" is included as the time adjustment advisability data, and "○ (conforming)" is included as the food and drink genre data.

The route point condition table 18 shown in FIG. 2 is a table in which a condition for selecting a guide route leading from a start point to a destination via route points is registered. Specifically, for example, a condition such as a shortest moving time, a shortest moving distance, or minimum cost is registered in the route point condition table 18. Plural conditions may be registered in the route point condition table 18. The condition may be a condition obtained by combining conditions concerning plural items (a distance and time) such as a shortest moving time in a range of 150 km or less.

Operations of the navigation device shown in FIG. 1 will be explained.

First, the route point selection unit 15 of the guide route creation unit 1 causes the display unit 6 to display name data of a proposed route point in the proposed route point database 11 and name data of a place registered by the user in the registered point list 12 according to route point search or the like based on an address or the like of the user. When the name data of the proposed route point displayed on the display unit 6 or the name data of the place registered by the user is selected by the user, the route point selection unit 15 registers a record of a route point or a record of a registered point including the name data selected at the route point list 14 as route point data.

When name data of a desired place is not displayed on the display unit 6, the user inputs data for registering the desired place. The route point registration unit 13 creates registered point data from this input data and registers the registered point data in the registered point list 12. Consequently, the route point selection unit 15 displays the name data of the desired place not registered on the display unit 6. The user can select the place as route point data.

The user may input a value of latitude and longitude data of the registered point data. However, for example, the route point registration unit 13 may display the display map data of the map database 4 on the display unit 6 to cause the user to select a location on a map of the registered point and use a value of latitude and longitude data corresponding to a display position selected as a value of latitude and longitude data of the registered point data. Besides, for example, when a present location is a registered point, the route point registration unit 13 may use a value of latitude and longitude data outputted by the GPS receiver 3 as a value of latitude and longitude data of the registered point data.

The destination selection unit 16 selects one of the plural route points registered at the route point list 14 as a destination. Specifically, the destination selection unit 16 searches for route point data of a home or route point data associated with a genre marked "○ (allowed)" in the final destination advisability data of the route point condition table for genre 21. The destination selection unit 16 selects this route point data as a destination.

In general, the route point data of the home is registered in the registered point list 12. Therefore, the destination selection unit 16 only has to select route point data conforming to the route point data registered in the registered point list 12 among the route point data included at the route point list 14 as a destination. In particular, It is also possible that a flag or the like indicating the home is included in the registered point data of the home in the registered point list 12 in advance and the destination selection unit 16 selects route point data conforming to the registered point data including this flag as a destination.

The destination selecting unit 16 may select a first or last route point of the registered point list 12 as a destination. When it is impossible to specify a destination according to automatic selection of the destination selection unit 16, the destination selection unit 16 may cause the user to select a route point as a destination. Moreover, the destination selection unit 16 may select a route point of a genre, a final time of a guide time is set latest at the route point condition table for genre 21, as a destination. For example, when a guide time is "15:00 to 24:00" as in the genre "hotel" shown in FIG. 3, the hotel is selected as a destination.

The route pattern creation unit 17 creates plural route patterns leading from a start point to a destination via all the route points registered at the route point list 14 in different orders. Longitude/latitude data of the start point may be a point of present latitude and longitude data outputted by the GPS receiver 3 or may be latitude and longitude data of the start point separately selected by the user.

Specifically, for example, the route pattern creation unit 17 creates permutation patterns of all the route points registered at the route point list 14. When the number of route points other than the destination is four, the number of permutation patterns is 24 ($=_4P_4$). The route pattern creation unit 17 searches for routes leading from the start point to the destination via the route points in orders of the respective permutation patterns using the road search data of the map database 4 and creates plural route patterns for the respective permutation patterns. In order to calculate arrival times at the respective route points, the route pattern creation unit 17 adds, in creating the respective route patterns, a stay time indicated in the stay time data of the route point condition table for genre 21 in FIG. 4 to traveling times among the route points. The route pattern creation unit 17 may use traffic jam information received by the route information receiver 23 as moving times of respective roads at the time of route search instead of the moving time data of the road search data.

The route pattern creation unit 17 may create route patterns for combinations of passing orders of all the route points other than the destination. However, the route pattern creation unit 17 does not have to create a route pattern that passes plural route points in an order in which a loop is formed or a route pattern passing plural route points in an order in which a route passes an identical region plural times.

The route pattern alignment unit 20 creates the route pattern list 19 in which plural route patterns created by the route pattern creation unit 17 are arranged in a predetermined order. FIG. 5 shows an example of the route pattern list 19 created by the route pattern alignment unit 20. N (N is a natural number equal to or larger than 2) route patterns are included in this route pattern list 19. Route pattern data indicating an order of passing route points and arrival time data of each of the route points are included in respective records of the route pattern list 19. In this route pattern list 19, the route patterns are arranged in an order complying with a condition of a shortest moving time. A route pattern with an earliest arrival time at a destination is put in a first row (a first record) of the route pattern list 19. An arrival time at the destination is later in a lower row (record). When the route patterns are arranged according to the condition of a shortest moving time, an arrival time at a last route point A of the route patterns, that is, the route point A as the destination is later in the third row than in the first row and is later in the third row than in the second row. Alphabets A, B, C, D, and E in FIG. 5 indicate points identical with those indicated by the alphabets affixed to the proposed route points in FIG. 3.

Specifically, for example, when a new route pattern is created by the route pattern creation unit 17, the route pattern alignment unit 20 registers this route pattern in the route pattern list 19. In particular, at the time of this registration, the route pattern alignment unit 20 rearranges the route patterns already registered in the route pattern list 19 and the route pattern registered anew on the basis of the conditions in the route point condition table 18.

All of route patterns created by the route pattern creation unit 17 may be registered in this route pattern list 19. However, only a part of the route patterns may be registered in the route patter list 19. When a part of route patterns created by the route pattern creation unit 17 are registered, the route pattern alignment unit 20 judges, for example, superiority and inferiority of the route pattern created anew and a route pattern stored last in the route pattern list 19 (hereinafter referred to as worst route pattern) in accordance with the conditions in the route point condition table 18. When the route pattern created anew more suitably satisfies the route point condition table 18 than the worst route pattern, the rote pattern alignment unit 20 only has to overwrite this worst route pattern with the new route pattern and, then, rearrange the plural route patterns in the route pattern list 19 such that the route patterns are arranged in order from one that more suitably satisfies the conditions in the route point condition table 18 than the other route patterns. When the worst route pattern is superior to the route pattern created anew, the route pattern alignment unit 20 only has to abandon the route pattern created anew.

The eligible route judgment unit 22 judges one of the plural route patterns registered in the route pattern list 19 as guide route data and causes the guide route storage unit 2 to store this guide route data. Specifically, for example, the eligible route judgment unit 22 judges, in order from the top route pattern in the route pattern list 19, the route pattern conforms to the conditions at the route point condition table for genre 21.

The eligible route judgment unit 22 judges a route pattern conforming to the conditions at the route point condition table for genre 21 first as guide route data and causes the guide route storage unit 2 to store the guide route data. When there are plural route patterns conforming to the conditions at the route point condition table for genre 21, the eligible route judgment unit 22 may judge, for example, a route pattern in which an arrival time at a destination is closest to time in the middle of a time frame of a guide time of the destination as guide route data and cause the guide route storage unit 2 to store the guide route data.

For example, in the case of the route pattern list 19 shown in FIG. 5, the eligible route judgment unit 22 performs the following processing. First, the eligible route judgment unit 22 performs eligibility judgment for a route pattern B of the first record. In FIG. 3, a first route point B of the first record is classified into the genre of "restaurant". In FIG. 4, a guide time to the restaurant is "11:00 to 13:00, 18:00 to 20:00". In the route pattern list 19 in FIG. 5, an arrival time at the first route point B of the first record is "10:30". Therefore, since the arrival time at the route point B is not included in the condition of the guide time to the restaurant, the eligible route judgment unit 22 judges the route pattern of the first record as ineligible.

Subsequently, the eligible route judgment unit 22 performs eligibility judgment for a route pattern of a second record. Since a first route point of the second record is also B, the eligible route judgment unit 22 judges the route pattern of the second record as ineligible.

Moreover, the eligible route judgment unit 22 performs eligibility judgment for a route pattern of a third row. In FIG. 3, a first route point C of a third record is classified into the genre of "department store". In FIG. 4, a guide time to the department store is not set. Therefore, the eligible route judgment unit 22 judges the first route point C of the third record as eligible and performs eligibility judgment for a second route point B of the third record. The second route point B of the third record is classified into the genre of "restaurant". An arrival time at the restaurant "12:30" satisfies the guide time to the restaurant in FIG. 4. Thus, the eligible route judgment unit 22 judges the second route point B of the third record as eligible. When the eligibility judgment is performed for all route points in the route pattern of the third record in this way, arrival times of all the route points (including the destination) of the third record satisfy all the conditions of guide times for genres in FIG. 4. Therefore, eligible route judgment unit 22 judges the route pattern of the third record as eligible. The eligible route judgment unit 22 judges the route pattern of the third record as guide route data and causes the guide route storage unit 2 to store the guide route data. Since the third record is judged as eligible, the eligible route judgment unit 22 does not perform eligibility judgment processing for fourth and subsequent records (i.e., a fourth record to an Nth record) in the route pattern list 19.

According to the series of search operations for a guide route, the route pattern of the third record suitably satisfying the shortest moving time condition in the route point condition table 18 and the guide time condition in the respective route points at the route point condition table for genre 21 is stored in the guide route storage unit 2 as guide route data. Route information corresponding to this route pattern (information on plural road links selected in the search by the route pattern creation unit 17) is also stored in the guide route storage unit 2.

A navigation operation using the guide route data stored in this guide route storage unit 2 will be explained.

When latitude and longitude data indicating a present location (hereinafter referred to as latitude and longitude data of a present location) of the GPS receiver 3 is outputted from the GPS receiver 3, the guide display creation unit 5 creates display data. Specifically, for example, the guide display creation unit 5 reads out display map data in a predetermined latitude and longitude range around latitude and longitude indicated in the latitude and longitude data of the present location from the map database 4. In this readout range, the longitude and latitude indicated in the longitude/latitude data of the present location does not have to be in the center of the readout range.

The guide display creation unit 5 reads guide route data (a route pattern and route information) of a guide route passing through the predetermined latitude and longitude range from the guide route storage unit 2. The guide display creation unit 5 superimposes a present location mark in the center of a map of the display map data read and superimposes the guide route data read on a map of routes and route points of the display map data to create display data. The display unit 6 displays this display data.

When the GPS receiver 3, that is, the navigation device moves, latitude and longitude indicated by latitude and longitude data outputted from the GPS receiver 3 also changes. When the latitude and the longitude of the latitude and longitude data outputted from the GPS receiver 3 changes, the display map data read from the map database 4 and the guide route data read from the guide route storage unit 2 by the guide display creation unit 5 also change. Therefore, in accordance with the movement of the navigation device, a map and a guide route displayed on the display unit 6 change such that the center of a display image is in the present location.

As a result, the user can efficiently move from a start point to a destination via plural route points by holding this navigation device to move such that a present location overlaps a guide route.

Moreover, this navigation device guides a route through a guide route created to satisfy arrival times at the respective route points (including the destination) and stay times at the respective route points (including the destination) registered at the route point condition data for genre 21. Thus, the user can arrive at the respective route points at suitable times and stay for sufficient ties in the respective route points. Therefore, this navigation device can guide the user to, for example, a restaurant selected as a route point at appropriate time. Thus, it is possible to effectively prevent a situation in which the user is hungry for a long time or cannot have a meal because the user is guided to a restaurant late.

As described above, in the first embodiment, plural route patterns passing through plural route points in orders different from one another are created, the plural patterns are examined in an order complying with search conditions for a guide route, and a route pattern satisfying route point conditions at all the route points is selected as a guide route. Therefore, it is possible to find, as a guide route, a route pattern that satisfies the route point conditions at all the route points and most suitably satisfies the search conditions for a guide route out of the plural route patterns passing through the plural route points in orders different from one another. As a result, the user can stay in the respective route points in a state in which the respective route point conditions at the route points are satisfied.

In the first embodiment, it is judged on the basis of the route point conditions for each of the genres, into which the route locations are classified, whether the respective route points satisfy the respective route point conditions. A route pattern satisfying the route point conditions at all the route points is selected as a guide route. Therefore, since it is judged on the basis of the route point conditions for each of the genres, into which the route locations are classified, whether the respective route points satisfy the respective route point conditions, it is possible to reduce an amount of data of the route point conditions compared with the case in which, for example, route point conditions are individually associated with each of the route points in the proposed route point database 11.

Second Embodiment

A navigation device according to a second embodiment of the invention I includes, as in the first embodiment, the guide route storage unit 2, the GPS receiver 3, the map database 4, the guide display creation unit 5, and the display unit 6. However, the guide route creation unit 1 is constituted as described below.

Figure 6:
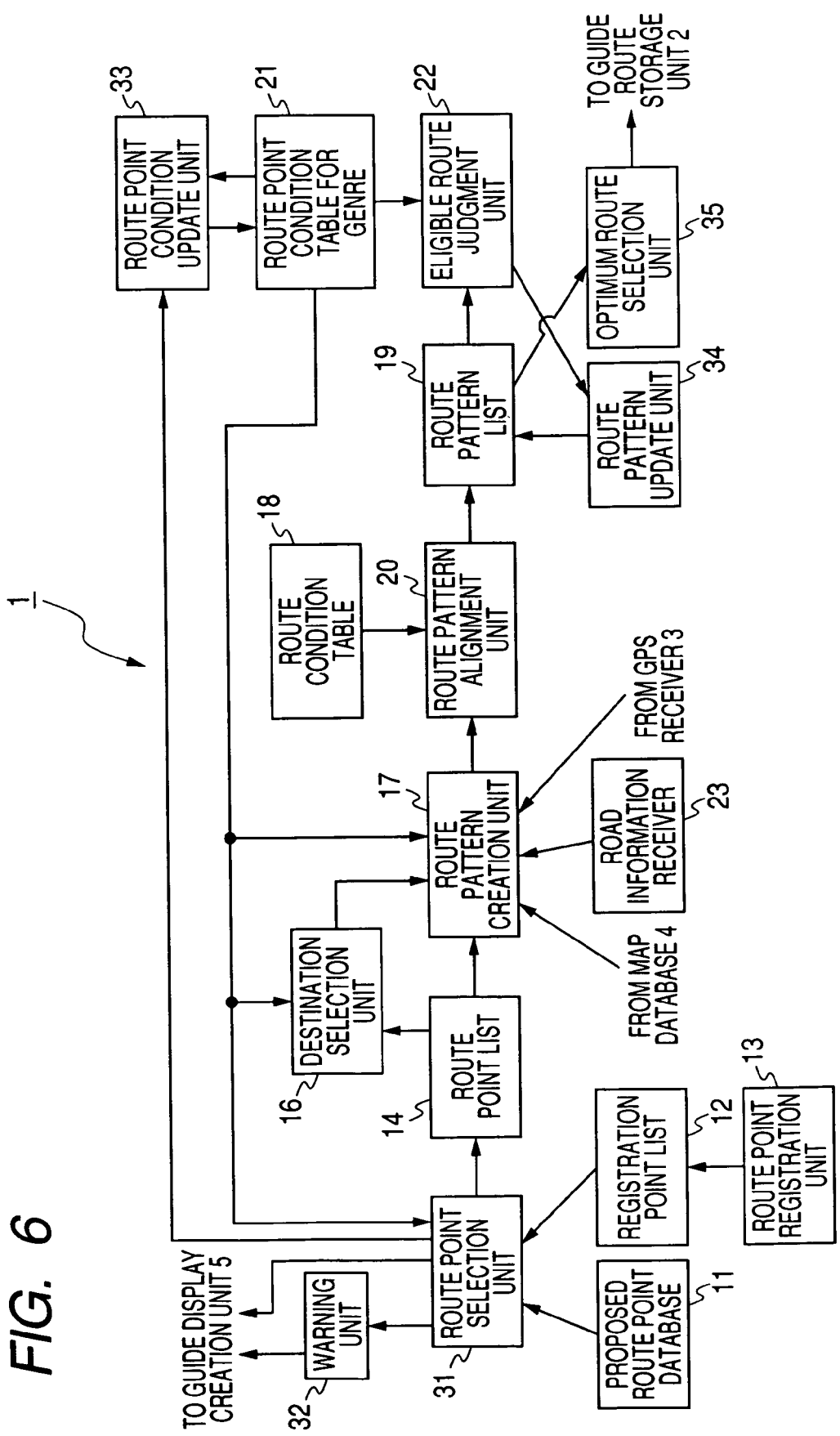
FIG. 6 is a block diagram showing a detailed block constitution of a guide route creation unit according to a second embodiment of the invention I.

FIG. 6 is a block diagram showing a detailed constitution of the guide route creation unit 1 according to the second embodiment of the invention I. The guide route creation unit 1 includes the proposed route point database 11, the route point registration unit 13 that creates the registered point list 12, a route point selection unit 31 serving as approving means for creating the route point list 14, a warning unit 32 serving as warning means, the destination selection unit 16, the route pattern creation unit 17, the route point condition table 18, the route pattern alignment unit 20 that creates the route pattern list 19, the route point condition table for genre 21, a route point condition update unit 33 serving as route point condition updating means, the eligible route judgment unit 22 serving as judging means, a route pattern update unit 34 serving as adjusting means, and an optimum route selection unit 35 serving as selecting means.

When a route point selected by a user is open, the route point selection unit 31 registers this route point at the route point list 14. When the route point is not open, the warning unit 32 causes the display unit 6 to perform warning display. The warning unit 32 may perform warning with alarm sound or a sound message instead of the warning by the warning display. The warning unit 32 may perform the warning by display and the warning by sound simultaneously. The route point condition update unit 33 updates data registered at the route point condition table for genre 21. The route pattern update unit 34 changes content of a route pattern of a route judged as ineligible by the eligible route judgment unit 22. The optimum route selection unit 35 selects one route pattern from the route pattern list 19 as guide route data and causes the guide route storage unit 2 to store this guide route data.

Components of the guide point selection unit 31 other than the above and components of the navigation device other than the route point selection unit 31 have the same functions as the components with the same names of the navigation device in the first embodiment. Thus, the components are denoted by reference numerals identical with those in the first embodiment and explanations of the components are omitted.

Operations of the navigation device according to the second embodiment will be explained.

When a name of a place registered by the user is selected by the user on the basis of display on the display unit 6, the route point selection unit 31 of the guide route creation unit 1 registers a record of this registered point at the route point list 14.

When a name of a proposed route point is selected by the user on the basis of display on the display unit 6, the route point selection unit 31 reads holiday data of the proposed route point selected from the proposed route point database 11. The route point selection unit 31 compares a day when the user goes to the route point and holiday data of the route point. When the day when the user goes to the route point is other than a holiday indicated by the holiday data, the route point selection unit 31 registers a record of the route point at the route point list 14. Conversely, when the day when the user goes to the route point is the holiday indicated by the holiday data, the route point selection unit 31 notifies the warning unit 32 to that effect. The warning unit 32 causes the display unit 6 to display a predetermined warning indication. Consequently, the user can reset a substitute route point anew and does not go to a route point closed.

Subsequently, the route point selection unit 31 reads business hour data of a route point confirmed to be open from the proposed route point database 11 and outputs the business hour data as time frame comparison data corresponding to a genre of the route point. The route point condition update unit 33 compares this time frame comparison data and guide time data associated with the same genre of the route point condition table for genre 21. When a time frame not included in the business hour data of the route point is included in a time frame of the guide time data, the guide point condition update unit 33 deletes a guide time by the excess time frame not included in the business hour data and updates the guide time data of the route point condition for genre table 21 to be included in the business hour data of the route point. Consequently, since consistency of a business hour frame of the route point and a guide time frame of the guide time data is secured, the user is not guided to the respective route points when the route points are not open.

Specifically, for example, in F of the proposed route point database 11 in FIG. 3, "ristorante Δ" classified into the genre "restaurant" is registered. A business hour of this "ristorante Δ" is "18:00 to 21:00". In other words, this "ristorante Δ" is not open at 11:00 to 13:00. When a data state of the route point condition table for genre 21 is in a state shown in FIG. 4, if this "ristorante Δ" is selected as a route point, the route point condition update unit 33 updates guide time data "11:00 to 13:00, 18:00 to 20:00" of the genre "restaurant" to "18:00 to 20:00". This guide time data may be returned to the state before update after the guide ends.

In the second embodiment, a business hour of a route point is read from the proposed route point database 11 and this business hour and a guide time frame of guide time data are compared to secure consistency of the business hour and the guide time frame of the guide time data. Besides, for example, it is also possible that a guide time frame for each route point is stored in the proposed route point database 11 and the route point condition update unit 33 updates the guide time data at the route point condition table for genre 21 according to the guide time frame for each route point. In this case, an amount of data of the proposed route point database 11 is larger than that in the case of the second embodiment. However, it is unnecessary to perform processing for comparing a business hour and a guide time frame of guide time data by the guide point condition update unit 33.

The destination selection unit 16 selects one of the plural route points registered at the route point list 14 as a destination. The route pattern creation unit 17 creates plural route patterns leading from a start point to the destination via all the route points registered at the route point list 14. The route pattern alignment unit 20 creates the route pattern list 19 in which the plural route patterns created by the route pattern creation unit 17 are arranged in a predetermined order. The plural route patterns are arranged in the route pattern list 19 in an order complying with the conditions in the route point condition table 18.

The eligible route judgment unit 22 judges whether the plural route patterns registered in the route pattern list 19 conform to the conditions in the route point condition table for genre 21 in order from a top route pattern in the route pattern list 19. The route pattern update unit 34 changes content of a route pattern not conforming to the conditions at the route point condition table for genre 21 to conform to the conditions. The eligible route judgment unit 22 ends the judgment processing when a route pattern conforming to the conditions at the route point condition table for genre 21 is found.

Specifically, for example, the route pattern list 19 in FIG. 5 is judged under thee route point condition table for genre 21 in FIG. 4, the eligible route judging unit 22 judges that the route pattern of the first record and the route pattern of the second record doe not conform to the conditions. The route pattern update unit 34 updates content of the route pattern of the first record and content of the route pattern of the second record.

In the route pattern of the first record, arrival time data at the restaurant at the route point B is "10:30". This is time thirty minutes earlier than an earliest guide time "11:00" of the genre "restaurant" in FIG. 4. In the route pattern of the first record, the route point B is a first route point. Therefore, the route pattern update unit 34 adjusts a departure time at a start point for time adjustment. The route pattern update unit 34 delays arrival times at all the route points and the departure time at the start point by the time equivalent to the difference between the arrival time and the earliest guide time (thirty minutes).

When such adjustment for the route point B is performed, in the route pattern of the first record, arrival time data at a café at a route point D is "14:30". This is time thirty minutes earlier than guide time data "15:00" of a genre "café" in FIG. 4. In the route pattern of the first record, the route pattern passes through "department store" at the route point C before the route point D. In the genre "department store" in FIG. 4, stayable time data "two hours" is set other than stay time data "one hour". In other words, under the condition, the user may stay at the department store for an extra one hour. Therefore, the route pattern update unit 34 delays a departure time from the department store by thirty minutes and delays arrival times at the route points after that (D, E, and A) and the departure time at the start point by that time.

When it is impossible to set arrival time data of arrival at the café at the route point D to be later than "15:00" even if the arrival time data is adjusted with extendable time at the department store, the route pattern update unit 34 further adjusts departure times and the like after the restaurant at the route point B such that the arrival time data of arrival at the café at the route point D is after "15:00".

Concerning the route pattern of the second record, the route pattern update unit 34 delays arrival times at all the route points and the departure time at the start point by thirty minutes such that the arrival time data of arrival at the restaurant at the route point B changes from "10:30" to "11:00".

According to such update processing by the route pattern update unit 34, the route pattern list 19 in FIG. 5 is updated to the route pattern list 19 shown in FIG. 7. The route judgment unit judges a route pattern in a third row of the route pattern list 19 in FIG. 5 as eligible. Consequently, the plural route patterns form the first row to the third row of the rote pattern list 19 conform to the conditions at the route point condition table for genre 21.

The optimum route selection unit 35 selects one route pattern from the updated route pattern list 19 shown in FIG. 7 as guide route data and causes the guide route storage unit 2 to store this guide route data. Specifically, for example, the optimum route selection unit 35 selects a route pattern conforming to the conditions in the route point condition table 18 most as guide route data out of route patterns from a top route pattern in the updated route pattern list 19 to a pattern judged as eligible (in FIG. 5, the route pattern of the third record corresponds to this route pattern). In the route pattern list 19 in FIG. 5, which is the base of that in FIG. 7, the route patterns are arranged in accordance of a condition of a shortest moving time. Thus, the optimum route selection unit 35 selects the route pattern of the second route in FIG. 7, in which a time difference between a departure time at a start point and an arrival time at a destination (the route point A) is the smallest, as guide route data. The optimum route selection unit 35 may select a route pattern in which an arrival time at a destination is the earliest as guide route data.

According to the series of search operations for a guide route, a route pattern most suitably satisfying the conditions of the route point condition table 18 and the route point condition for genre table 21 is stored in the guide route storage unit 2 as guide route data. Note that, since a navigation operation using the guide route data stored in the guide route storage unit 2 is the same as that in the first embodiment, an explanation of the navigation operation is omitted.

As a result, the user can efficiently move from a start point to a destination via plural route points by holding this navigation device to move such that a present location overlaps a guide route. For example, in the case shown in FIGS. 3 to 5, compared with the case of the first embodiment, it is possible to move on a route in which a departure time at a start point is thirty minutes later and an arrival time at a destination is fifteen minutes earlier.

As described above, in the second embodiment, when a proposed route point selected from the proposed route point database 11 is open, the selected proposed route point is approved as one of plural route points. Thus, it is possible to prevent the user from being guided to a closed route point.

In the second embodiment, when a proposed route point selected from the proposed route point database 11 is closed, a warning is emitted from the warning unit 32. Thus, it is possible to inform the user that the closed proposed route point is selected as a route point. The user can select another route point in stead of the closed proposed route point according to the information.

In the second embodiment, when a route point condition for each genre of the route point condition table for genre 21 is not in a business hour of a route point, the route point condition for each genre is updated such that the route point condition for each genre is in the business hour of the route point. Thus, it is possible to prevent a guide route for guiding the user to the route point when the route point is not in a business hour from being created.

In the second embodiment, the route pattern update unit 34 updates content of a route pattern, which is judged by the eligible route judgment unit 22 that a route point condition at least at one route point is not satisfied, such that the route pattern satisfies route point conditions at all the route points. The optimum route selection unit 35 selects a route pattern conforming to search conditions of a guide route most as a guide route from route patterns satisfying the route point conditions at all the route points. Therefore, it is possible to select a more suitable route pattern as a guide route compared with the case in which a route pattern judged by the eligible route judgment unit 22 as eligible is directly selected as a guide route.

In the second embodiment, when a route point at which the user arrives at time earlier than a guide time as a route point condition is present in a route pattern, the route pattern update unit 34 delays a departure time from a start point of the route pattern such that the user arrives at the route point at the guide time. Therefore, the user can, for example, get up late and start by time equivalent to the delay in the start time.

In the second embodiment, when a route point at which the user arrives at time earlier than a guide time as a guide point condition is present in a route pattern, the route pattern update unit 34 extends a stay time at a route point before the route point such that such that the user arrives at the route point at the guide time. Therefore, the user can spend longer time at the route point where the stay of the user is extended.

Third Embodiment

A navigation device according to a third embodiment of the invention I includes, as in the first and the second embodiments, the guide route creation unit 1, the guide route storage unit 2, the GPS receiver 3, the map database 4, the guide display creation unit 5, and the display unit 6. However, the guide route creation unit 1 is constituted as described below.

Figure 8:
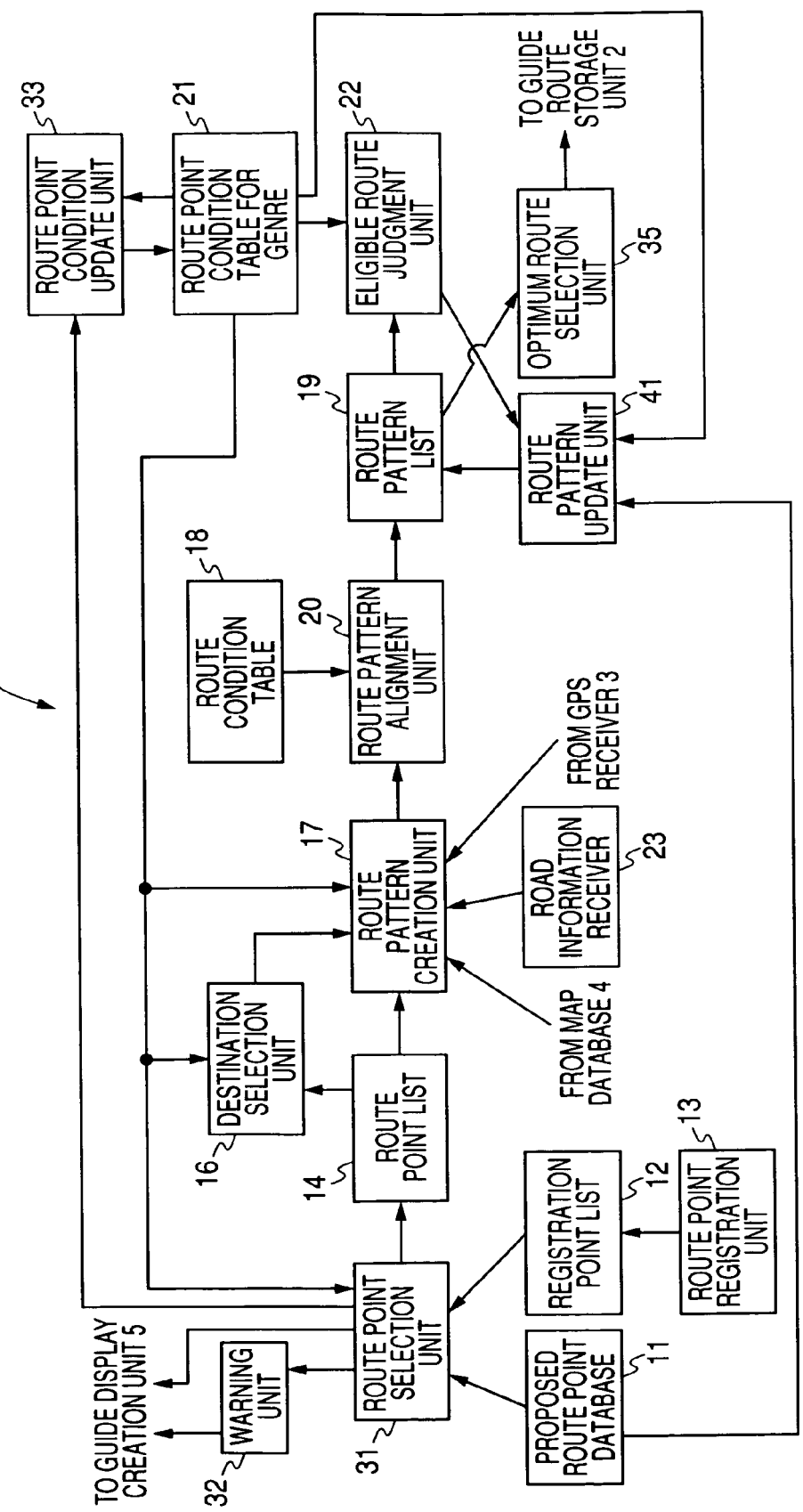
FIG. 8 is a block diagram showing a detailed constitution of a guide route creation unit according to a third embodiment of the invention I.

FIG. 8 is a block diagram showing a detailed constitution of the guide route creation unit 1 according to the third embodiment of the invention I. The guide route creation unit 1 includes the proposed route point database 11, the route point registration point 13 that creates the registration point list 12, the route point selection unit 31 that creates the route point list 14, the warning unit 32, the destination selection unit 16, the route pattern creation unit 17, the route point condition table 18, the route pattern alignment unit 20 that creates the route pattern list 19, the route point condition table for genre 21, the route point condition update unit 33, the eligible route judgment unit 22, a route pattern update unit 41 serving as route pattern updating means, and the optimum route selection unit 35.

The route pattern updating unit 41 updates a route pattern of a route judged as ineligible by the eligible route judgment unit 22. Components of the navigation device other than the above have the same functions as the components with the same names of the navigation device in the second embodiment. Thus, the components are denoted by reference numerals identical with those in the second embodiment and explanations of the components are omitted.

Operations of the navigation device according to the third embodiment will be explained.

In the third embodiment, the route pattern update unit 41 performs operations different from those of the route pattern update unit 34 in the second embodiment. Explaining the operations with the route pattern of the second record shown in FIG. 5 as an example, in the route pattern of the second record, an arrival time at the restaurant at the route point B, which is a first route point, is thirty minutes earlier than the guide time. Therefore, the route pattern update unit 41 searches for a genre, a stay time in which coincides with an adjustment time for the thirty minutes, in the route point condition table for genre 21. In the route point condition table for genre 21, genres "curry house" and "café" where a stay time is thirty minutes are found. Subsequently, in the proposed route point database 11, the route pattern update unit 41 searches for a record (i.e., a route point) that is on a guide route between a start point and a route point with a too early arrival time and in which "curry house" or "café" is included as genre data. When a new route point satisfying the condition is extracted, the route pattern update unit 41 updates the route pattern of the second record to a route pattern including the new route point between the start point and the route point B and adds an arrival time at this new route point.

When there is no genre in which time desired to be adjusted and a stay time coincide with each other, the route pattern update unit 41 may search for a genre having a stay time longer than the time desired to be adjusted and closest to the time desired to be adjusted and adjust an arrival time or the like at another route point by an excess stay time at a new route point of the genre. Besides, for example, the route pattern update unit 41 may increment stay times of plural genres until the stay time are equal to or longer than the time desired to be adjusted or closer to the time desired to be adjusted and search for the genre among the respective genres incremented.

When a route point of a genre in which time desired to be adjusted and a stay time coincide with each other is not present on a guide route between the start point and a route point with a too early arrival time, the route pattern update unit 41 searches for a moving route that is a route other than a present route between the route point with a too early arrival time and a route point immediately preceding the route point and has a shortest moving time again. Moreover, the route pattern update unit 41 searches for a route point on the route found again and adds, to a route pattern, a route point where time of a sum of a stay time at this route point and a moving time on the route found again has a smallest difference from time of a sum of a previous adjustment time and a moving time causing the adjustment time. The route pattern update unit 41 may add a first route point where the difference is equal to or smaller than a predetermined difference.

Besides, for example, when a route point of a genre in which time desired to be adjusted and a stay time coincide with each other is not present on a guide route between the start point and a route point with a too early arrival time, first, the route pattern update unit 41 searches for a route point close to a route between a route point where this arrival time is early and a route point immediately preceding the route point. Subsequently, the route pattern update unit 41 may add, to a route pattern, a route point where time of a sum of a stay time at this route point found anew and time of a sum of a total moving time through the route point found anew has a smallest difference from time of a sum of a previous adjustment time and a moving time causing the adjustment time. Even in this case, the route pattern update unit 41 may add a first route point where the difference is equal to or smaller than a predetermined difference.

According to such update processing by the route pattern update unit 41, the route pattern list 19 in FIG. 5 is updated. The eligible route judgment unit 22 judges the route pattern of the third record in the route pattern list 19 in FIG. 5 as eligible.

The optimum route selection unit 35 selects one route pattern as guide route data from this route pattern list 19 updated and causes the guide route storage unit 2 to store this guide route data. Specifically, for example, the optimum route selecting unit 35 selects, as guide route data, a route pattern with an earliest arrival time at a destination out of route patterns from a top route pattern in the updated route pattern list 19 to a route pattern judged as eligible by the eligible route judgment unit 22.

According to the series of search operations for a guide route, in the guide route storage unit 2, a route pattern most suitably satisfying the conditions of the route point condition table 18 and the route point condition table for genre 21 is stored as guide route data. Note that, since other operations are the same as those in the second embodiment, explanations of the operations are omitted.

As a result, the user can efficiently move from a start point to a destination via plural route points by holding this navigation device to move such that a present location overlaps a guide route. Moreover, unlike the second embodiment, the user does not spend time more than stay times in the respective route points and can effectively use time through a route point added anew using an adjusted time.

As described above, in the third embodiment, when a route point at which the user arrives at time earlier than a guide time as a route point condition is present in a route pattern, the route pattern update unit 41 adds a new route point to the route pattern such that the user arrives at the route point at the guide time. Therefore, it is possible to create a guide route in which the user effectively utilizes time by passing through the route point added.

Fourth Embodiment

A navigation device according to a fourth embodiment of the invention I includes, as in the first to the third embodiments, the guide route creation unit 1, the guide route storage unit 2, the GPS receiver 3, the map database 4, the guide display creation unit 5, and the display unit 6. However, the guide route creation unit 1 is constituted as described below.

Figure 9:
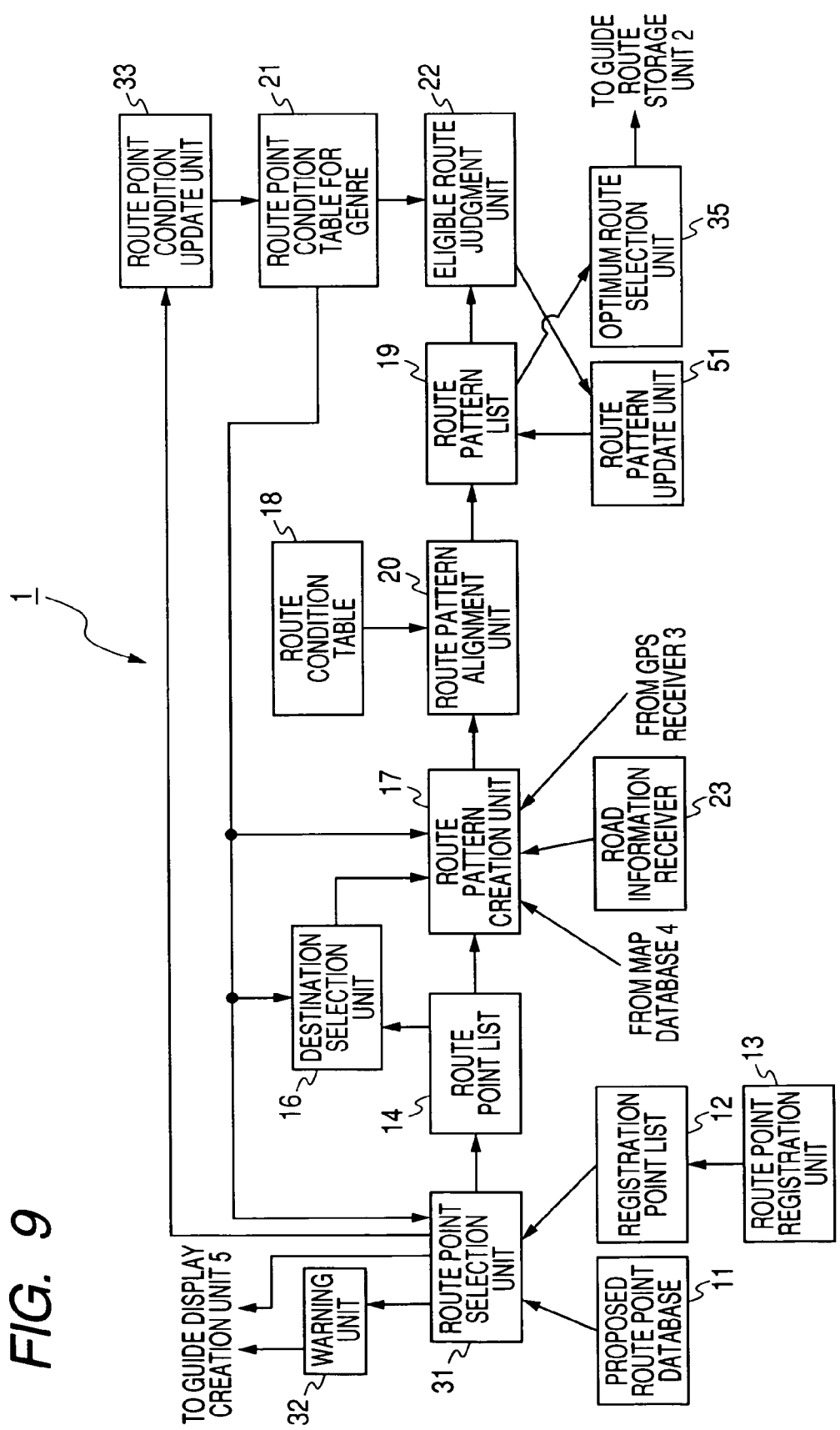
FIG. 9 is a block diagram showing a detailed constitution of a guide route creation unit according to a fourth embodiment of the invention I.

FIG. 9 is a block diagram showing a detailed constitution of the guide route creation unit 1 according to the fourth embodiment of the invention I. The guide route creation unit 1 includes the proposed route point database 11, the route point registration unit 13 that creates the registered point list 12, the route point selection unit 31 that creates the route point list 14, the warning unit 32, the destination selection unit 16, the route pattern creation unit 17, the route point condition table 18, the route pattern alignment unit 20 that creates the route pattern list 19, the route point condition table for genre 21, the route point condition update unit 33, the eligible route judgment unit 22, a route pattern update unit 51 serving as route pattern updating means, and the optimum route selection unit 35.

The route pattern update unit 51 updates a route pattern of a route judged as ineligible by the eligible route judgment unit 22. Components of the navigation device other than the above have the same functions as the components with the same names of the navigation device in the second embodiment. Thus, the components are denoted by reference numerals identical with those in the second embodiment and explanations of the components are omitted.

Operations of the navigation device according to the fourth embodiment will be explained.

In the fourth embodiment, the route pattern update unit 51 judges that, when an arrival time at a first route point is earlier than a guide time of a genre of the route point, for example, time of a start point is set prior to route search and, when latitude and longitude data of a present position outputted by the GPS receiver 3 and latitude and longitude data of a start point of a route pattern coincide with each other, a user is searching for a route on which the user is about to travel. The route pattern update unit 51 searches for a new route point on a route between the start point and the first route point as explained in the third embodiment and adds this new route point to the route pattern. When the route pattern update unit 51 does not judge that the user is searching for a route on which the user is about to travel, the route pattern update unit 51 delays a departure time at the start point by time equivalent to a difference between the arrival time and the guide time as explained in the second embodiment.

Consequently, the new route point is added to the route pattern immediately before departure and the departure time is reset in the case of a planning stage.

When adjustment of an arrival time or the like is necessary at route points other than the route point, the route pattern update unit 51 updates the route pattern such that stay times at route points ahead of the route point within a range of stayable time data. When the arrival time is not made equal to the guide time by this adjustment, the route pattern update unit 51 searches for a new route point on a route up to the route point where the arrival time is not included in the range of the guide time and adds this new route point to the route pattern. When there is not route point where it is possible to perform the time adjustment among route points before the route point where adjustment of the arrival time is necessary, the route pattern update unit 51 searches for a new route point on a route up to the route point where the arrival time is not included in the range of the guide time and adds this new route point to the route pattern.

According to such update processing by the route pattern update unit 51, the route pattern list 19 is updated.

The optimum route selection unit 35 selects one route pattern from this update route pattern list 19 as guide route data and causes the guide route storage unit 2 to store this guide route data. Specifically, for example, the optimum route selection unit 35 selects a route pattern selects, as guide route data, a route pattern with an earliest arrival time at a destination out of route patterns from a top route pattern in the updated route pattern list 19 to a route pattern judged as eligible by the eligible route judgment unit 22.

According to the series of search operations for a guide route, in the guide route storage unit 2, a route pattern most suitably satisfying the conditions of the route point condition table 18 and the route point condition table for genre 21 is stored as guide route data. Note that, since other navigation operations are the same as those in the second embodiment, explanations of the navigation operations are omitted.

As a result, the user can efficiently move from a start point to a destination via plural route points by holding this navigation device to move such that a present location overlaps a guide route. Moreover, when the user is searching for a route on which the user is about to travel, the navigation device can guide the user to a route on which the user effectively use time through a route point added anew using adjustment time. In the case of a planning stage, the navigation device can guide the user to a route on which a stay time is delayed.

As described above, according to the fourth embodiment, in the case in which a route point at which the user arrives at time earlier than a guide time as a route point condition is present in a route pattern, when the user is searching for a guide route on which the user is about start, the route pattern update unit 51 adds a new route point to the route pattern such that the user arrives at the route point at the guide time. When the user is at a planning stage, the route pattern update unit 51 delays a departure time from a start point of the route pattern such that the user arrives at the route point at the guide time. Therefore, the user can find a route according to a situation in which the user is searching for a route.

Fifth Embodiment

A navigation device according to a fifth embodiment of the invention I includes, as in the first to the fourth embodiments, the guide route creation unit 1, the guide route storage unit 2, the GPS receiver 3, the map database 4, the guide display creation unit 5, and the display unit 6. However, the guide route creation unit 1 is constituted as described below.

Figure 10:
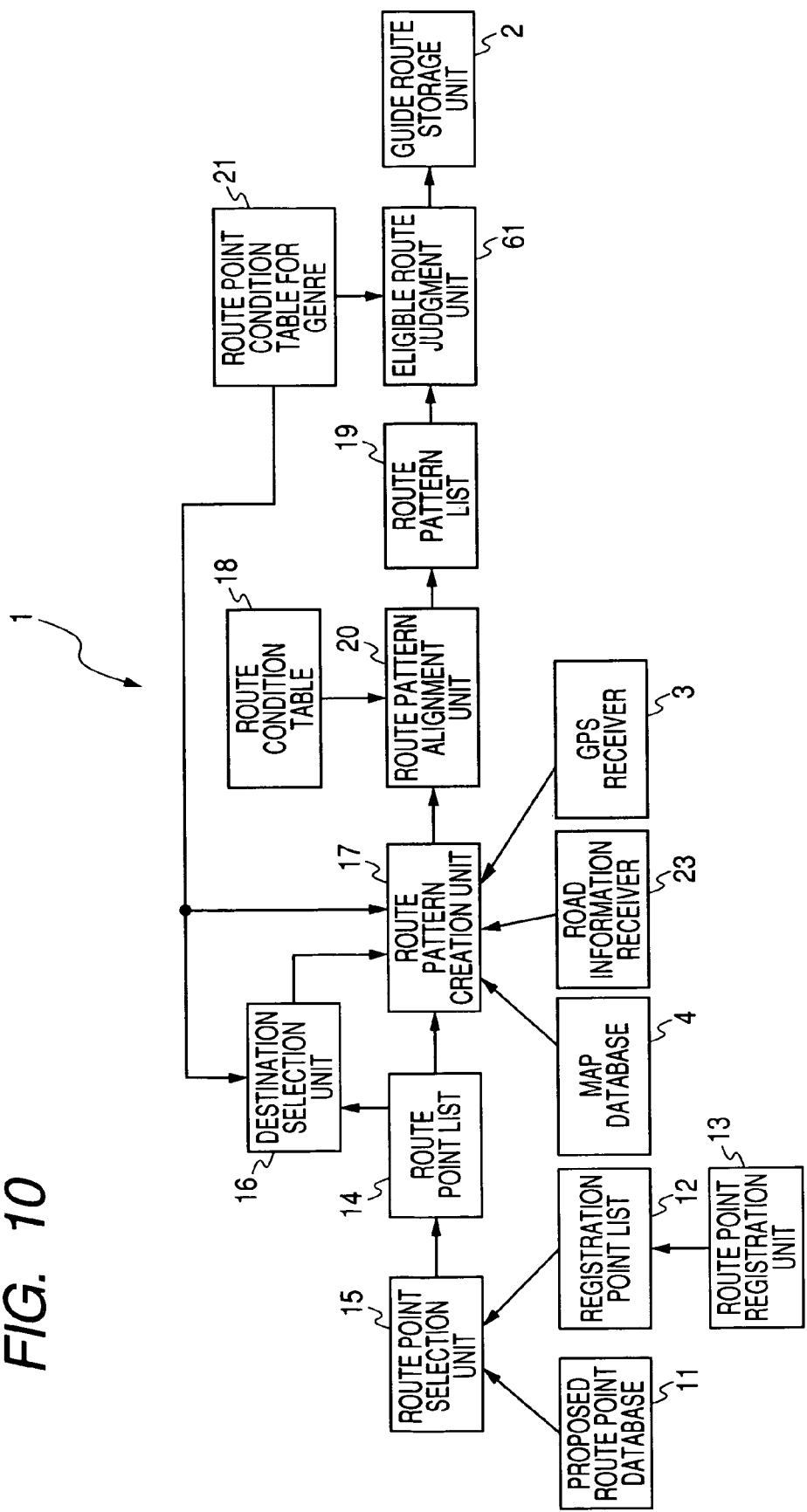
FIG. 10 is a block diagram showing a detailed constitution of a guide route creation unit according to a fifth embodiment of the invention I.

FIG. 10 is a block diagram showing a detailed constitution of the guide route creation unit 1 according to the fifth embodiment of the invention I. The guide route creation unit 1 includes the proposed route point database 11, the route point registration unit 13, the route point selection unit 15, the destination selection unit 16, the route pattern creation unit 17, the route point condition table 18, the route pattern alignment unit 20, the route point condition table for genre 21, and an eligible route judgment unit 61.

The eligible route judgment unit 61 extracts one route pattern out of plural route patterns in the route pattern list 19 as guide route data and causes the guide route storage unit 2 to store the guide route data. Components of the navigation device other than the above have the same functions as the components with the same names of the navigation device in the first embodiment. Thus, the components are denoted by reference numerals identical with those in the first embodiment and explanations of the components are omitted.

Operations of the navigation device according to the fifth embodiment will be explained.

When a name of a proposed route point or a name of a place registered by a user is selected by the user on the basis of display on the display unit 6, the route point selection unit 15 of the guide route creation unit 1 registers a record of this proposed route point or a registered point in the route point list 14. The destination selection unit 16 selects one route point out of plural route points registered in the route point list 14 as a destination. The route pattern creation unit 17 creates plural route patterns leading from a start point to the destination through all the route points registered in the route point list 14. The route pattern alignment unit 20 creates the route pattern list 19 in which the plural route patterns created by the route pattern creation unit 17 are arranged in a predetermined order. The plural route patterns are arranged in the route pattern list 19 in an order complying with the conditions in the route point condition table 18.

The eligible route judgment unit 61 judges whether the plural route patterns registered in the route pattern list 19 conform to the conditions in the route point condition table for genre 21 in an order from a top route pattern in the route pattern list 19. The eligible route judgment unit 61 causes the guide route storage unit 2 to store a first route pattern conforming to the conditions in the route point condition table for genre 21.

Specifically, for example, first, concerning each of the route patterns, the eligible route judgment unit 61 judges whether route points of a genre marked "○ (conforming)" in the food and drink genre data in the route point condition table for genre 21 in FIG. 4 continue. When route points of the genre marked "○ (conforming)" continue, the eligible route judgment unit 61 judges that the route pattern does not conform to the condition.

When route points of the genre marked "○ (conforming)" do not continue, further, concerning the route pattern, the eligible route judgment unit 61 compares arrival times at the respective route points and guide time data of the route points. The eligible route judgment unit 61 judges that a route pattern in which the arrival times at all the route points satisfy the guide time data corresponding to the respective arrival times conform to the conditions in the route point condition table for genre 21 in FIG. 4. The eligible route judgment unit 61 causes the guide route storage unit 2 to store the route pattern conforming to the conditions.

According to the series of search operations for a guide route, a route pattern most suitably satisfying the conditions in the route point condition table 18 and the route point condition table for genre 21 are stored in the guide route storage unit 2 as guide route data. A navigation operation using the guide route data stored in the guide route storage unit 2 is the same as that in the first embodiment. An explanation of the navigation operation is omitted.

As a result, the user can efficiently move from a start point to a destination via plural route points by holding this navigation device to move such that a present location overlaps a guide route. Moreover, since route points of the food and drink genre do not continue, it is possible to guide the user to a preferable route pattern in which route points for taking a rest and other route points are alternately located.

In the fifth embodiment, a route pattern judged as eligible by the eligible route judgment unit 61 is selected as guide route data. However, it is also possible that, as in the second to the fourth embodiment, a route pattern judged as ineligible is updated by the route pattern update unit and the optimum route selection unit selects a route pattern from the updated route pattern list 19 as guide route data. In particular, in the case of a route pattern judged as ineligible because route points of a genre marked "○ (conforming)" continue, the route pattern update unit only has to update the route pattern to add route points of a genre marked "X (non-conforming)" among these continuing route points. Arrival times at the other route points may be adjusted to conform to guide times according to the route pattern to be added.

In the fifth embodiment, as shown in FIG. 4, all restaurants of "restaurant", "curry house", and "café" are marked "○ (conforming)" in common. However, besides, for example, it is also possible that "café" is classified into a genre "coffee shop" to prohibit route points of "café" and coffee shops from continuing and permit the route points of "café" and route points of "restaurant" and "curry shop" to continue.

Moreover, in the fifth embodiment, it is judged by the eligible route judgment unit 61 whether route points of a genre marked "○ (conforming)" continue in a route pattern. However, besides, for example, it is also possible that the route pattern creation unit 17 does not create a route pattern in which route points of a genre marked "○ (conforming)" continue.

As described above, in the fifth embodiment, the eligible route judgment unit 61 judges whether a route pattern continuously passes through route points of the food and drink genre. Only when the route pattern does not continuously pass through the route points of the food and drink genre, the eligible route judgment unit 61 selects the route pattern as a guide route. Therefore, it is possible to prevent a route pattern in which route points of the food and drink genre continue from being selected as a guide route.

Sixth Embodiment

A navigation device according to a sixth embodiment of the invention I includes, as in the first to the fifth embodiments, the guide route creation unit 1, the guide route storage unit 2, the GPS receiver 3, the map database 4, the guide display creation unit 5, and the display unit 6. However, the guide route creation unit 1 is constituted as described below.

Figure 11:
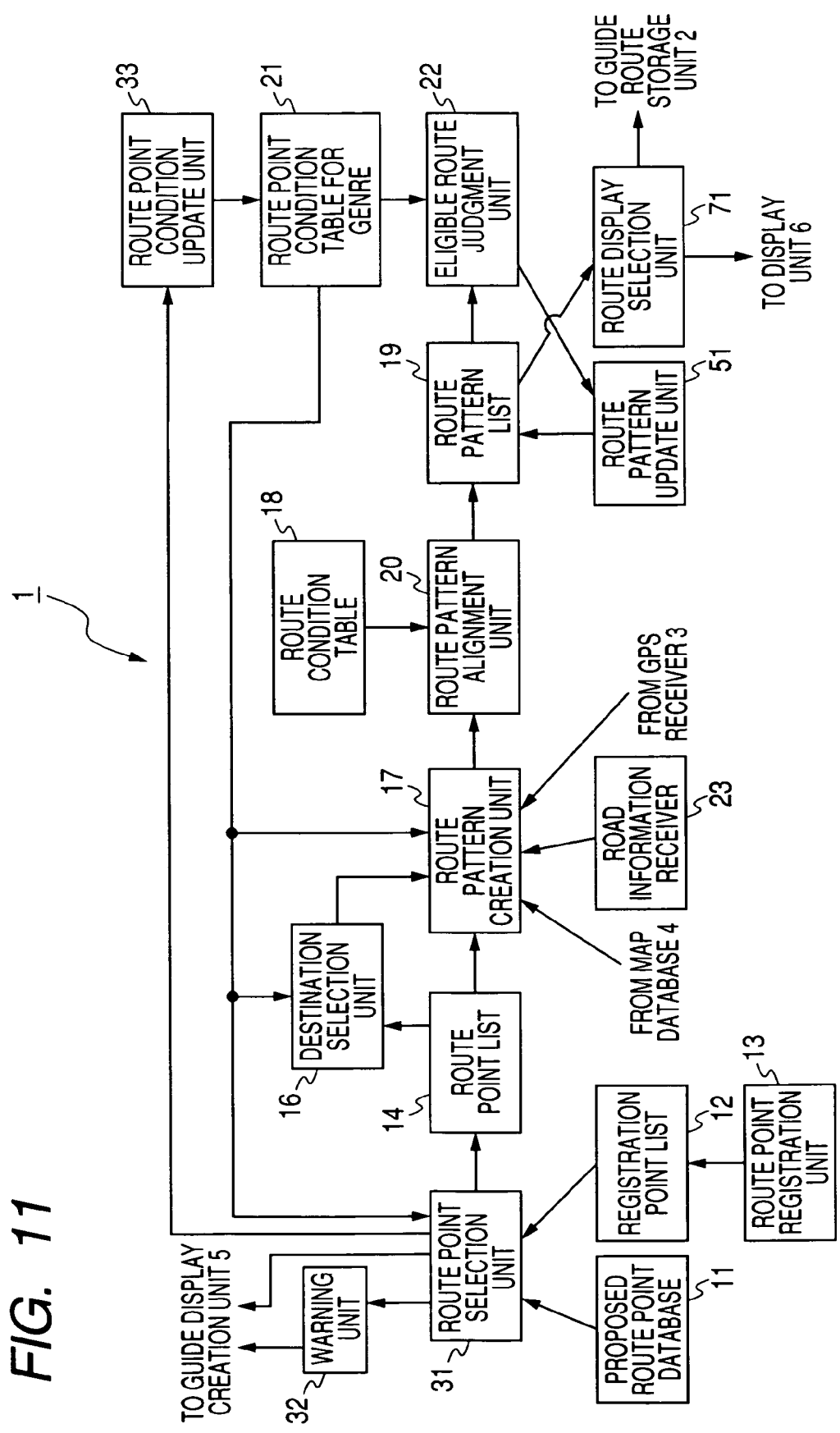
FIG. 11 is a block diagram showing a detailed constitution of a guide route creation unit according to a sixth embodiment of the invention I.

FIG. 11 is a block diagram showing a detailed constitution of the guide route creation unit 1 according to the sixth embodiment of the invention I. The guide route creation unit 1 includes the proposed route point database 11, the route point registration unit 13 that creates the registered point list 12, the route point selection unit 31 that creates the route point list 14, the warning unit 32, the destination selection unit 16, the route pattern creation unit 17, the route point condition table 18, the route pattern alignment unit 20 that creates the route pattern list 19, the route point condition table for genre 21, the route point condition update unit 33, the eligible route judgment unit 22, the route pattern update unit 51, and a route display selection unit 71 serving as selecting means.

The route display selection unit 71 causes the display unit 6 serving as display means to display one or more route patterns among the plural route patterns registered in the route pattern list 19 and causes the guide route storage unit 2 to store a route pattern selected according to this display as guide route data. Components of the navigation device other than the above have the same functions as the components with the same names of the navigation device in the fifth embodiment. Thus, the components are denoted by reference numerals identical with those in the fifth embodiment and explanations of the components are omitted.

Operations of the navigation device according to the sixth embodiment will be explained.

The eligible route judgment unit 22 judges whether the plural route patterns registered in the route pattern list 19 conform to the conditions in the route point condition table for genre 21 in order from a top route pattern in the route pattern list 19. The route pattern update unit 51 updates a route pattern of a route judges as ineligible by the eligible route judgment unit 22 to conform to the conditions in the route point condition table for genre 21. Specifically, the route pattern update unit 51 adds a route point to the route pattern or delay a departure time in the route pattern. Consequently, a route from the top route pattern in the route pattern list 19 to a route pattern judged as eligible by the eligible route judgment unit 22 conforms to the conditions in the route point condition table for genre 21.

Figure 12:
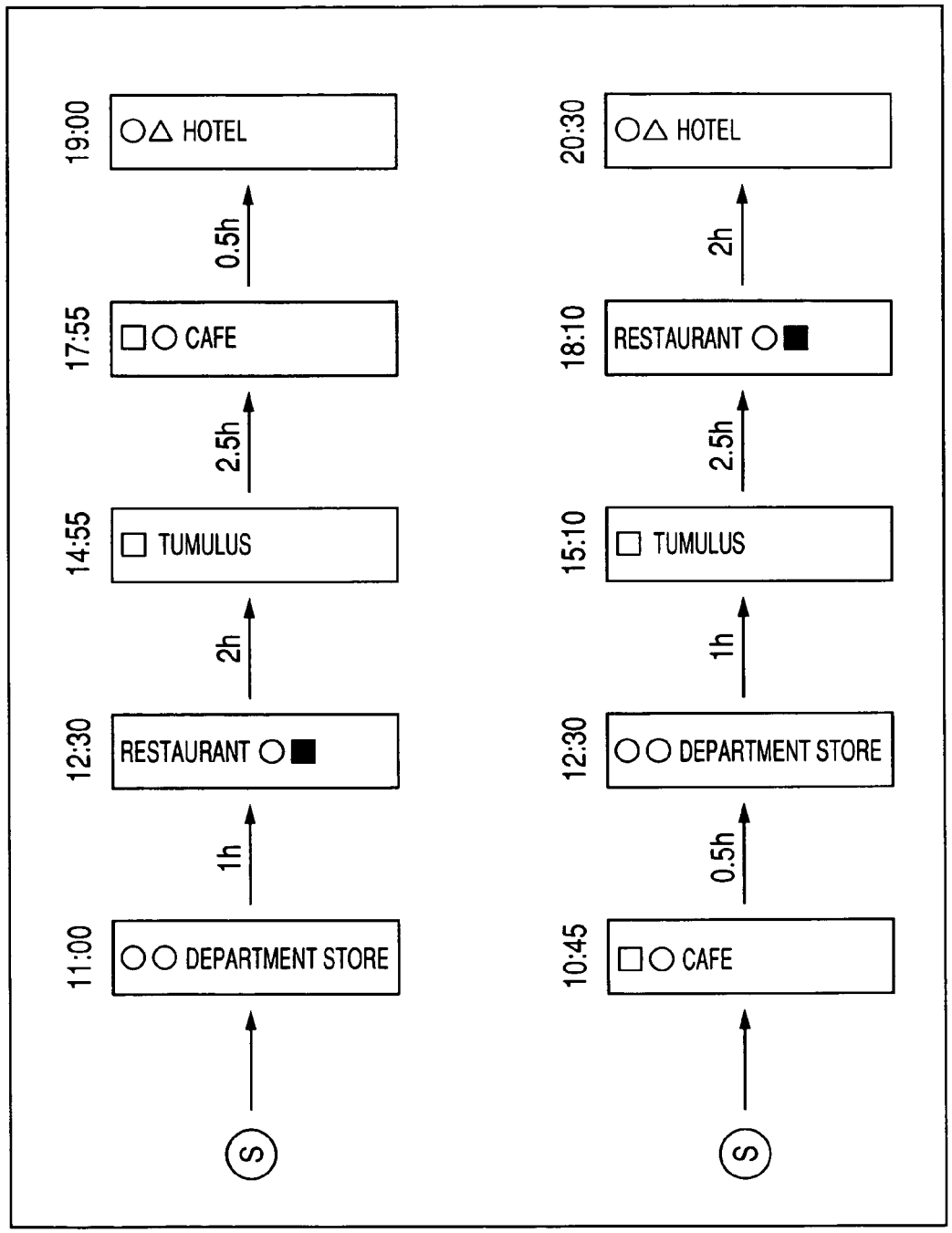
FIG. 12 is a display screen example showing an example of a selection screen displayed on a display unit in the sixth embodiment of the invention I.

The route display selection unit 71 causes the display unit 6 to display an image of a selection screen for a route pattern. FIG. 12 shows an example of a selection screen displayed on the display unit 6 in the sixth embodiment of the invention. In the selection screen in FIG. 12, a display image of two route patterns is displayed at upper and lower two stages. In the display image of the respective route patterns, a start point (S in FIG. 12) and plural route points are arranged in a routing order of the points from the left side to the right side and arrival times at the respective route points and stay times at the route points are allocated. Departure times from the route points may be displayed instead of the stay times at the route points. In this way, the route display selection unit 71 causes the display unit 6 to display two or more route patterns among the plural route patterns registered in the route pattern list 19.

Various methods are conceivable as a method of allocating the two or more route patterns to the selection screen. For example, the route display selection unit 71 may allocate and display the plural route patterns in one selection screen as shown in FIG. 12 or may switch and display a selection screen for each route pattern. For example, in the case in which the plural route patterns are displayed in one selection screen, when a size of the selection screen is larger than a screen size of the display unit 6, a scroll bar scrolling on a screen only has to be displayed together with the route patterns or the selection screen only has to be divided into each screen size of the display unit 6 and displayed.

The route display selection unit 71 may cause the display unit 6 to display all of the plural route patterns registered in the route pattern list 19 or may cause the display unit 6 to display only a part of the route patterns. The route display selection unit 71 may cause the display unit 6 to display the plural route patterns in the order in the route pattern list 19 or may cause the display unit 6 to display the route patterns in order from one conforming to the conditions in the route point condition table for genre 21, for example, in order from one with an earliest arrival time at a final destination.

When only a part of the plural route patterns registered in the route pattern list 19 are displayed, the route display selection unit 71 may cause the display unit 6 to display only a route pattern conforming to the conditions in the route point condition table for genre 21 or may cause the display unit 6 to display route patterns conforming to the conditions and route patterns not conforming to the conditions in a mixed state.

When the route display selection unit 71 causes the display unit 6 to display route patterns conforming to the conditions in the route point condition table for genre 21 and route patterns not conforming to the conditions in a mixed state, it is advisable that the route display selection unit 71 causes the display unit 2 to display the route patterns not conforming to the conditions in the route point condition table for genre 21 in a display state (e.g., a color) different from a display state of the route patterns conforming to the conditions at least in a place where the conditions are not satisfied. Consequently, the user can visually distinguish the route patterns conforming to the conditions in the route point condition table for genre 21 and the route patterns not conforming to the conditions easily.

For the plural route patterns registered in the route pattern list 19, the route display selection unit 71 may cause the display unit 6 to display plural display conditions (categories) such as an order of earliness, an order of inexpensiveness, and an order of excellence of scenery as tags or the like of a GUI (Graphical User Interface) and cause the display unit 6 to display plural route patterns selected from the route pattern list 19 according to the tags in an order of the display conditions.

When the user selects one route pattern according to the display on the display unit 6, the route display selection unit 71 causes the guide route storage unit 2 to store the route pattern selected by the user as guide route data. According to the series of search operations for a guide route, the route pattern selected by the user is stored in the guide route storage unit 2 as guide route data. Since other navigation operations are the same as those in the fourth embodiment, explanations of the navigation operations are omitted. The user can efficiently move from a start point to a destination via plural route points by holding this navigation device to move such that a present location overlaps a guide route.

As described above, according to the sixth embodiment of the invention I, the route display selection unit 71 causes the display unit 6 to display two or more route patterns and it is possible to perform navigation in a route pattern selected by the user according to the display. Therefore, compared with the case in which the navigation device fixedly select one route pattern, it is possible to execute navigation on a guide route on which the user can reach the respective route points in a state the user considers preferable. For example, the user selects a route, an arrival time at a destination of which is not earliest but has a preferable order of routing of plural route points, it is possible to execute navigation on a guide route corresponding to the desire.

In particular, in the sixth embodiment, the route pattern update unit 51 updates a route pattern not judged as eligible by the eligible route judgment unit 22 and the route display selection unit 71 causes the display unit 6 to display route patterns including the route pattern updated. Therefore, for example, it is possible to display a route pattern that is not judged as eligible in the judgment by the eligible route judgment unit 22 but is updated by the route pattern update unit 51 to satisfy the conditions of the route point condition table 18 and the route point condition table for genre 21 or a route pattern that is not updated enough to satisfy the conditions of the route point condition table 18 and the route point condition table for genre 21 but is updated to satisfy the conditions to a certain degree on the display unit 6 and cause the user to select a route pattern.

In the sixth embodiment, the route display selection unit 71 selects two or more route patterns from the route pattern list 19 in which time and the like of respective route patterns are calculated in advance in the route pattern creation unit 17 and route patterns are the route patterns are aligned by the route pattern alignment unit 20. Besides, for example, it is also possible that, first, the route pattern creation unit 17 calculates time and the like for route patterns that are displayed by the route display selection unit 71 on the display unit 6 at a time and the route pattern creation unit 17 calculates time and the like of other route patterns according to operation by the user.

Seventh Embodiment

A navigation device according to a seventh embodiment of the invention I includes, as in the first to the sixth embodiments, the guide route creation unit 1, the guide route storage unit 2, the GPS receiver 3, the map database 4, the guide display creation unit 5, and the display unit 6. However, the guide route creation unit 1 is constituted as described below.

Figure 13:
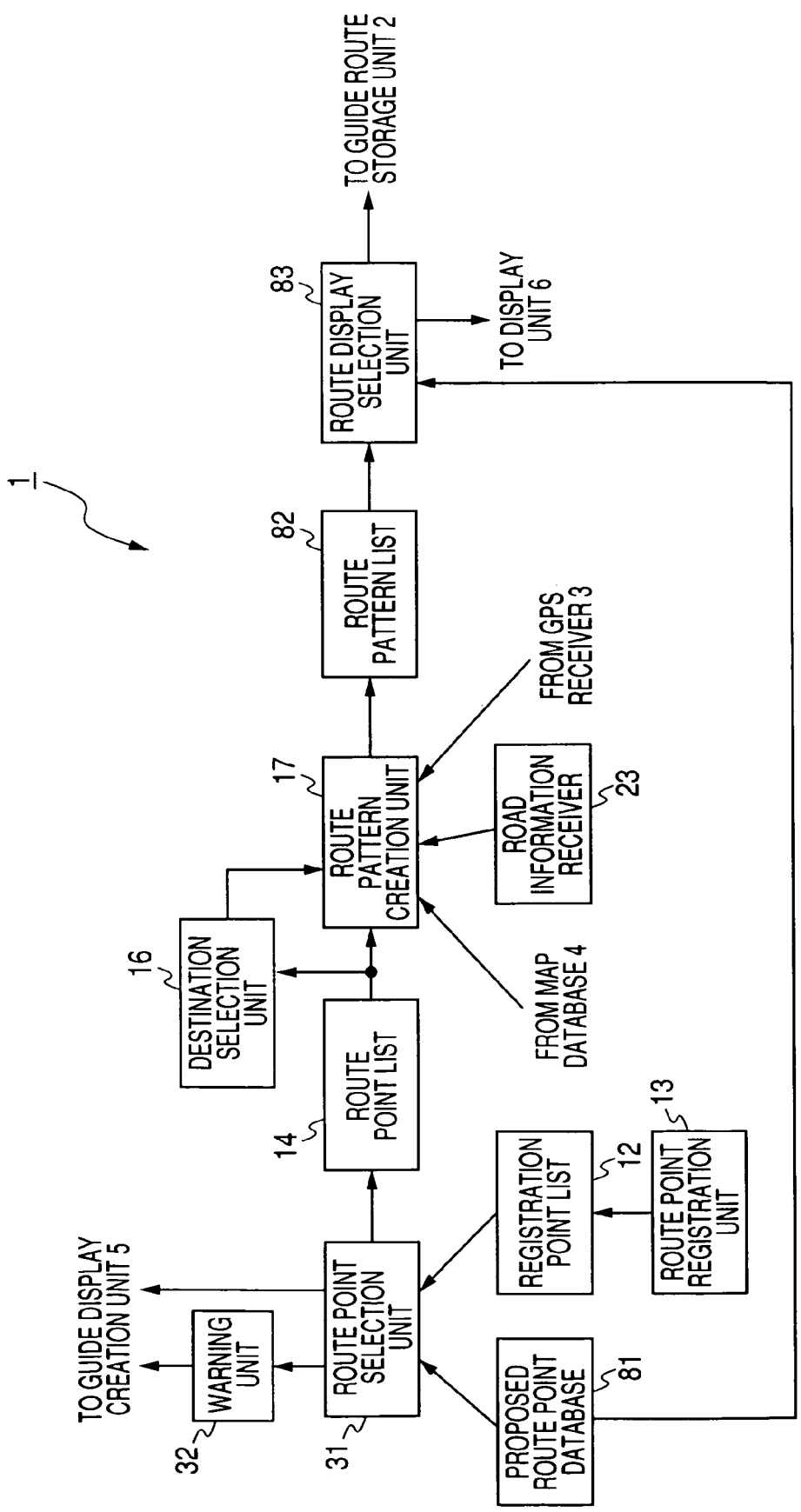
FIG. 13 is a block diagram showing a detailed constitution of a guide route creation unit according to a seventh embodiment of the invention I.

FIG. 13 is a block diagram showing a detailed constitution of the guide route creation unit 1 according to the seventh embodiment of the invention I. The guide route creation unit 1 includes a proposed route point database 81, the route point registration unit 13 that creates the registered point list 12, the route point selection unit 31 that creates the route point list 14, the warning unit 32, the destination selection unit 16, the route pattern creation unit 17, a route pattern list 82 that stores a route pattern created by the route pattern creation unit 17, and a route display selection unit 83 serving as selecting means.

FIG. 14 is a table showing a data structure of the proposed route point database 81 in FIG. 13. The proposed route point database 81 has a record for each proposed route point. In FIG. 14, each row corresponds to each record. Each record includes a name of a proposed route point, routing conditions of the proposed route point, spot information of the proposed route point, and the like. The routing conditions of the proposed route point include a genre of the proposed route point, advisability on setting of a route point as a destination, a guide time, and a stay time. For example, in a record shown in a first row in FIG. 14, "Sea Paradise" is registered as a name of a proposed route point, "amusement" is registered as a genre of the proposed route point, "○ (advisable)" is registered as the advisability on setting of a route point as a destination, "10:00 to 22:00" is registered as the guide time, and "-(no designation)" is registered as the stay time.

The route display selection unit 83 causes the display unit 6 serving as display means to display two or more route patterns among plural route patterns registered in the route pattern list 82. The route display selection unit 83 causes the guide route storage unit 2 to store a route pattern selected according to this display as guide route data.

Components of the navigation device other than the above have the same functions as the components with the same names of the navigation device in the sixth embodiment. Thus, the components are denoted by reference numerals identical with those in the sixth embodiment and explanations of the components are omitted.

Operations of the navigation device according to the seventh embodiment will be explained.

The route point selection unit 31 displays proposed route points in the proposed route point database 81 and proposed route points in the registered point list 12 on the display unit 6 and registers proposed route points selected according to the display in the route point list 14. The destination selection unit 16 selects one route point as a destination out of plural route points registered in the route point list 14. For example, when five proposed route points shown in FIG. 14 and a home are selected, the destination selection unit 16 selects the home as a destination.

The route pattern creation unit 17 creates plural route patterns leading from a start point to the destination passing through all the route points registered in the route point list 14 in different orders. The route pattern creation unit 17 registers the plural route patterns created in the route pattern list 82.

FIG. 15 is a table showing a part of plural route patterns created by the route pattern creation unit 17 when the five proposed route point indicated by A to E in FIG. 14 and the home are registered in the route point list 14. In FIG. 15, three route patterns are shown in three rows. Each of the route patterns includes a routing order of plural route points and arrival times at the respective route points.

Figure 16:
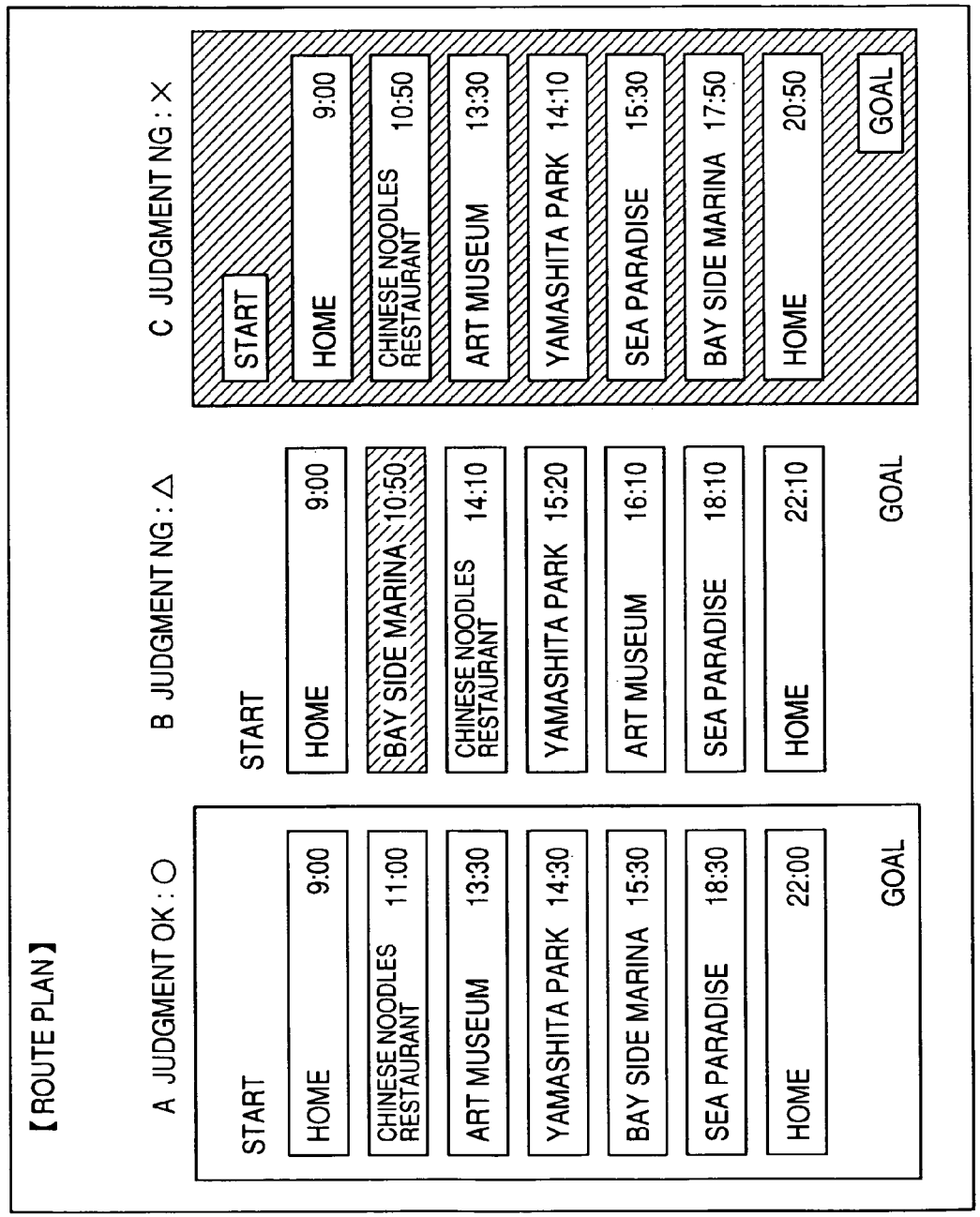
FIG. 16 is a diagram showing an example of a display screen on a display unit based on a route pattern list in FIG. 15.

The route display selection unit 83 causes the display unit 6 to display two or more route patterns among the plural route patterns registered in the route pattern list 82. FIG. 16 is a diagram showing an example of a display screen of the display unit 6 based on the route pattern list 82 in FIG. 15. Three route patterns are arranged in three lines to be displayed on the display screen shown in FIG. 16. In each of the lines, respective route points from a start point (a home) to a destination (the home) are displayed in order from top to bottom and arrival times at the respective route points are displayed in association with one another. In FIG. 16, one route pattern (route) is displayed in one line. However, one route pattern may be displayed in one row. In FIG. 16, three route patterns are displayed. However, the number of route patterns displayed is not limited to three.

The route display selection unit 83 does not simply display the plural route patterns registered in the route pattern list 82 on the display unit 6 but evaluates the respective route patterns on the basis of route point conditions in the proposed route point database 81 and displays the route patterns in a representation corresponding to a result of the evaluation.

FIG. 17 is a table showing a result of judgment concerning the plural route patterns in FIG. 16. As shown in FIG. 17, an arrival time at a route point B (Bay Side Marina) of a route pattern in a second row is "10:50", which does not satisfy a route point condition (11:00 to 21:00) in the proposed route point database 81 shown in FIG. 14.

As shown in FIG. 17, an arrival time at the route point B (Bay Side Marina) of a route pattern in a third row is "17:50", which does not satisfy the route point condition (11:00 to 21:00) in the proposed route point database 81. An arrival time at a route point E (Chinese Noodle Restaurant) of the route pattern in the third row is "10:50", which does not satisfy a route point condition (11:00 to 23:00) in the proposed route point database 81 shown in FIG. 14.

When a route pattern satisfies route point conditions of all route points, the route display selection unit 83 displays the route pattern without reversing the route pattern and displays "○" (completely consistent) indicating that an overall judgment result is satisfactory on the display of the route pattern. In FIG. 17, a route pattern on the left side is displayed in this way.

When only a route point condition of one route point is not satisfied, the route display selection unit 83 reverses to display the route point and displays "Δ" (partially inconsistent) indicating that an overall judgment result is partially inconsistent on the display of the route pattern. In FIG. 17, a route pattern in the middle is displayed in this way.

When route point conditions of two or more route points are not satisfied, the route display selection unit 83 reverses to display an entire route pattern and displays "X" (inconsistent) indicating that an overall judgment result is inconsistent on the display of the route pattern. In FIG. 17, a route pattern on the right side is displayed in this way.

Since parts not satisfying the route point conditions in the proposed route point database 81 are reversed and displayed in this way, the user can easily grasp evaluations of the respective route patterns in the display on the display unit 6. Since the plural route patterns are displayed side by side as shown in FIG. 16, the user can compare the plural route patterns one another and select a route pattern that the user considers most appropriate for the user.

When the user select one route pattern out of the plural route patterns displayed, the route display selection unit 83 causes the guide route storage unit 2 to store the route pattern selected as a guide route. As a result, it is possible to select a route pattern that is not selected as a guide route under the route point conditions in the proposed route point database 81, for example, a route pattern shown in the middle in FIG. 16 as a guide route.

According to the series of search operations for a guide route, a route pattern selected by the user is stored in the guide route storage unit 2 as guide route data. Since other navigation operations are the same as those in the fourth embodiment, explanations of the navigation operations are omitted. The user can efficiently move from a start point to a destination via plural route points by holding this navigation device to move such that a present location overlaps a guide route.

Figure 18:
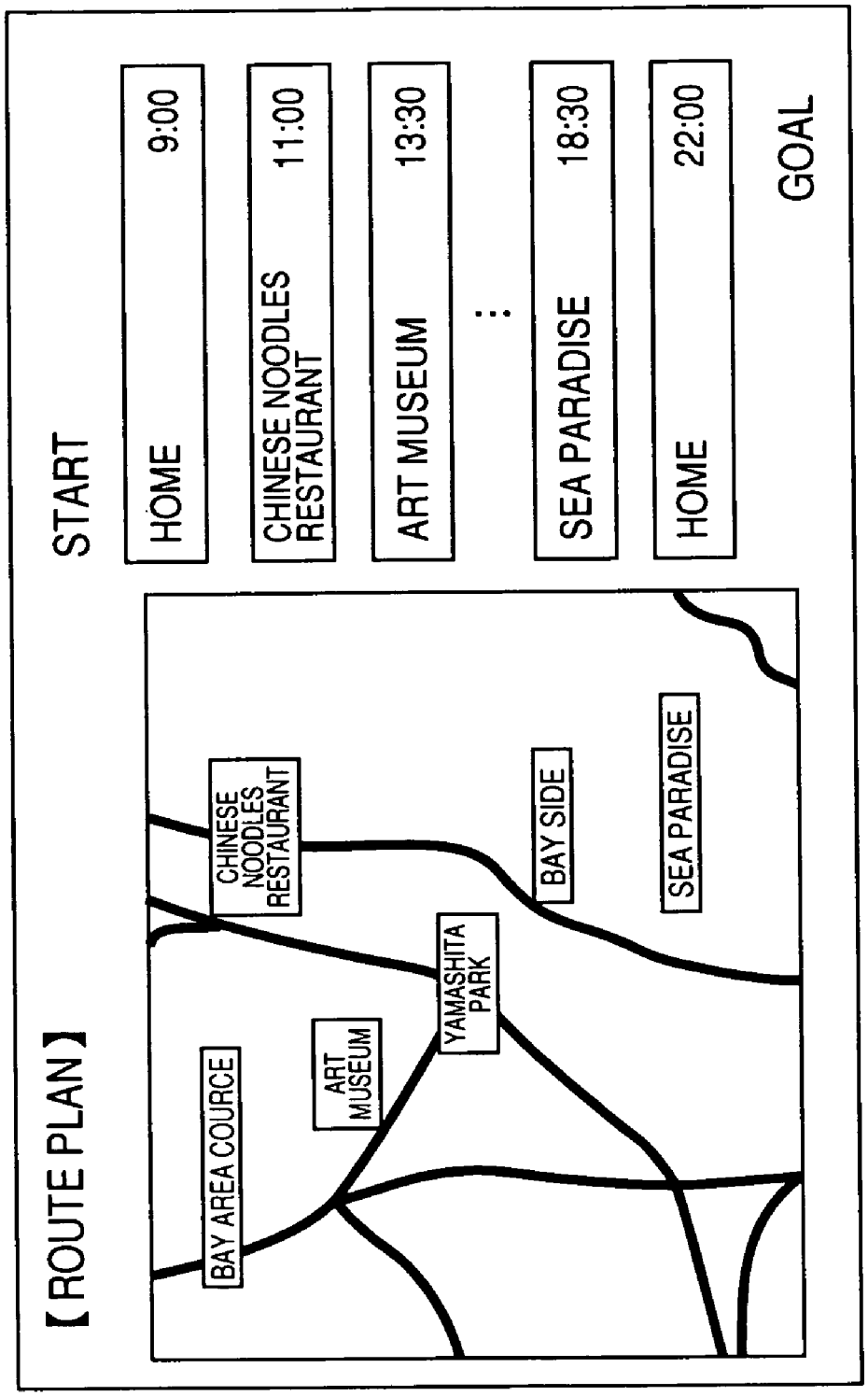
FIG. 18 is a diagram showing an example of a detailed display screen for routes displayed when a route pattern at the left end is selected on a selection screen for a route pattern shown in FIG. 16.

When a route pattern is selected on the selection screen for a route pattern shown in FIG. 16, the route display selection unit 83 may display a detailed display screen with the route superimposed on a map on the display unit 6. FIG. 18 is a diagram showing an example of a detailed display screen for a route that is displayed when a route pattern at the left end is selected on the selection screen for a route pattern shown in FIG. 16. On the detailed display screen for a route in FIG. 18, a detailed display section in which a route of a route pattern is superimposed on a map including the entire route pattern is displayed on the left side of the screen. Plural route points are displayed on the right side of the screen in a routing order thereof together with arrival times at the respective route point. The map displayed may be a map obtained by simplifying or deforming a map of the map database 4. The respective route points are desirably displayed as marking on the map or displayed in an enlarged form.

Figure 19:
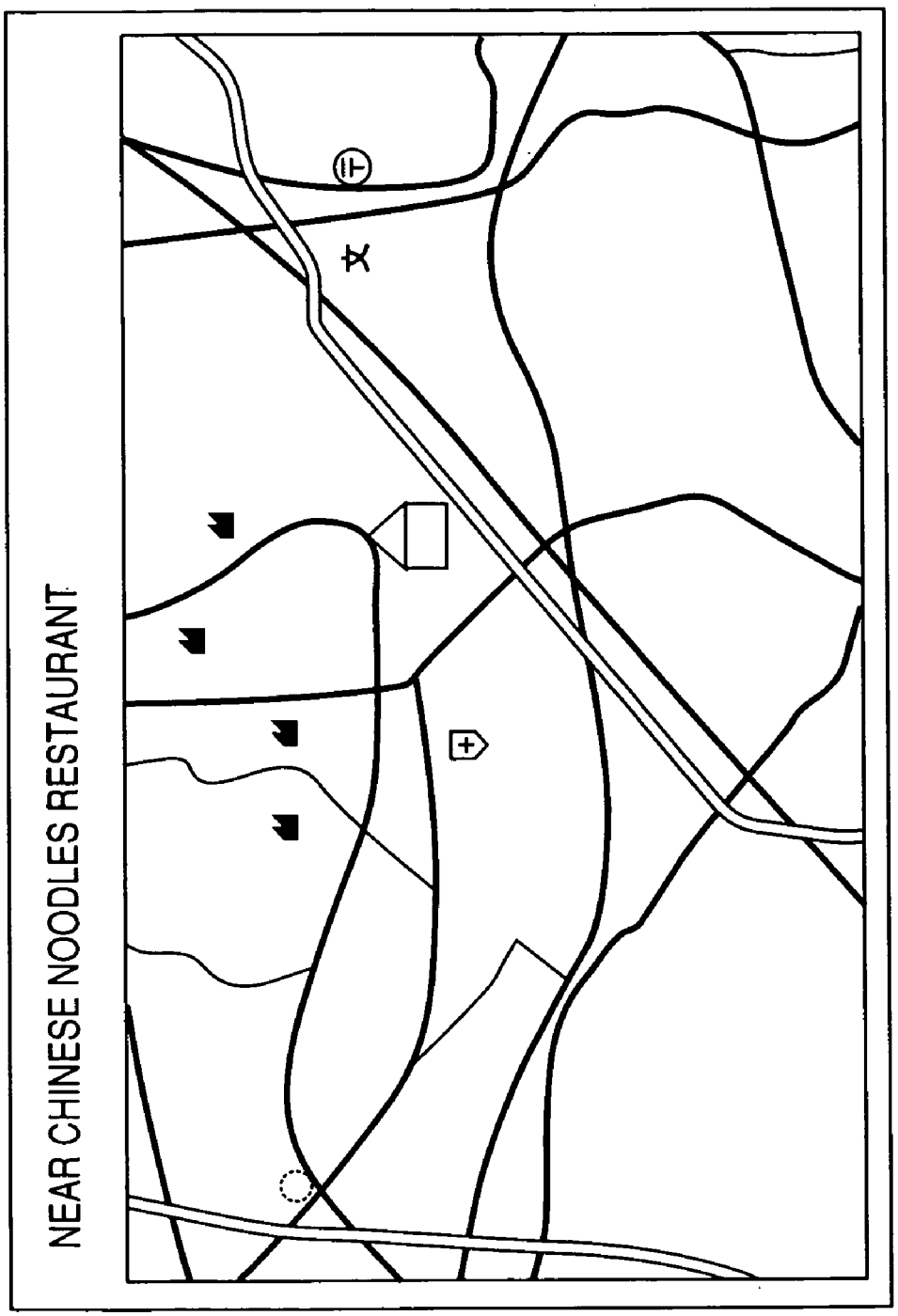
FIG. 19 is a diagram showing an example of a display screen displayed when a location of a route point "Chinese noodles restaurant" is selected.

When an arbitrary part on the map is selected on the display screen in FIG. 18, the route display selection unit 83 may display a display screen for a map shown in the part selected and a part around the selected part on the display unit 6. The map displayed is desirably a map of the map database 4 that is a map used in actual route guide. The displayed map may be scrolled. FIG. 19 is a diagram showing an example of a display screen that is displayed when a location of the route point "Chinese Noodle Restaurant" is selected.

Figure 20:
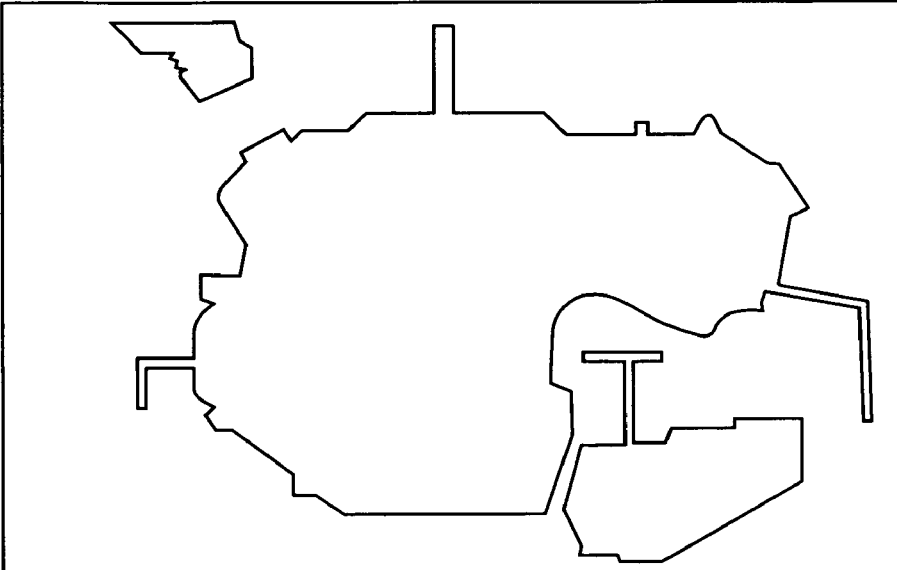
FIG. 20 is a diagram showing an example of a display screen displayed when a route point "Sea Paradise" is selected.

Moreover, when a route point is selected on the display screen in FIG. 16 or 18, the route display selection unit 83 may read out spot information concerning the selected route point from the proposed route point database 81 and display the information read out on the display unit 6. FIG. 20 is a diagram showing an example of a display screen that is displayed when the route point "Sea Paradise" is selected.

The spot information may be acquired from a predetermined information providing device in a remote location via the Internet or the like rather than from the proposed route point database 81. In this case, link information such as a URL (Uniform Resource Locator) indicating a location of the information providing device at the remote location only has to be stored in the proposed route point database 81 instead of the spot information concerning the route point. Information acquired from the predetermined information providing device at the remote location may be acquired on a real time basis or may be acquired in advance. This spot information may be stored in a recording medium not shown in the figure such as a semiconductor memory.

Since detailed information concerning the respective route patterns and detailed information concerning the respective route points are displayed in this way, the user can select an optimum route suitable for the user while checking content of the respective route patterns in detail.

As described above, according to the seventh embodiment, the route display selection unit 83 causes the display unit 6 to display two or more route patterns and it is possible to perform navigation in a route pattern selected by the user according to the display. Therefore, compared with the case in which the navigation device fixedly select one route pattern, it is possible to execute navigation on a guide route on which the user can reach the respective route points in a state the user considers preferable.

In the example in the seventh embodiment, the route display selection unit 83 reverses to display a part not satisfying the route point conditions in the proposed route point database 81. However, the part not satisfying the route point conditions may be represented by, for example, showing the part in a different color or enlarging the part.

In the seventh embodiment, in displaying the plural route patterns registered in the route pattern list 82, the route display selection unit 83 displays the plural route patterns on one display screen. However, the route display selection unit 83 may display the route patterns one by one.

In the seventh embodiment, the route display selection unit 83 displays the plural route patterns registered in the route pattern list 82 in an order of registration of the route patterns. However, it is also possible that the plural route patterns registered in the route pattern list 82 are classified into, for example, route patterns satisfying the route point conditions and the other route patterns and the plural route patterns are displayed by dividing the display screen for each of the classifications. Moreover, the route display selection unit 83 may display tabs or the like indicating the classifications and switch a classification to be displayed according to selection of the tabs. The plural route patterns may be classified into a pattern for traveling around quickly, a pattern for traveling around the respective route points slowly (e.g., a route pattern created using time obtained by adding a predetermined time to a set stay time for each genre as stay times at the respective route points or a route pattern created using time obtained by multiplying a set stay time for each genre by a predetermined ratio larger than 1 as stay times at the respective route points. In this case, the extended stay times may be used for all the route points or the extended stay times may be used for a part of the route points, for example, the set stay time for each genre is directly used for a stay time at a restaurant and the extended stay time is used for a stay time at a famous place), a pattern for passing through a place with beautiful scenery (e.g., a route pattern arranged to more preferentially pass a link with beautiful scenery than other links by performing predetermined weighting based on excellence of scenery in calculating cost of links), a pattern for making it possible to arrive at a destination late, a pattern preferentially using general roads, and the like and displayed. This makes it possible to classification and selection according to preference of driving of the user. When a route pattern that was selected before is present, the route pattern may be preferentially displayed or may be displayed in a special form different from those of the other route patterns.

In the seventh embodiment, the route pattern creation unit 17 creates a route pattern on the basis of the route point conditions registered in the proposed route point database 81 and the route display selection unit 83 controls representation of display. Besides, for example, route point conditions for route search may be set by allowing the user to update the content of the proposed route point database 81 or causing the user to input route point conditions of the respective route points at the time of route search. The route pattern creation unit 17 and the route display selection unit 83 may learn the setting or the selection of a route pattern by the user and update the content of the proposed route point database 81 on the basis of a result of the learning. The learning and the setting may be performed for each user or each type of passengers of a vehicle.

In the seventh embodiment, the route pattern creation unit 17 creates a route pattern by adding up stay times at the respective route points and traveling times among the route points. Besides, for example, the route pattern creation unit 17 may create a route pattern passing through plural route points by, when a departure time from a start point and an arrival time at a destination are designated, putting stay times at the respective route points and moving times among the route points in a time frame between the departure time and the arrival time. In this case, the stay times at the respective route point may be shorter than the stay times in the proposed route point database 81. In that case, the route display selection unit 83 only has to perform display control, for example, reverse to display a route point, a stay time at which is shorter than a stay time in the proposed route point database 81.

Eighth Embodiment

A navigation device according to an eight embodiment of the invention I includes, as in the first to the seventh embodiments, the guide route creation unit 1, the guide route storage unit 2, the GPS receiver 3, the map database 4, the guide display creation unit 5, and the display unit 6. However, the guide route creation unit 1 is constituted as described below.

Figure 21:
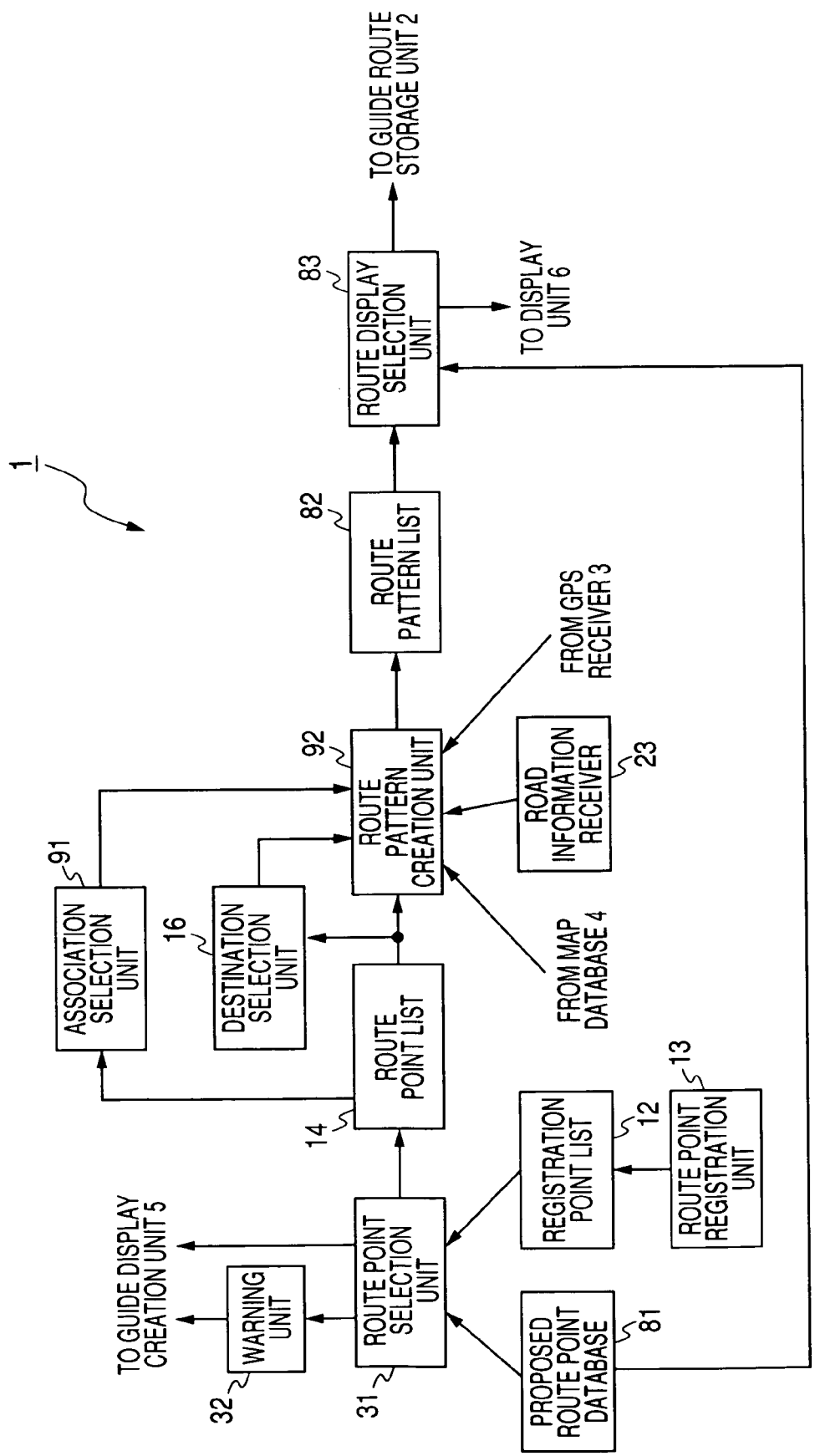
FIG. 21 is a block diagram showing a detailed constitution of a guide route creation unit according to an eighth embodiment of the invention.

FIG. 21 is a block diagram showing a detailed constitution of the guide route creation unit 1 according to the eighth embodiment of the invention I. The guide route creation unit 1 includes the proposed route point database 81, the route point registration unit 13 that creates the registered point list 12, the route point selection unit 31 that crates the route point list 14, the warning unit 32, the destination selection unit 16, an association selection unit 91, a route pattern creation unit 92 serving as creating means, the route pattern list 82 that stores a route pattern created by the route pattern creation unit 92, and the route display selection unit 83 serving as selecting means.

The association selection unit 91 performs association of the plural route points registered in the route point list 14 on the basis of operation by a user or conditions for association set in advance.

The route pattern creation unit 92 creates plural route patterns leading from a start point to a destination passing through all the route points registered in the route point list 14 in different orders. Concerning the plural route points associated by the association selection unit 91, the route pattern creation unit 92 creates a route pattern only for a routing order limited by the association.

Components of the navigation device other than the above have the same functions as the components with the same names of the navigation device in the seventh embodiment. Thus, the components are denoted by reference numerals identical with those in the seventh embodiment and explanations of the components are omitted.

Operations of the navigation device according to the eighth embodiment will be explained.

The route point selection unit 31 displays the proposed route points in the proposed route point database 81 and the proposed route points in the registered point list 12 on the display unit 6 and registers proposed route points selected according to the display in the route point list 14. The destination selection unit 16 selects one route point out of the plural route points registered in the route point list 14 as a destination.

The association selection unit 91 associates the plural route points registered in the route point list 14 on the basis of operation by the user or conditions for association set in advance. Specifically, for example, the association selection unit 91 associates the route points such that a route pattern continuously passes through a route point "A" and a route point "B" or associates the route points to designate a routing order of the route point "A" and the route point "B".

The route pattern creation unit 92 creates plural route patterns leading from a start point to the destination passing through all the route points registered in the route point list 14 in different orders. Concerning the plural route points associated by the association selection unit 91 the route pattern creation unit 92 creates route patterns only for a routing order limited by the association.

Specifically, for example, when the route points are associated such that a route pattern continuously passes through the route point "A" and the route point "B", the route pattern creation unit 92 performs processing for creation of a route pattern only for a route pattern passing through the route point "B" following the route point "A" and a route pattern passing through the route point "A" following the route point "B". Besides, for example, when the route points are associated such that a route pattern passes from the route point "A" to the route point "B", the route pattern creation unit 92 performs processing for creation of route patterns only for a route pattern passing through the route point "B" following the route point "A". In other words, for example, in the case in which a route pattern passes through four route points A, B, C, and D, when the route point "A" and the route point "B" are associated with each other, the route pattern creation unit 92 performs, regarding "A→B" as imaginary one route point "a" and regarding "B→A" as another imaginary route point "b", processing for creating all route patterns passing through plural route points for combinations of two route points "a, C, D" and "b, C, D".

The plural route patterns created by the route pattern creation unit 92 are registered in the route pattern list 82. The route display selection unit 83 causes the display unit 6 to display two or more route patterns among the plural route patterns registered in the route pattern list 82.

When the user selects one route pattern out of the plural route patterns displayed, the route display selection unit 83 causes the guide route storage unit 2 to store the selected route pattern as a guide route. As a result, it is possible to select a route pattern that is not selected as a guide route under the route point conditions in the proposed route point database 81, for example, a route pattern shown in the middle in FIG. 16 as a guide route.

According to the series of search operations for a guide route, a route pattern selected by the user is stored in the guide route storage unit 2 as guide route data. Since other navigation operations are the same as those in the sixth embodiment, explanations of the navigation operations are omitted. The user can efficiently move from a start point to a destination via plural route points by holding this navigation device to move such that a present location overlaps a guide route.

As described above, according to the eighth embodiment, the route pattern creation unit 92 creates route patterns passing through plural route points within a range of routing order conditions of the route points associated by the association selection unit 91 and it is possible to perform navigation in a route pattern selected out of the route patterns.

In the eighth embodiment, route patterns are created after plural route points are associated. However, out of the plural route patterns created by the route pattern creation unit 17, only route patterns conforming to routing conditions in the association selection unit 91 may be registered in the route pattern list 82 or may be displayed on the display unit 6.

In the eighth embodiment, the plural route points are associated on the basis of the routing conditions in the association selection unit 91. However, the plural route points may be associated on the basis of genres (types) of route points in the proposed route point database 81.

The embodiments described above are examples of a preferred embodiment of the invention I. However, the invention I is not limited to this. Various modifications and alterations of the invention I are possible.

For example, in the embodiments, the route pattern alignment unit 20 aligns plural route patterns created by the route pattern creation unit 17 in an order complying with the conditions in the route point condition table 18 and, then, the eligible route judgment units 22 and 61 judge eligibility of the respective route patterns in order from a first pattern in the route point condition table 18. Besides, for example, the eligible route judgment units 22 and 61 may search for, every time judgment of the route patterns is performed, plural route patterns not aligned in accordance with the conditions in the route point condition table to extract the route patterns one by one out of the plural route patterns and judge eligibility for the extracted route patterns in order.

In the embodiments of the invention I, it is judged, according to a routing order, whether route point conditions at the respective route points are satisfied. However, it may be judged, according to a reverse order of the routing order with an arrival time at a destination fixed, whether route point conditions at the respective route points are satisfied.

In the embodiments, route points are selected out of the route points registered in advance in the proposed route point database 11 and the registered point list 12. Besides, for example, route points may be inputted at the time of search.

In the embodiments, the route point condition table 18 and the route point condition table for genre 21 are prepared prior to search for a guide route. Besides, for example, search conditions for a guide route and route point conditions of respective route points may be inputted at the time of route search.

In the embodiments, the guide route creation unit 1 is built in the navigation device. Besides, for example, the guide route creation unit 1 may be realized in a network system that includes a server and client terminals connected via a network. In this case, a route pattern of a guide route found by the guide route creation unit 1 only has to be stored in a portable semiconductor memory such as a memory card by a client terminal and used by inserting the semiconductor memory in a card reader of the navigation device. Besides, a communication function and a client terminal function may be given to the navigation device to cause the guide route storage unit 2 to store a route pattern of a guide route using the server apparatus.

According to the invention I, there is an operational effect that it is possible to find a guide route that passes through plural route points such that a user can reach the respective route points in a desired state.

[Invention II]

First Embodiment

Figure 22:
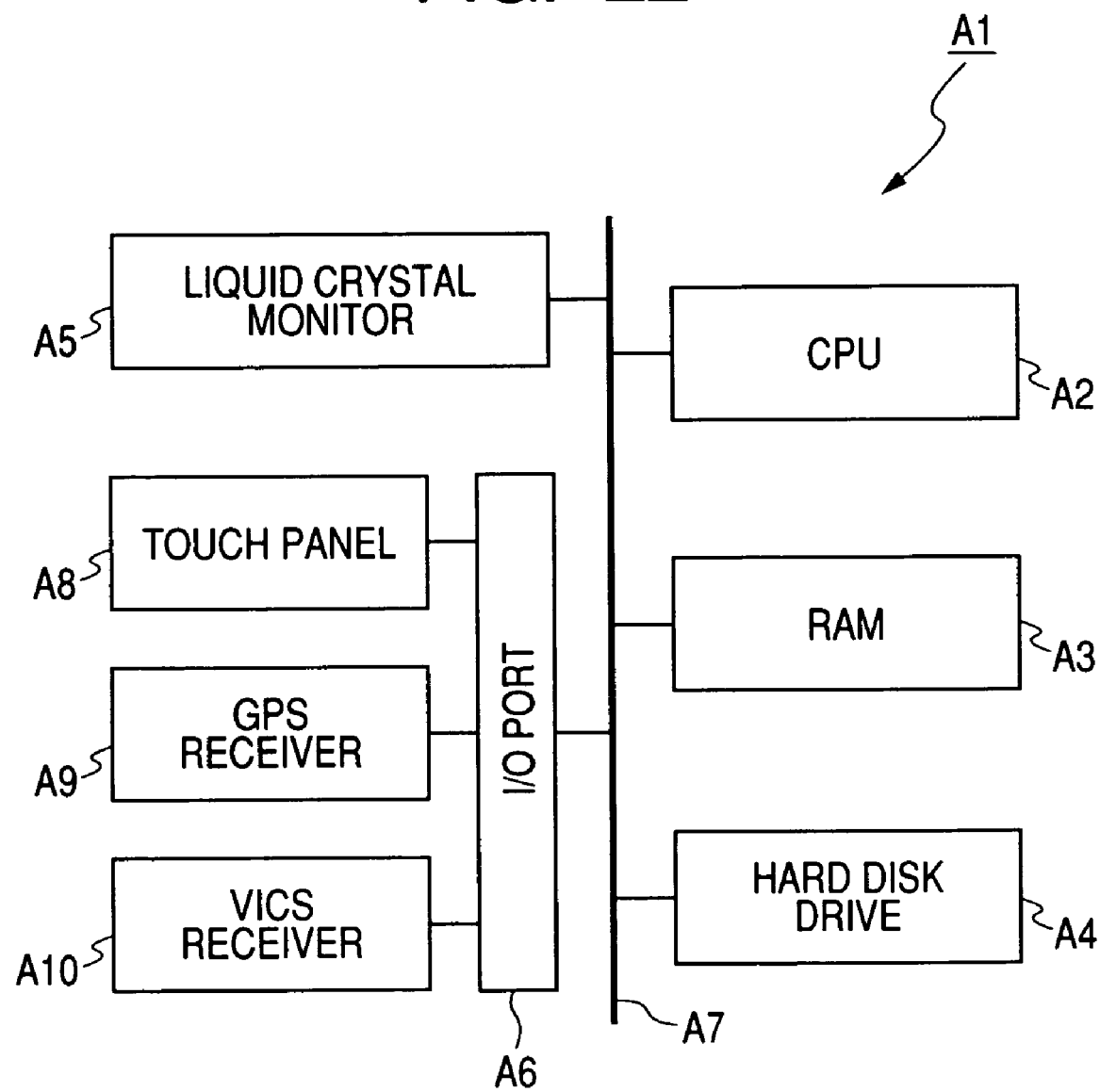
FIG. 22 is a block diagram showing a hardware configuration of a vehicle-mounted navigation device according to an embodiment of the invention.

FIG. 22 is a diagram showing a hardware configuration of a vehicle-mounted navigation device A1 according to a first embodiment of the invention II.

The vehicle-mounted navigation device A1 according to the invention II includes a CPU (Central Processing Unit) A2, a RAM (Random Access Memory) A3, a hard disk drive A4, a liquid crystal monitor A5, an I/O (Input/Output) port A6, and a system bus A7 connecting the devices.

A touch panel A8 that is disposed to overlap a display screen of the liquid crystal monitor A5 and outputs a signal indicating a pressed part, a GPS receiver A9 serving as present location updating means for receiving a radio wave from a GPS (Global Positioning System) satellite and outputs a value of present latitude and longitude, and a VICS receiver A10 that receives an FM wave, a light beacon, or a radio wave beacon and outputs VICS (Vehicle Information and Communication System) information included therein are connected to the I/O port A6. Traffic control information, traffic jam information, and the like are included in the VICS information.

The liquid crystal monitor A5 may be connected to the system bus A7 via the I/O port A6. A speed pulse generator that outputs a pulse corresponding to speed of a vehicle, a gyro sensor that indicates a moving direction of the vehicle, and the like are connected to the I/O port A6.

Figure 23:
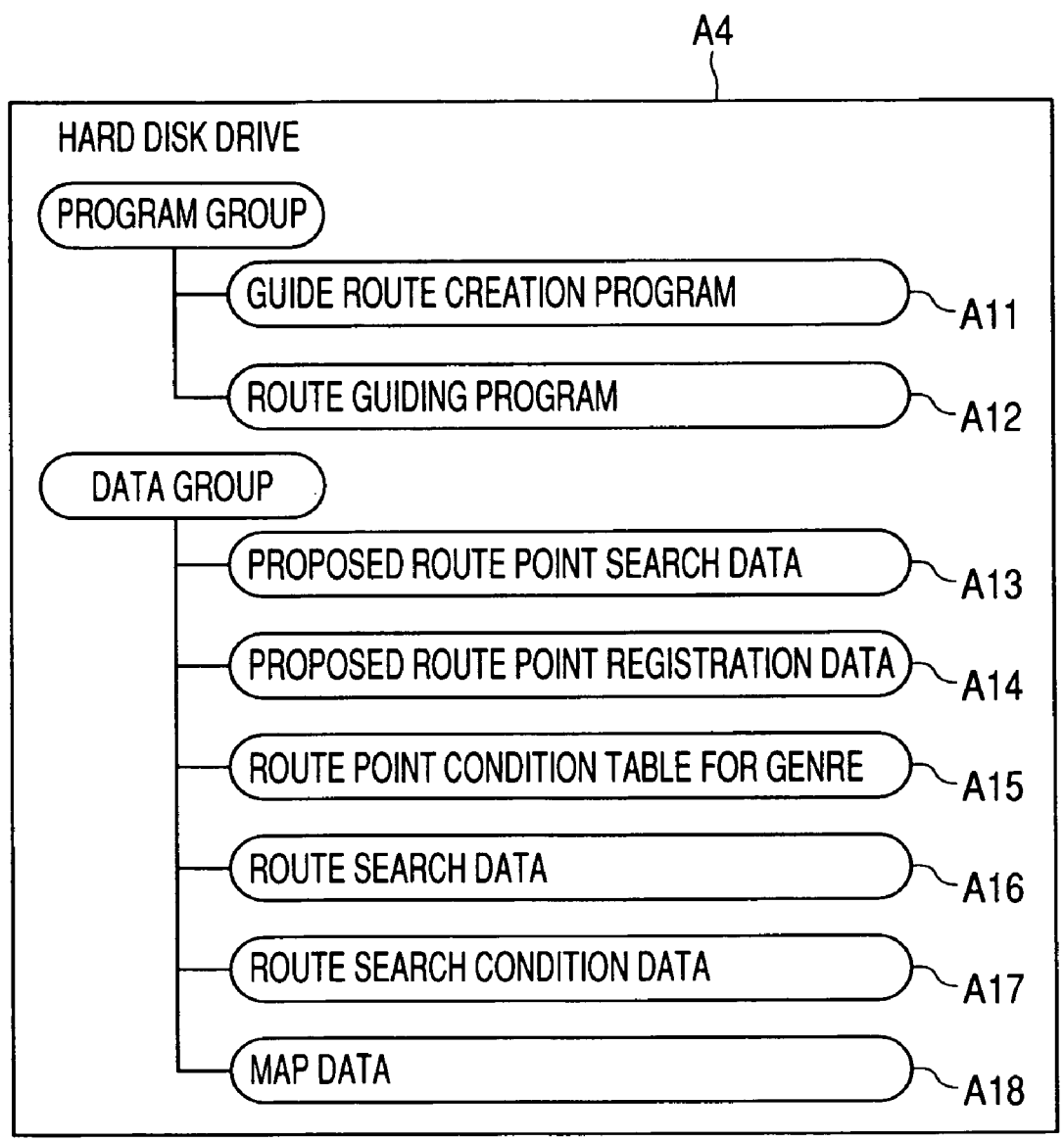
FIG. 23 is a diagram for explaining content stored in a hard disk drive in FIG. 22.

Content stored in the hard disk drive A4 in FIG. 22 is shown in FIG. 23.

A program group and a data group are stored in the hard disk drive A4. The program group in the hard disk drive A4 includes a guide route creation program A11 and a route guiding program A12. The data group in the hard disk drive A4 includes proposed route point search data A13, proposed route point registration data A14, route point condition table for genre A15, route search data A16, route search condition data A17, and map data A18.

It is also possible that the proposed route point search data A13, the route point condition table for genre A15, the route search data A16, the map data A18, and the like are recorded in a computer readable recording medium, which can be inserted in and removed from the vehicle-mounted navigation device A1, and the vehicle-mounted navigation device A1 reads these data from this recording medium. The program group and the data group may be recorded in different recording media.

The proposed route point search data A13 has a record for each proposed route point. Information on one proposed route point is included in each record in the proposed route point search data A13. For example, a name, a genre, advisability of selection as a destination, a guide time frame, a value indicating a point, and the like of the proposed route point are included therein. Proposed route points in the proposed route point search data A13 are registered in advance, for example, before shipment of the vehicle-mounted navigation device A1. For example, restaurants, amusement facilities, and the like are included in the proposed route points.

FIG. 26 is a diagram for explaining an example of the proposed route point search data A13 in FIG. 23. In FIG. 26, registration information of each record is shown in each row. For example, information on an accommodation facility named "○Δ hotel" is included in a record shown in a first row in FIG. 26. As specific registration information of the accommodation facility, a name C21 "○Δ hotel", a genre C22 "hotel", data C23 "○" indicating the accommodation facility is selectable as a destination, a guide time frame C24 "15:00 to", and a value of a point C25 "1234" are included therein.

A value indicating a point of a proposed route point registered in the proposed route point search data A13 may be a value based on latitude and longitude of the proposed route point or may be another value associated with the value based on the latitude and longitude, for example, a value of a map code (registered trademark). Further, the value may be a value based on latitude and longitude of the proposed route point itself or may be a value based on latitude and longitude of a point associated with a proposed route point such as a car park cooperating with the proposed route point.

The proposed route point registration data A14 has plural records for each proposed route point registered by the user. Information on one proposed route point is included in each record in the proposed route point registration data A14. For example, a name, a genre, a guide time frame, a value indicating a point, and the like of the proposed guide point are included therein. As such a proposed route point, for example, there is a home.

The proposed point condition table for genre A15 has plural records for each genre. The genre is an item for classifying proposed route points. Information on one genre is included in each record in the route point condition table for genre A15. For example, information on a name of the genre and a stay time is included therein. As a name of a genre, for example, there are restaurant, famous place, hotel, and the like.

FIG. 27 is a diagram for explaining an example of the route point condition table for genre A15 in FIG. 23. In FIG. 27, each record is shown in each row. Each record in the route point condition table for genre A15 includes genre data C31 indicating a name of a genre and stay time data C32. An initial value and values corresponding to the number of passengers and types of passengers in a vehicle (a companion or a member) constitute the stay time data C32 of each genre.

Specifically, for example, the stay time data C32 of a genre "hotel" is constituted by "18 hours" as the initial value, "13 hours" in the case in which the number of passengers is one, "(blank" in the case in which the number of passengers is two and the passenger type is a lover, "(blank)" in the case in which the number of passengers is two and the passenger type is a couple, "12 hours" in the case in which the number of passengers is two and the passenger type is "with a child", "12 hours" in the case in which the number of passengers is three to four and the passenger type is family members, "15 hours" in the case in which the number of passengers is three to four and the passenger type is family members (a grandfather and a grandmother), "13 hours" in the case in which the number of passenger is three to four and the passenger type is family members (with relatives), "(blank)" in the case in which the number of passengers is three to four and the passenger type is "neighbors", "(blank)" in the case in which the number of passengers is three to four and the passenger type is friends, "(blank)" in the case in which the number of passengers is five to eight and the passenger type is family members, "(blank)"

in the case in which the number of passengers is five to eight and the passenger type is friends, "(blank)" in the case in which the number of passengers is nine or more and the passenger type is family members, and "(blank)" in the case in which the number of passengers is nine or more and the passenger type is friends. In the case of the number of passengers and the passenger type indicated as "(blank)", the initial value is used.

The route search data A16 has plural kinds of node information and plural kinds of link information. The node information is information on a point such as an intersection and is constituted by identification information of the point, a value indicating the point, a list of identification numbers of links connected to a node of the node information, and the like. The link information is information on a route such as a road connecting nodes and is constituted by identification information of the route, a list of identification numbers of nodes connected, and the like.

The route search condition data A17 is data indicating search conditions in searching for a recommended route, for example, data indicating selection standards for selecting one route out of plural routes such as a shortest distance, a shortest moving time, preference of general roads, and preference of toll roads. The selection standards are not limited to one standard item and may be combinations of plural standard items.

The map data A18 is data obtained by converting a map of a predetermined region such as the entire Japan, the Kanto district, or Tokyo into image data consisting of plural dots. The respective dots have luminance information. There are a road map, a housing map, and the like as the map. The map data A18 has values indicating points of the respective dots of the map data A18.

Figure 28:
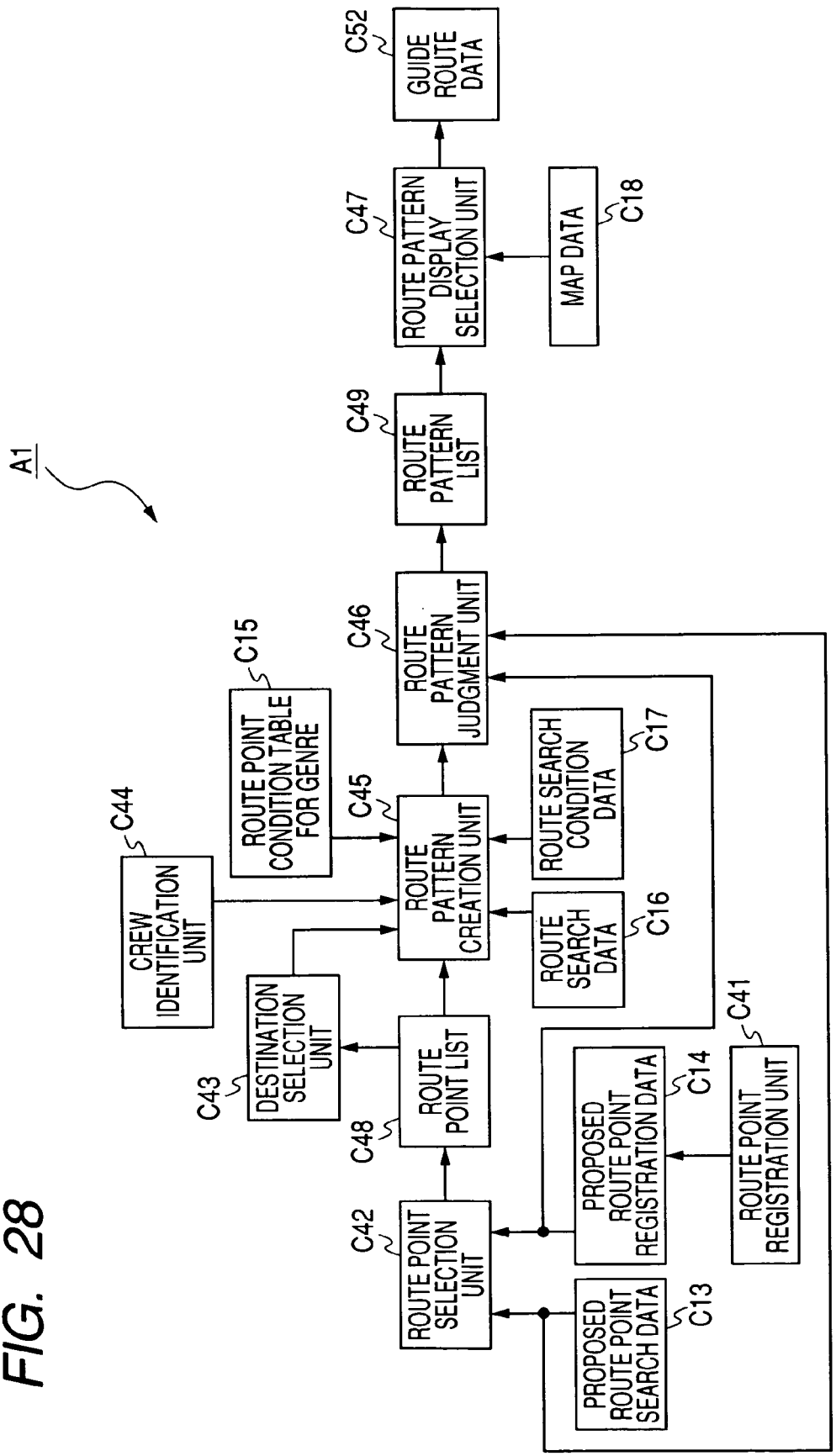
FIG. 28 is a block diagram showing a guide route creation function realized in the vehicle-mounted navigation device when a central processing unit executes a guide route creation program.

The guide route creation program A11 is executed by the central processing unit A2 to realize a guide route creation function in the vehicle-mounted navigation device A1. FIG. 28 is a block diagram showing the guide route creation function that is realized in the vehicle-mounted navigation device A1 when the central processing unit 2 in FIG. 22 executes the guide route creation program A11.

When the central processing unit A2 executes the guide route creation program A11, a proposed route point registration unit C41, a route point selection unit C42 serving as route point designating means, a destination selection unit C43, a passenger specifying unit C44 serving as passenger specifying means, a route pattern creation unit C45 serving as stay time selecting means and route pattern creating means, a route pattern judgment unit C46 serving as a part of route pattern selecting means, and a route pattern display selection unit C47 serving as a part of route pattern selecting means are realized in the vehicle-mounted navigation device A1.

The proposed route point registration unit C41 registers a new proposed route point in the proposed route point registration data A14, changes content of records registered in the proposed route point registration data A14, and deletes a record registered in the proposed route point registration data A14.

The route point selection unit C42 selects proposed route points from the proposed route point search data A13 and the proposed route point registration data A14 as route points and registers the route points selected in a route point list C48. It is possible to register two or more route points in the route point list C48.

The destination selection unit C43 selects a destination out of the route points registered in the route point list C48.

The passenger specifying unit C44 outputs information concerning the number of passengers and a type of passengers of a vehicle.

The route pattern creation unit C45 creates route patterns for moving from a start point (e.g., a present location) to the destination via the route points (excluding a route point as the destination) registered in the route point list C48. The route pattern creation unit C45 searches for routes among the start point, the route points, and the destination on the basis of the route search data A16. The route patterns include routing order information concerning a routing order of the route points and guide time information such as arrival times at the respective route points.

The route pattern judgment unit C46 judges propriety of the route patterns created by the route pattern creation unit C45 (i.e., whether the user arrives at all the route points and the destination in an appropriate situation). The route pattern judgment unit C46 creates a route pattern list C49 and registers a route pattern judged as conforming to the route pattern list C49. The route pattern judgment unit C46 may register all the route patterns in the route pattern list C49 together with a result of the judgment on propriety.

The route pattern display selection unit C47 displays a route pattern registered in the route pattern list C49. In this case, the route pattern display selection unit C47 displays the route pattern to be superimposed on the map data A18 according to a request. The route pattern display selection unit C47 causes the hard disk drive A4 to store a route pattern selected by the user as guide route data.

Figure 29:
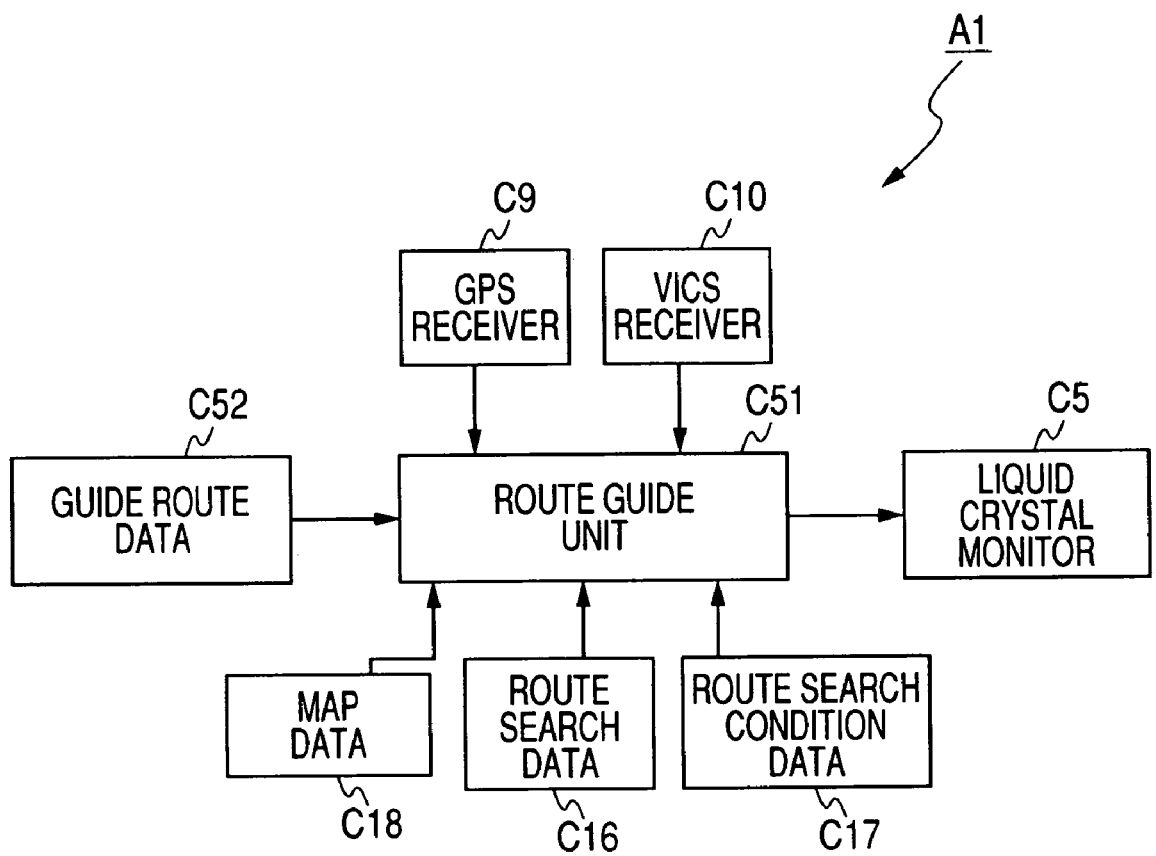
FIG. 29 is a block diagram showing a route guide function realized in the vehicle-mounted navigation device when the central processing unit executes a route guide program.

The route guide program A12 is executed by the central processing unit A2 to realize a route guide function in the vehicle-mounted navigation device A1. FIG. 29 is a block diagram showing the route guide function realized in the vehicle-mounted navigation device A1 when the central processing unit A2 executes the route guide program A12.

When the central processing unit A2 executes the route guide program A12, a route guide unit C51 is realized in the vehicle-mounted navigation device A1. The route guide unit C51 displays a map read from the map data A18, a present location specified on the basis of present latitude and longitude or the like of the GPS receiver A9, a guide image and text based on a guide route data C52 stored in the hard disk drive A4, and the like on the liquid crystal monitor A5.

Operations of the vehicle-mounted navigation device A1 according to the first embodiment of the invention II will be explained. This vehicle-mounted navigation device 1 registers, changes, or deletes a route point, creates a guide route, and actually guide the user to a route in accordance with the guide route on the basis of the constitution described above.

In registering, changing, or deleting a route point, in the vehicle-mounted navigation device A1, the proposed route point registration unit C41 outputs display data for registering, correcting, or deleting a proposed route point to the liquid crystal monitor A5. Consequently, a screen for registering, correcting, or deleting the proposed route point is displayed on the liquid crystal monitor A5.

On the basis of information created by the touch panel A8 according to operation by the user, the proposed route point registration unit C41 registers a new proposed route point in the proposed route point registration data A14, changes information on a proposed route point registered in the proposed route point registration data A14, or deletes the proposed route point registered from the proposed route point registration data A14.

Specifically, for example, in registering a route point, a name, a genre, a guide time, a value indicating a point, and the like of a proposed route point registered are displayed on the liquid crystal monitor A5. The proposed route point registration point C41 adds a record for registering a new proposed route point in the proposed route point registration data A14 on the basis of operation position information in an image outputted by the touch panel A8 according to operation by the user. The value C25 indicating a point of a proposed route point registered in the proposed route point registration data A14 may be directly inputted by the user. Besides, for example, it is also possible that the map data A18 is displayed on the liquid crystal monitor A5 to be scrollable, a point selected by the user is specified on the basis of operation information outputted from the touch panel A8, and the specified point is substituted by a value indicating the point.

Figure 30:
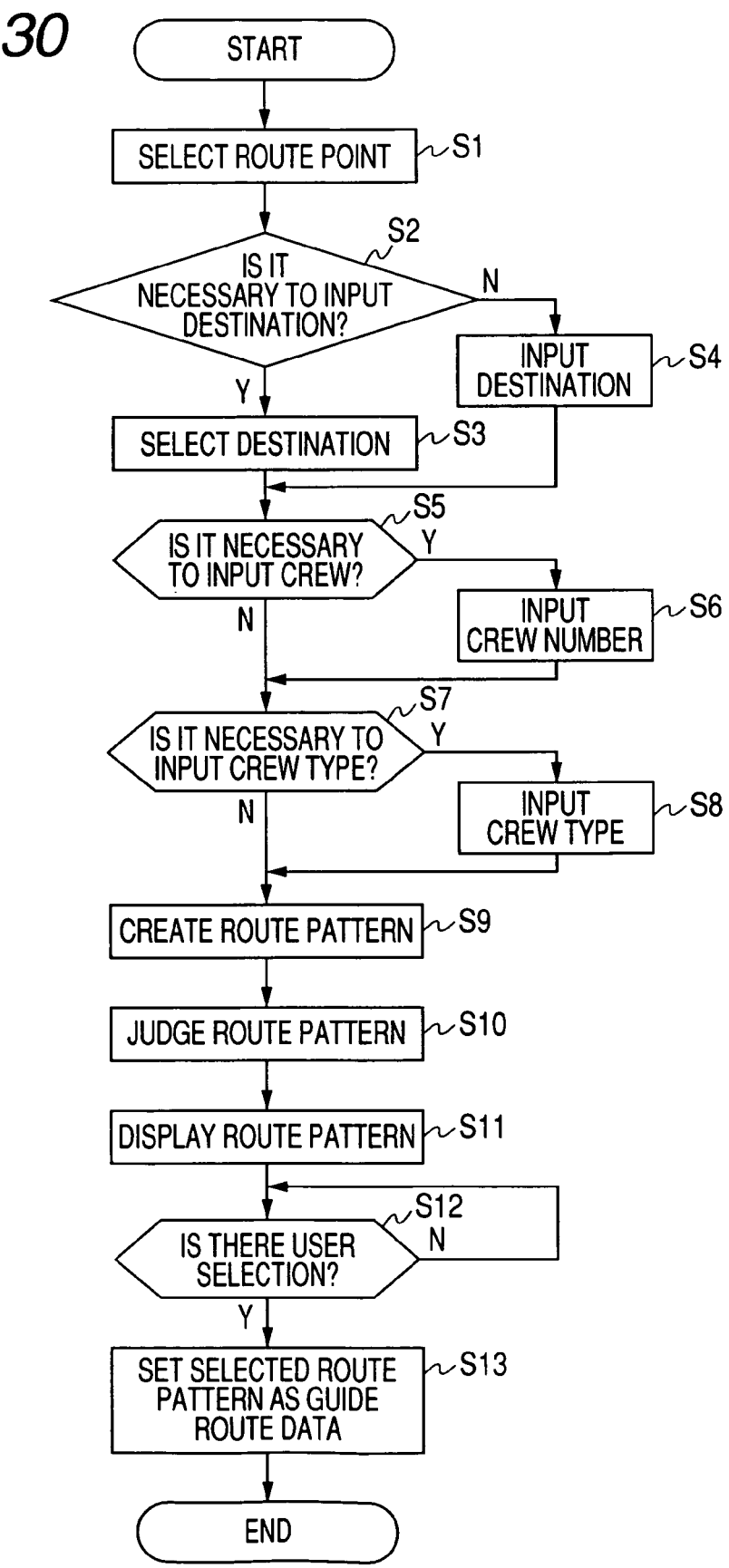
FIG. 30 is a flowchart showing guide route creation processing in the vehicle-mounted navigation device.

In creating a guide route, the vehicle-mounted navigation device A1 executes guide route creation processing. FIG. 30 is a flowchart showing the guide route creation processing in the vehicle-mounted navigation device A1 in FIG. 22.

In the guide route creation processing, first, the route point selection unit C42 selects proposed route points from the proposed route point search data A13 and the proposed route point registration data A14 as route points and registers the route points selected in the route point list C48 (step S1).

Specifically, the route point selection unit C42 causes the liquid crystal monitor A5 to display information in the proposed route point search data A13 and registered information in the proposed route point registration data A14. The route point selection unit C42 causes the liquid crystal monitor A5 to display a list of proposed route points according to display operation of the touch panel A8 by the user and selects a proposed route point displayed as a route point according to selection operation of the touch panel A8 by the user. The route point selection unit C42 creates the route point list C48 in the RAM A3 or the hard disk drive A4 and registers the route point selected in the route point list C48.

The user can select plural proposed route points. When plural proposed route points are selected by the user, the route point selection unit C42 registers all the proposed route points in the route point list C48 as plural route points.

The destination selection unit C43 selects a destination out of the route points registered in the route point list C48. Specifically, for example, the destination selection unit C43 judges whether a route point selectable as a destination is registered in the route point list C48 with reference to the proposed route point search data A13 (step S2). When a route point selectable as a destination is registered in the route point list C48, the destination selection unit C43 selects the route point as a destination (step S3). When a route point selectable as a destination is not registered in the route point list C48, the destination selection unit C43 displays a screen for causing the user to input a destination on the display monitor A5 and selects one route point as a destination according to operation of the touch panel A8 by the user in the display state (step S4). When a route point selectable as a destination is not registered in the route point list C48, the destination selection unit C43 may select, for example, a route point registered last as a destination.

Subsequently, the passenger specifying unit C44 outputs information on the number of passengers and a type of passengers of a vehicle. Specifically, for example, the passenger specifying unit C44 judges whether passenger input is necessary (step S5). For example, when only one route point is registered in the route point list C48, the route point is a destination and there is no place to stop off. Thus, it is unnecessary to take into account a stay time at the route point. Therefore, in this case, the passenger specifying unit C44 judges that passenger input is unnecessary. When plural route points are registered in the route point list C48, since it is necessary to take into account stay times at the route points, the passenger specifying unit C44 judges that passenger input is necessary.

When passenger input is necessary, the passenger specifying unit C44 displays a screen for inputting the number of passengers in a vehicle on the liquid crystal monitor A5 on the basis of a GUI (Graphical User Interface), specifies the number of passengers in the vehicle according to operation of the touch panel A8 by the user in the display state, and outputs information on the number of passengers (step S6).

Subsequently, the passenger specifying unit C44 judges whether passenger type input is necessary (step S7). In this judgment on necessity of passenger type input, processing corresponding to the number of route points is performed as in the judgment on necessary of passenger input. When input of a passenger type is necessary, the passenger specifying unit C44 displays a screen for inputting a passenger type on the liquid crystal monitor A5, specifies a passenger type according to operation of the touch panel A8 by the user in the display state, and outputs information on the passenger type (step S8).

Subsequently, the route pattern creation unit C45 creates a route pattern on the basis of the route point list C48, the destination, and the number of passengers and the passenger type in the vehicle (step S9).

Specifically, for example, first, the route pattern creation unit C45 determines a routing order of the route points registered in the route point list C48.

The route pattern creation unit C45 sets, for example, a present time as a departure time and adds a moving time from the start point to a first route point to the departure time. This moving time may be a traveling time of the route found in the route search data A16 in accordance with the route search condition data A17 or may be a traveling time simply calculated according to a distance from the start point to the first route point. Time of a result of this calculation is an arrival time at the first route point.

The route pattern creation unit C45 selects, on the basis of the information on the number of passengers and the passenger type from the passenger specifying unit C44, a stay time corresponding to the number of passengers and the like from the stay time data in the route point condition table for genre A15 and adds the stay time selected to the arrival time at the first route point. Time of a result of this calculation is a departure time from the first route point.

The route pattern creation unit C45 adds a moving time to the next route point to the departure time from the first route point. Time of a result of this calculation is an arrival time at a second route point.

The route pattern creation unit C45 repeats the processing for adding stay times at the respective route points and the processing for adding moving times among the route points described above until an arrival time at the destination is obtained and creates a route pattern.

When three or more route points (including a destination) are registered in the route point list C48, the route pattern creation unit C45 changes a routing order of the route points to create plural route patterns. When n (n is an integer equal to or larger than 2) route points are registered in the route point list C48, the number of routing orders different from one another is $_{n-1}P_{n-1}$.

The route pattern creation unit C45 may create route patterns for all combinations of the routing orders or may create route patterns for a part of the combinations. For example, when there are two route points close to each other, the route pattern creation unit C45 does not have to create a route pattern for a routing order in which a route passes through a distant route point between the route points. Consequently, it is possible to reduce an amount of processing of the route pattern creation unit C45.

FIG. 31 is a table showing an example of plural route patterns created by the route pattern creation unit C45 in FIG. 28. A record of each route pattern includes data C61 indicating a routing order of plural route points and data C62 indicating arrival times at the respective route points. In FIG. 31, three route patterns passing through the five route points A to E (including the route point A as a destination) in FIG. 5 are shown. For example, a route pattern in a first row is a route pattern passing through the route points in an order of "B→C→D→E→A". An arrival time at the route point B is "10:30", an arrival time at the route point C is "12:00", an arrival time at the route point D is "14:00", an arrival time at the route point E is "15:00", and an arrival time at the route point A is "18:00".

Subsequently, the route pattern judgment unit C46 judges propriety of the route patterns created by the route pattern creation unit C45 (step S10).

Specifically, for example, the route pattern judgment unit C46 judges, with reference to data of guide time frames in the proposed route point search data A13 and the proposed route point registration data A14 (i.e., time frames in which guide is possible, for example, a business time frame), whether the arrival times at the respective route points match the respective guide time frames. When the arrival times at all the route points match the guide time frames, the route pattern judgment unit C46 judges that the route patterns are conforming. When the arrival times at one or more route points do not match the guide time frames, the route pattern judgment unit C46 judges that the route patterns are nonconforming.

The route pattern creation unit C46 creates the route pattern list C49 and registers the route patterns judged as conforming in the route pattern list C49.

For example, when data of the three route patterns shown in FIG. 31 is supplied from the route pattern creation unit C45 to the route pattern judgment unit C46, if the three route patterns in FIG. 31 and the guide time frames of the proposed route point search data A13 in FIG. 26 are compared, in the route pattern in the first row in FIG. 31, the arrival time at the route point B and the arrival time at the route point D are not included in the guide time frame. Thus, the route pattern is judged as nonconforming. In a route pattern in a second row in FIG. 31, since the arrival time at the route point B is not included in the guide time frame, the route pattern is judged as nonconforming. In a route pattern in a third row in FIG. 31, since arrival times at all the route points are within the guide time frames, the route pattern is judged as conforming. Therefore, the route pattern judgment unit C46 registers only the route pattern in the third row among these three route patterns in the route pattern list C49.

Subsequently, the route pattern display selection unit C47 performs processing for selecting one route pattern out of the route patterns registered in the route pattern list C49.

Figure 24:
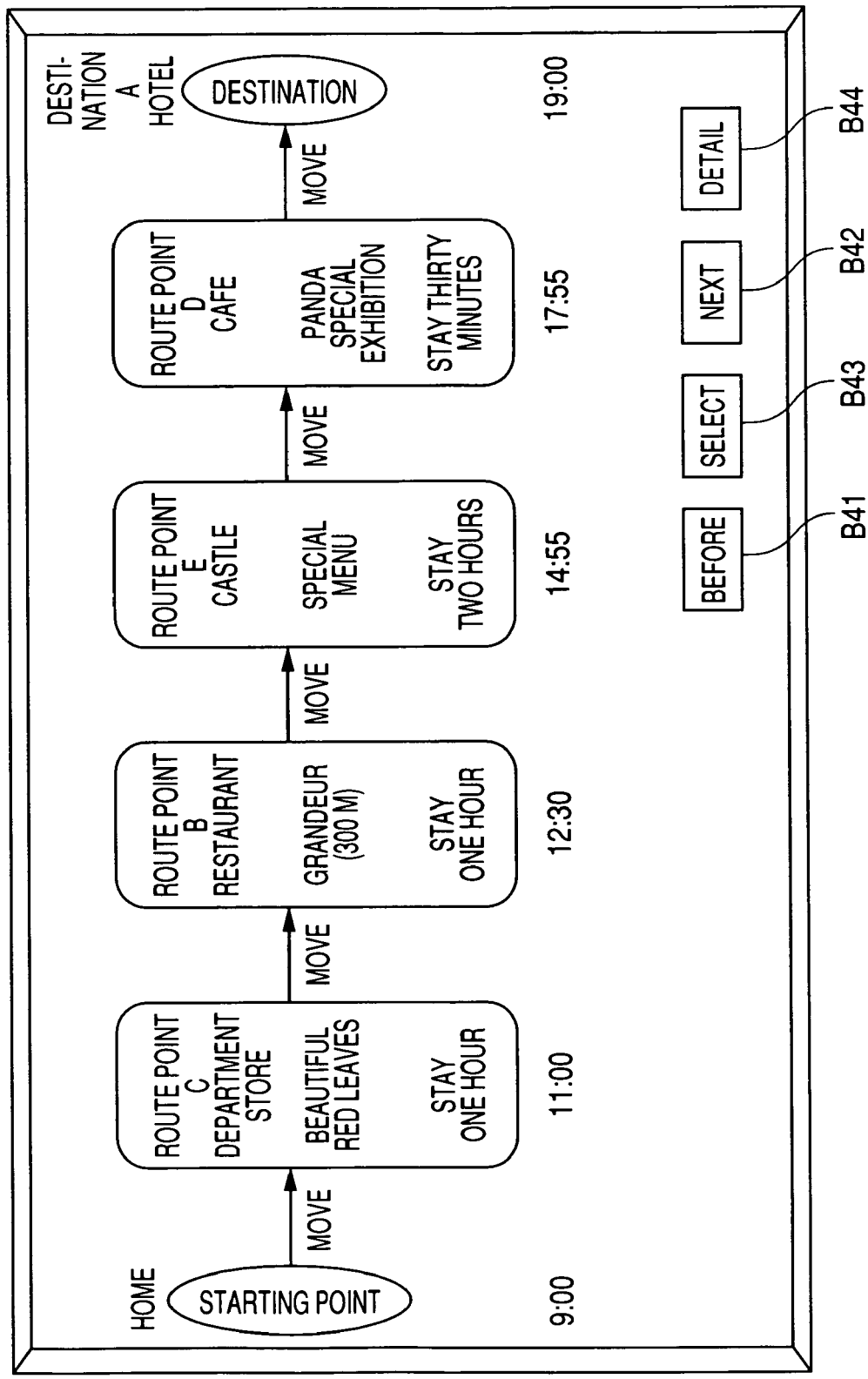
FIG. 24 is a diagram showing an example of a display screen for a route pattern in an embodiment of the invention.

Specifically, for example, first, the route pattern display selection unit C47 displays the route patterns registered in the route pattern list C49 on the liquid crystal monitor A5 (step S11). FIG. 24 is a diagram showing an example of a display screen for a route pattern. The display screen shown in FIG. 24 is a display screen for the route pattern in the third row in FIG. 31. On the display screen shown in FIG. 24, a start point, plural route points, and a destination are arranged to be displayed from the left side to the right side on the screen. On the display screen shown in FIG. 24, names, stay times, and arrival times of the respective points are displayed as information on the respective points.

On the display screen shown in FIG. 24, a "before button" image, a "next button" image, a "select button" image, and a "detail button" image are displayed in a lower part of the display screen. When the user operates the "before button" on the touch panel 8A, the route pattern display selection unit C47 displays, on the display screen, a route pattern registered immediately before the route pattern currently displayed in the route pattern list C49. When the user operates the "next button" on the touch panel A8, the route pattern display selection unit C47 displays, on the display screen, a route pattern registered immediately after the route pattern currently displayed in the route pattern list C49.

Figure 25:
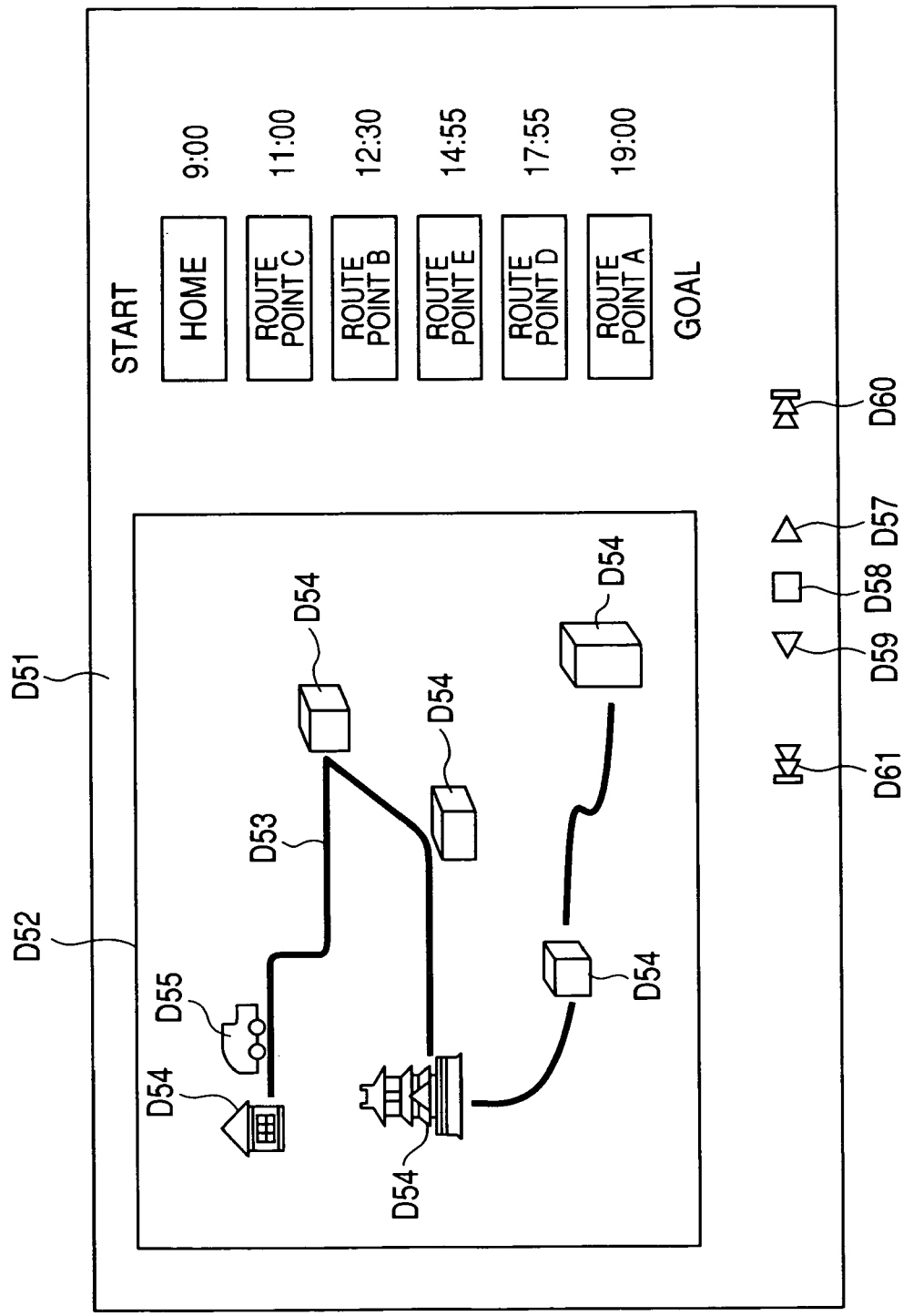
FIG. 25 is a diagram showing an example of a detailed display screen for a route pattern in an embodiment of the invention.

When the user operates the "detail button" on the touch panel A8, the route pattern display selection unit C47 causes the liquid crystal monitor A5 to display detailed information of the route pattern currently displayed. FIG. 25 is a diagram showing an example of a detailed display screen for a route pattern. In the detailed display screen shown in FIG. 25, an overall route diagram is displayed on the left side of the screen. This overall route diagram is a diagram in which images of plural route points are allocated on a map image based on the map data A18 read from the map data A18. On the detailed display screen shown in FIG. 25, a start point, plural route points, and a destination are arranged to be displayed from the upper side to the lower side on the right side of the screen. The user can learn a route pattern in detail on this screen.

When the user operates the "select button" on the touch panel A8 (step S12), the route pattern display selection unit C47 causes the hard disk drive A4 to store the displayed route pattern as a guide route (step S13).

According to the processing described above, the vehicle-mounted navigation device A1 creates a guide route. The guide route created is stored in the hard disk drive A4.

In guiding the user to a route in accordance with the guide route, in the vehicle-mounted navigation device A1, the route guide unit C51 reads, on the basis of a present location specified on the basis of information on present latitude and longitude and the like obtained by the GPS receiver A9, data in a predetermined range including the present location in the map data A18 and displays a map based on the data read and the present location on the liquid crystal monitor A5. The route guide unit C51 reads data for a guide route in the display range in the guide route data C52 and displays a guide route based on the data to be superimposed on the map.

When a vehicle moves, a value of the present latitude and longitude outputted from the GPS receiver A9 changes according to the movement. The route guide unit C51 updates the display of the map and the guide route such that the present location continues to be displayed on the liquid crystal monitor A5.

Therefore, the user reaches the destination from the start point via the respective route points by moving the vehicle such that the present location moves on the guide route.

As described above, in the vehicle-mounted navigation device A1 according to the first embodiment of the invention II, it is possible to create a guide route passing through plural route points taking into account stay times at the respective route points and guide the user in this guide route. Moreover, the stay times at the respective route points are taken into account as stay times corresponding to the number of passengers and a passenger type in the vehicle. Therefore, the user can stay at the respective route points for the stay times corresponding to needs based on the number of passengers and the passenger type in the vehicle, arrive at the respective route points at desired times, and spend a day enjoying sightseeing, meals, and the like to the full at the respective route points.

In the first embodiment, stay times corresponding to the number of passengers and a passenger type are provided by providing plural stay time data for each genre in the route point condition table for genre C15. Besides, for example, it is also possible that stay times at respective route points are inputted from the touch panel 8 serving as inputting means and the route pattern creation unit C45 serving as creating means creates route patterns passing through plural route points using the inputted stay times.

Second Embodiment

A hardware configuration of the vehicle-mounted navigation device A1 and data stored in the hard disk drive A4 according to a second embodiment of the invention II are the same as those with the same names in the vehicle-mounted navigation device A1 according to the first embodiment. The hardware configuration and the data are denoted by the identical reference signs and explanations thereof are omitted. In the second embodiment, the guide route creation program A11 stored in the hard disk drive A4 is changed for processing described below.

Figure 32:
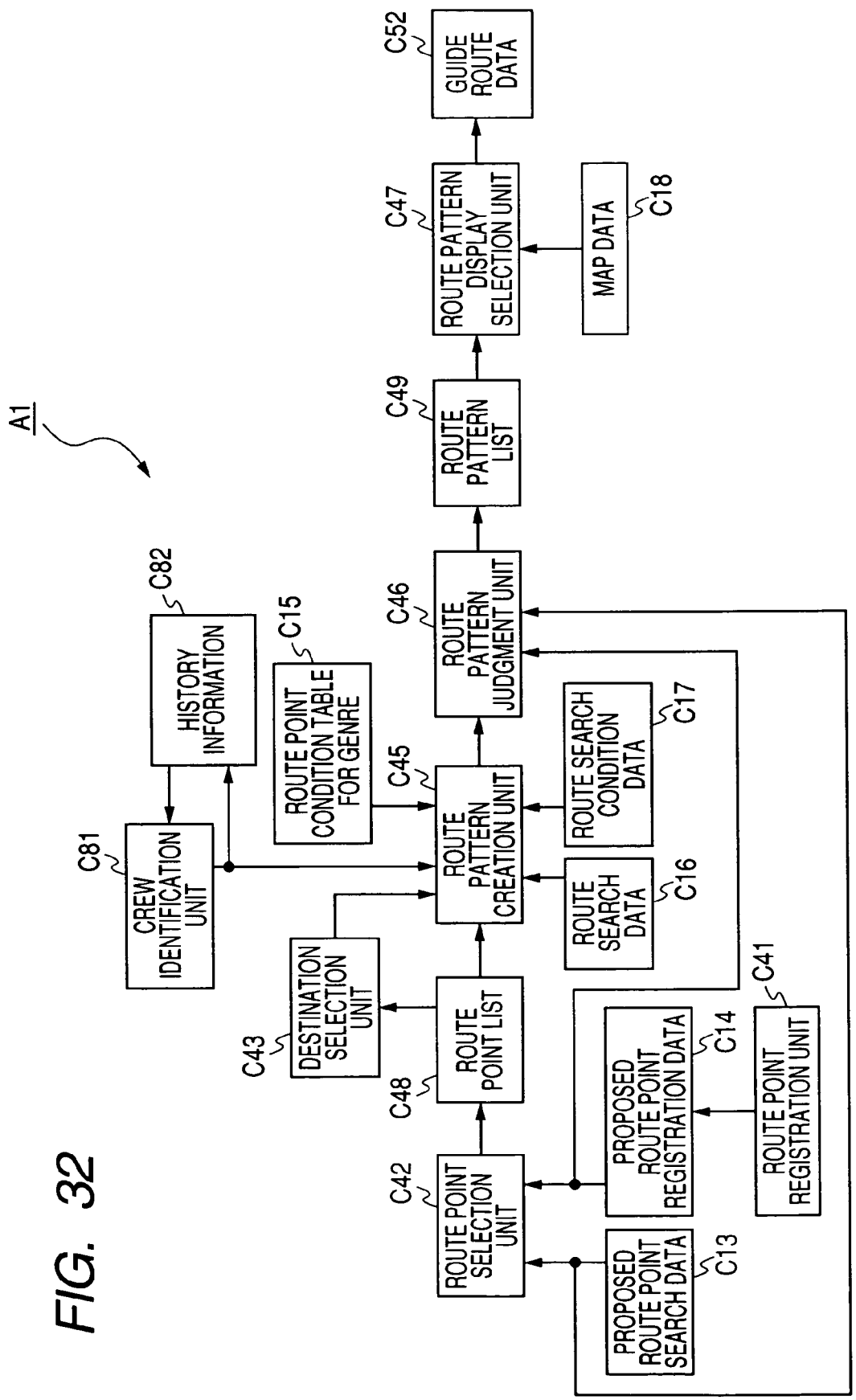
FIG. 32 is a block diagram showing a guide route creation function realized when a central processing unit executes a guide route creation program in a vehicle-mounted navigation device according to a second embodiment of the invention II.

FIG. 32 is a block diagram showing a guide route creation function that is realized when the central processing unit A2 executes the guide route creation program A11 in the vehicle-mounted navigation device A1 according to the second embodiment.

According to the execution of the guide route creation program A11, the proposed route point registration unit C41, the route point selection unit C42, the destination selection unit C43, the passenger specifying unit C81 serving as personnel designating means and route point learning means, the route pattern creation unit C45, the route pattern judgment unit C46, and the route pattern display selection unit C47 are realized in the vehicle-mounted navigation device A1. The components other than the passenger specifying unit C81 are the same as those with the same names of the vehicle-mounted navigation device A1 according to the first embodiment. The components are denoted by the identical reference signs and explanations of the components are omitted.

The passenger specifying unit C81 outputs information on the number of passengers and a passenger type in a vehicle. When the route points registered in the route point list C48 and the number of passengers and the passenger type are obtained in the guide route creation processing, the passenger specifying unit C81 stores the route points and the numbers of passengers and the passenger types in association with each other in the hard disk drive A4 serving as first and second storing means as history information C82 of combinations thereof.

Operations of the vehicle-mounted navigation device A1 according to the second embodiment will be explained. The vehicle-mounted navigation device A1 registers, changes, or deletes a route point, creates a guide route, and actually guides the user to a route in accordance with the guide route on the basis of the constitution described above. Processing for registering, changing, or deleting a route point and processing for actually guiding the user to a route in accordance with the guide route are the same as those in the operations of the vehicle-mounted navigation device A1 according to the first embodiment. Explanations of the processing are omitted.

Figure 33:
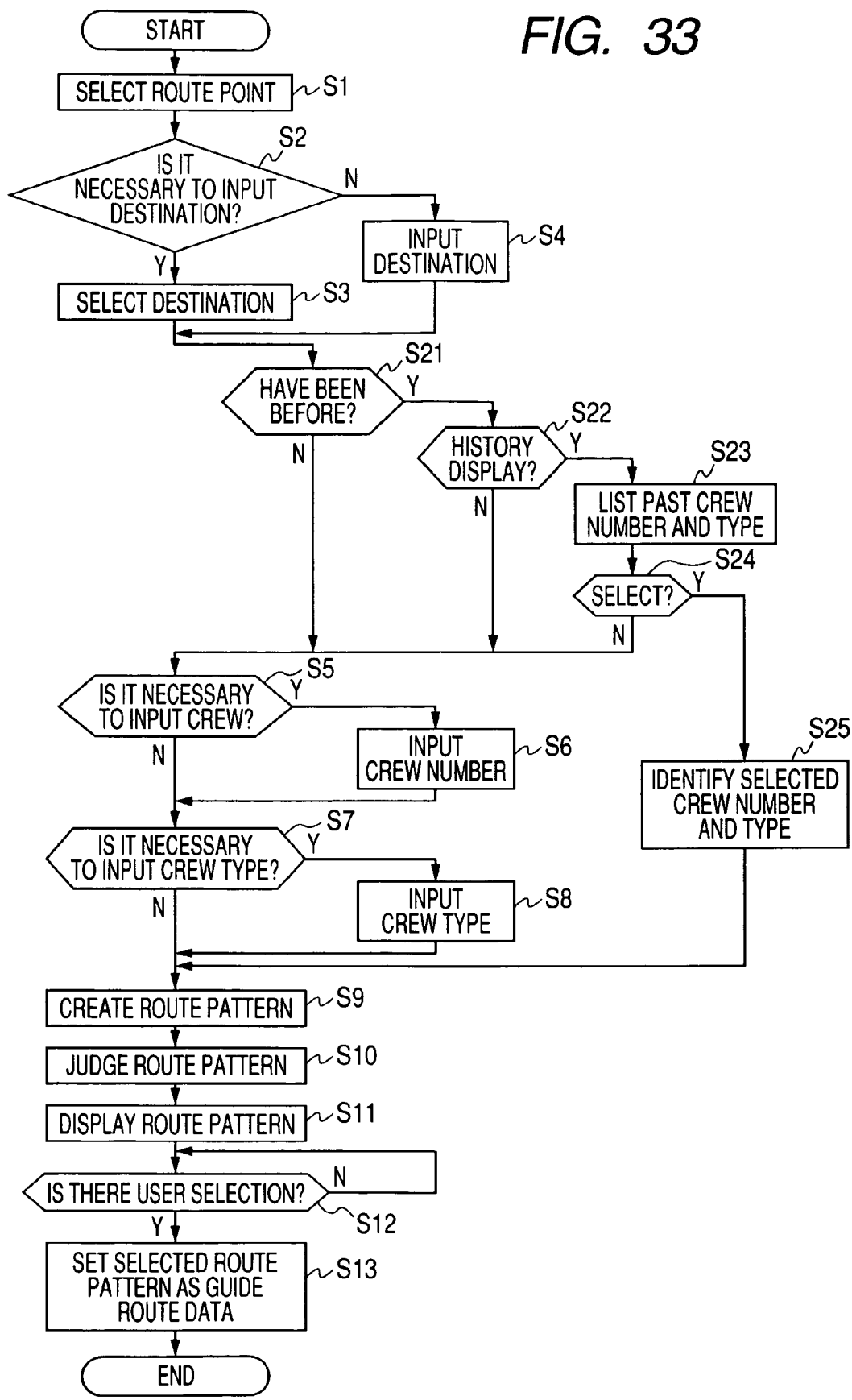
FIG. 33 is a flowchart showing guide route creation processing in the vehicle-mounted navigation device in the second embodiment of the invention II.

FIG. 33 is a flowchart showing the guide route creation processing in the vehicle-mounted navigation device A1 in the second embodiment. In FIG. 33, kinds of processing denoted by reference signs identical with those in FIG. 30 are the same as those in the case of the first embodiment.

In the guide route creation processing, first, the route point selection unit C42 selects proposed route points as route points from the proposed route point search data A13 and the proposed route point registration data A14 and registers the route points selected in the route point list C48 (step S1). The destination selection unit C43 selects a destination out of the route points registered in the route point list 48 (steps S2 to S4).

Subsequently, the passenger specifying unit C81 outputs information on the number of passengers and a passenger type in a vehicle. Specifically, for example, first, the passenger specifying unit C81 judges whether the user visited a route point included in the route point list C48 in the past on the basis of the association of the route points and the numbers of passengers and the passenger types in the history information C82 stored in the hard disk drive A4 (step S21). When the user visited the route point, the passenger specifying unit C81 displays, on the liquid crystal monitor 5, a screen for inquiring whether a history should be displayed (step S22). When a display instruction for the history is outputted from the touch panel A8 according to operation by the user (Yes in step S22), the passenger specifying unit C81 displays the history of the numbers of passengers and the passenger types at the time when the user visited the route point in the past on the liquid crystal monitor A5 (step S23). Moreover, when an instruction for selecting one number of passengers and passenger type from this history is outputted from the touch panel A8 (Yes in step S24), the passenger specifying unit C81 outputs the information on the number of passengers and the passenger type selected (step S25).

In the case of "No" in step S21, S22, or S24 due to a reason that, for example, there is no route points where the user visited in the past, the passenger specifying unit C81 judges necessity of passenger input (step S5) and outputs, according to input of the number of passengers and a passenger type, the number of passengers and the passenger type as required (steps S6 to S8).

When the passenger specifying unit C81 outputs information on the number of passengers and a passenger type, the passenger specifying unit C81 separately stores the information on the number of passengers and a passenger type in the hard disk drive A4 in association with the respective route points registered in the route point list C48.

Subsequently, the route pattern creation unit C45 creates a route pattern on the basis of the route point list C48, the destination, and the number of passengers and the passenger type in the vehicle (step S9). The route pattern judgment unit C46 judges propriety of the route pattern created by the route pattern creation unit C45 (step S10). The route pattern display selection unit C47 selects one route pattern out of the route patterns registered in the route pattern list C49 (step S11) and causes the hard disk drive A4 to store the route pattern selected by the user as a guide route (guide route data 52) (steps S12 to S13).

According to the processing described above, the vehicle-mounted navigation device A1 creates a guide route. The guide route created is stored in the hard disk drive A4.

As described above, in the vehicle-mounted navigation device A1 according to the second embodiment of the invention II, it is possible to create a guide route passing through plural route points taking into account stay times at the respective route points and guide the user in this guide route. Moreover, the stay times at the respective route points are taken into account as stay times corresponding to the number of passengers and a passenger type in the vehicle. Therefore, the user can stay at the respective route points for the stay times corresponding to needs based on the number of passengers and the passenger type in the vehicle, arrive at the respective route points at desired times, and spend a day enjoying sightseeing, meals, and the like to the full at the respective route points.

In particular, in the vehicle-mounted navigation device A1 according to the second embodiment, when a route point that the user visited in the past is included in the route point list C48, the number of passengers and a passenger type at that point are displayed on the liquid crystal monitor A5. The user can designate a stay time corresponding to the number of passengers and the passenger type in the vehicle simply by performing selection operation in the display. This makes it possible to omit input of the number of passengers and a passenger type and reduce the number of times of operation by the user.

Third Embodiment

A hardware configuration of the vehicle-mounted navigation device A1 and data stored in the hard disk drive A4 according to a third embodiment of the invention II are the same as those with the same names in the vehicle-mounted navigation device A1 according to the first embodiment. The hardware configuration and the data are denoted by the identical reference signs and explanations thereof are omitted. In the third embodiment, the guide route creation program A11 stored in the hard disk drive A4 is changed for processing described below.

Figure 34:
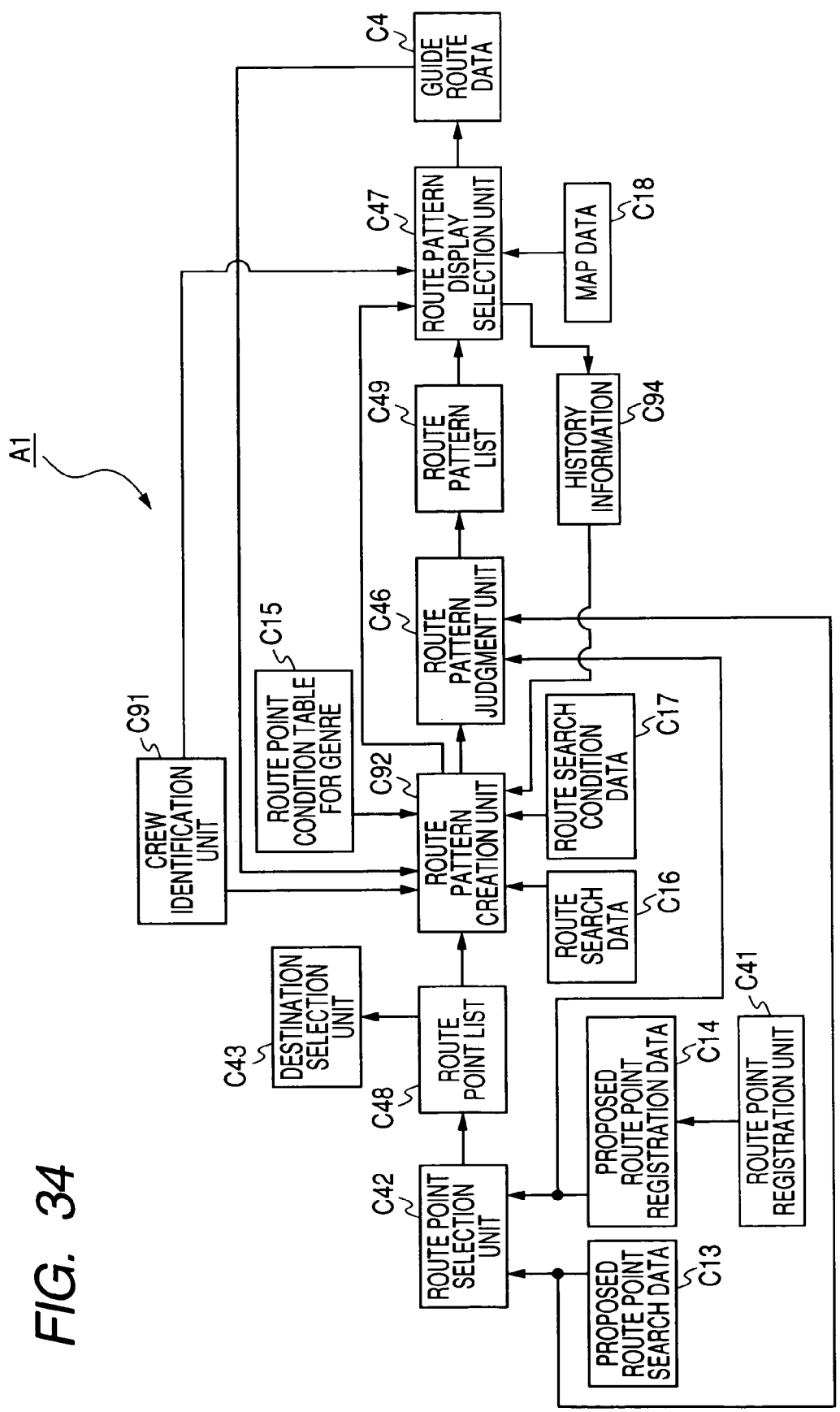
FIG. 34 is a block diagram showing a guide route creation function realized when a central processing unit executes a guide route creation program in a vehicle-mounted navigation device according to a third embodiment of the invention II.

FIG. 34 is a block diagram showing a guide route creation function that is realized when the central processing unit A2 executes the guide route creation program A11 in the vehicle-mounted navigation device A1 according to the third embodiment.

According to the execution of the guide route creation program A11, the proposed route point registration unit C41, the route point selection unit C42, the destination selection unit C43, a passenger specifying unit C91 serving as personnel designating means, a route pattern creation unit C92, the route pattern judgment unit C46 serving as a part of route pattern selecting means, and a route pattern display selection unit C93 serving as a part of the route pattern selecting means and route pattern learning means are realized in the vehicle-mounted navigation device A1. The components other than the passenger specifying unit C91, the route pattern creation unit C92, and the route pattern display selection unit C93 are the same as those with the same names of the vehicle-mounted navigation device A1 according to the first embodiment. The components are denoted by the identical reference signs and explanations of the components are omitted.

The passenger specifying unit C91 outputs information on the number of passengers and a passenger type in a vehicle to the route pattern creation unit C92 and the route pattern display selection unit C93.

The route pattern display selection unit C93 stores a selected route pattern in the hard disk drive A4 as a guide route and stores the selected route pattern and the information on the number of passengers and a passenger type in a vehicle as history information C94 in the hard disk drive A4 in association with each other.

The route pattern creation unit C92 has the function of the route pattern creation unit C45. Besides, the route pattern creation unit C92 reads the history information C94 in the hard disk drive A4 and performs processing for creating a route pattern.

Operations of the vehicle-mounted navigation device A1 according to the third embodiment will be explained. The vehicle-mounted navigation device A1 registers, changes, or deletes a route point, creates a guide route, and actually guides the user to a route in accordance with the guide route on the basis of the constitution described above. Processing for registering, changing, or deleting a route point and processing for actually guiding the user to a route in accordance with the guide route are the same as those in the operations of the vehicle-mounted navigation device A1 according to the first embodiment. Explanations of the processing are omitted.

Figure 35:
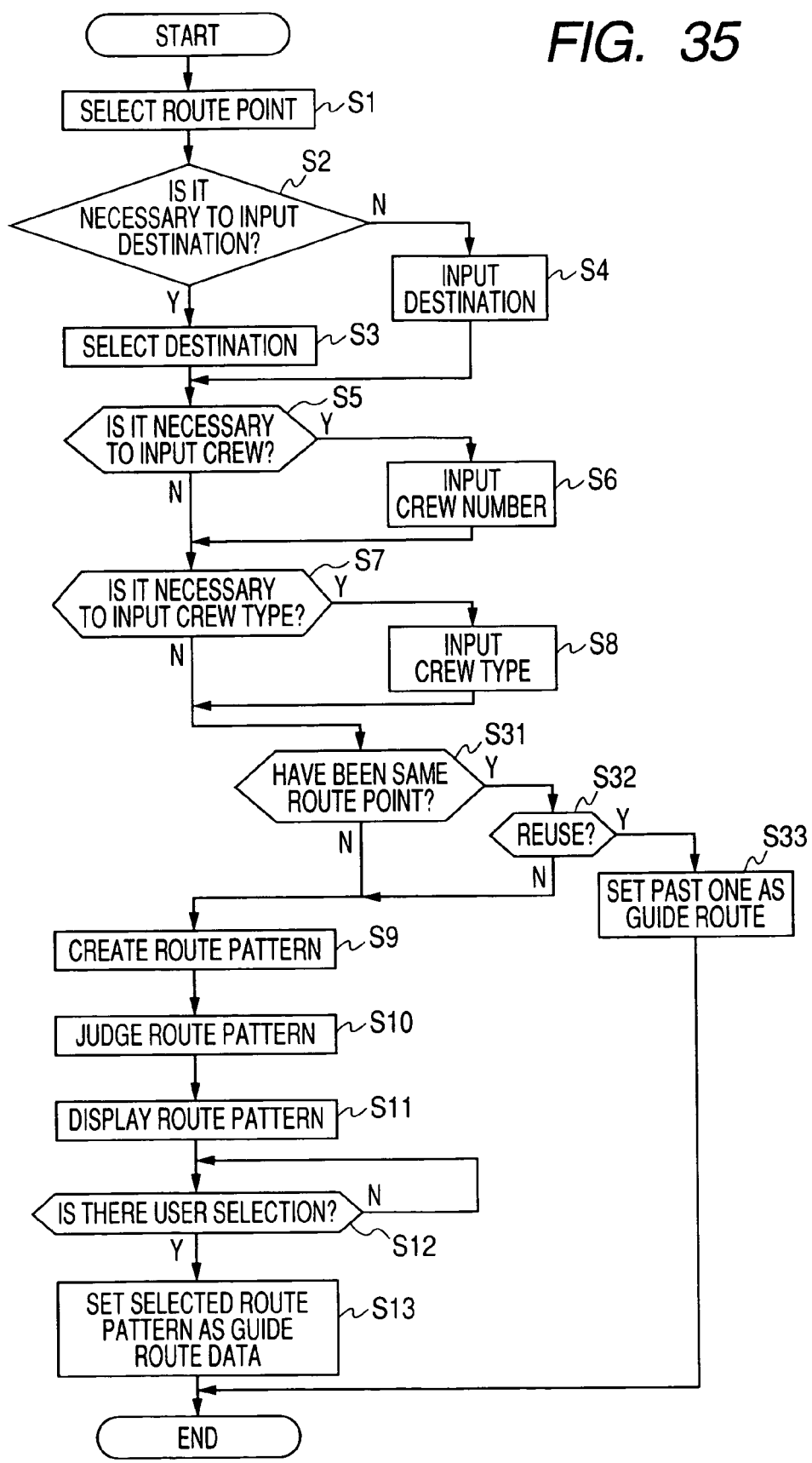
FIG. 35 is a flowchart showing guide route creation processing in the vehicle-mounted navigation device in the third embodiment of the invention II.

FIG. 35 is a flowchart showing the guide route creation processing in the vehicle-mounted navigation device A1 in the third embodiment. In FIG. 35, kinds of processing denoted by reference signs identical with those in FIG. 30 are the same as those in the case of the first embodiment.

In the guide route creation processing, first, the route point selection unit C42 selects proposed route points as route points from the proposed route point search data A13 and the proposed route point registration data A14 and registers the route points selected in the route point list C48 (step S1). The destination selection unit C43 selects a destination out of the route points registered in the route point list 48 (steps S2 to S4).

Subsequently, the passenger specifying unit C91 outputs, according to input of the number of passengers and a passenger type, the number of passengers and the passenger type (steps S6 to S8). The number of passengers and the passenger type are outputted to the route pattern creation unit C92 and the route pattern display selection unit C93.

First, the route pattern creation unit C92 reads the history information C94 in the hard disk drive A4. When a route pattern that has plural route points in the route point list C48 is associated with the number of passengers and the passenger type from the passenger specifying unit C91 is present in the history information C94, the route pattern creation unit C92 displays, on the liquid crystal monitor A5, a screen for inquiring whether the route pattern of the history information C94 should be referred to (step S32).

When a reference instruction for the history is outputted from the touch panel A8 according to operation by the user, the route pattern creation unit C92 reads out a coincident route pattern from the history information C94 and causes the hard disk drive A4 to store the route pattern via the route pattern display selection unit C93 as a guide route (step S33). Instead of outputting the coincident route pattern from the history information C94, the route pattern creation unit C92 may cause the hard disk drive A4 to store the route pattern as a guide route. Alternatively, the route pattern display selection unit C93 may perform the processing of the route pattern creation unit C92.

When a route pattern that has plural route points in the route point list C48 and is associated with the number of passengers and the passenger type from the passenger specifying unit C91 is not included in the history information C94 (No in step 31) or when the history information C94 is not referred to (No in step S32), the route pattern creation unit C92 creates a route pattern on the basis of the route point list C48, the destination, and the number of passengers and the passenger type in the vehicle (step S9). The route pattern judgment unit C46 judges propriety of the route pattern created by the route pattern creation unit C92 (step S10). The route pattern display selection unit C93 performs processing for selecting one route pattern out of the route patterns registered in the route pattern list C49 (step S11) and causes the hard disk drive A4 to store the route pattern selected by the user as a guide route (steps S12 to S13).

According to the processing described above, the vehicle-mounted navigation device A1 creates a guide route. The guide route created is stored in the hard disk drive A4.

As described above, in the vehicle-mounted navigation device A1 according to the third embodiment, it is possible to create a guide route passing through plural route points taking into account stay times at the respective route points and guide the user in this guide route. Moreover, the stay times at the respective route points are taken into account as stay times corresponding to the number of passengers and a passenger type in the vehicle. Therefore, the user can stay at the respective route points for the stay times corresponding to needs based on the number of passengers and the passenger type in the vehicle, arrive at the respective route points at desired times, and spend a day enjoying sightseeing, meals, and the like to the full at the respective route points.

In particular, in the vehicle-mounted navigation device A1 according to the third embodiment, a route pattern in the past is stored in the hard disk drive A4 in association with the number of passengers and a passenger type. When the number of passengers and a passenger type inputted by the user coincide with the number of passengers and the passenger type in the past, it is possible to use the route pattern in the past as a guide route again without creating a route pattern anew. Therefore, concerning a route point where the user visited in the past, a route point where the user visits frequently, and the like, it is possible to preferentially consider the route pattern in the past and complete the processing for creating a guide route in a short time.

In the third embodiment, unless all of plural route points and the number of passengers and a passenger type of the vehicle coincide with those in the past, the route pattern in the past is not used as a guide route again. However, the route pattern in the past may be used as a guide route again even when the number of passengers and the passenger type do not strictly coincide with those in the past. For example, the route pattern in the past may be made reusable even when one of the number of passengers and the passenger type coincide with that in the past.

In the third embodiment, all of a route pattern having plural route points and the number of vehicles and a passenger type of a vehicle this time coincide with those in the past, the route pattern in the past is used as a guide route again without creating a route patter anew. However, even in that case, it is also possible that new route patters are created, the route patterns created and the route pattern in the past is compared, and a preferable route pattern among the route patterns is selected as a guide route.

Fourth Embodiment

A hardware configuration of the vehicle-mounted navigation device A1 and data stored in the hard disk drive A4 according to a fourth embodiment of the invention are the same as those with the same names in the vehicle-mounted navigation device A1 according to the first embodiment. The hardware configuration and the data are denoted by the identical reference signs and explanations thereof are omitted. In the fourth embodiment, the guide route creation program A11 and the route guide program A12 stored in the hard disk drive A4 are changed for processing described below.

Figure 36:
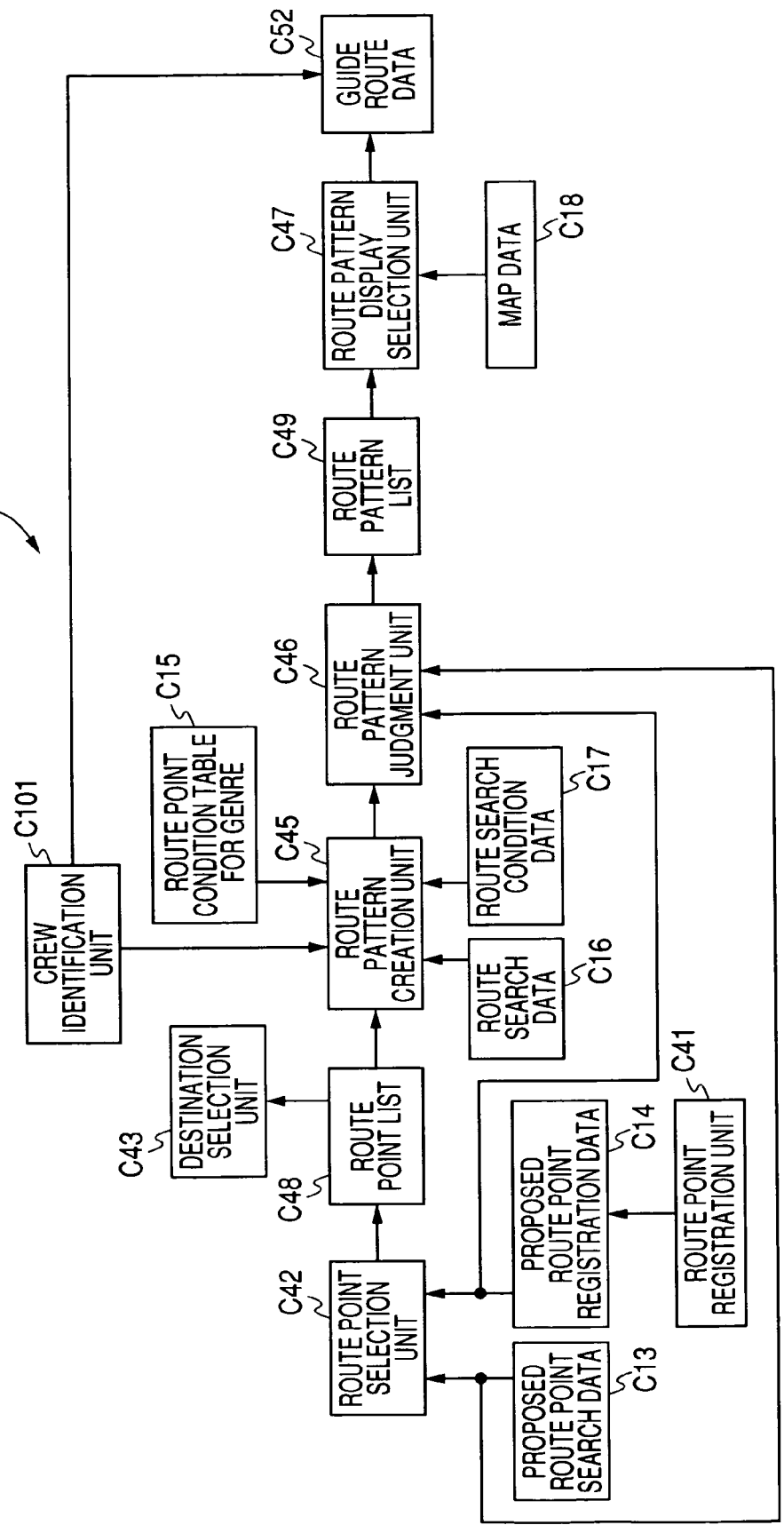
FIG. 36 is a block diagram showing a guide route creation function realized when a central processing unit executes a guide route creation program in a vehicle-mounted navigation device according to a fourth embodiment of the invention II.

FIG. 36 is a block diagram showing a guide route creation function that is realized when the central processing unit A2 executes the guide route creation program A11 in the vehicle-mounted navigation device A1 according to the fourth embodiment.

According to the execution of the guide route creation program A11, the proposed route point registration unit C41, the route point selection unit C42, the destination selection unit C43, a passenger specifying unit C101 serving as personnel designating means, the route pattern creation unit C45, the route pattern judgment unit C46, and the route pattern display selection unit C47 are realized in the vehicle-mounted navigation device A1. The components other than the passenger specifying unit C101 are the same as those with the same names of the vehicle-mounted navigation device A1 according to the first embodiment. The components are denoted by the identical reference signs and explanations of the components are omitted.

The passenger specifying unit C101 outputs information on the number of passengers and a passenger type in a vehicle to the route pattern creation unit C45 and the hard disk drive A4.

Figure 37:
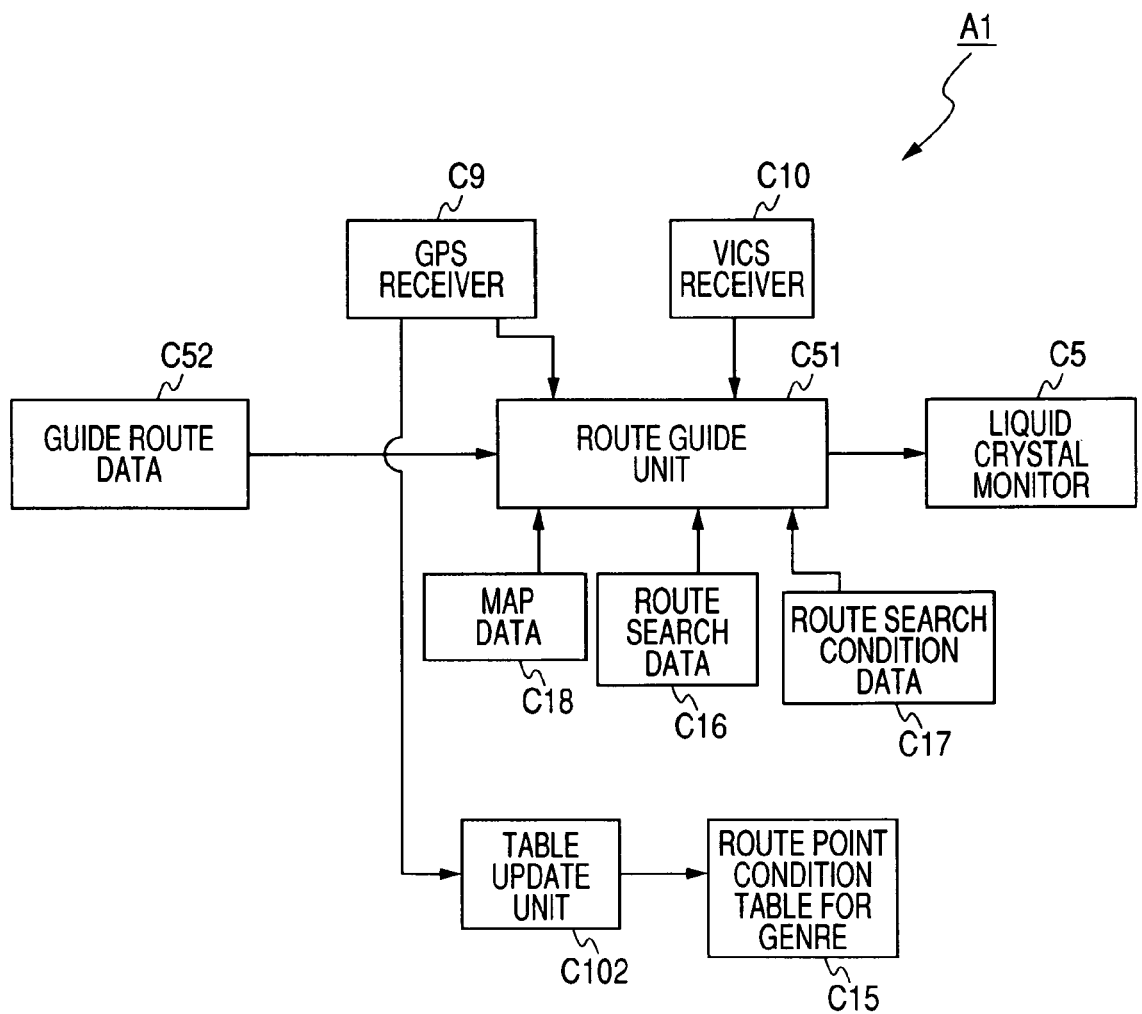
FIG. 37 is a block diagram showing a route guide function realized when the central processing unit executes a route guide program in the vehicle-mounted navigation device according to the fourth embodiment of the invention II.

FIG. 37 is a block diagram showing a route guide function that is realized when the central processing unit A2 executes the route guide program A12 in the vehicle-mounted navigation device A1 according to the fourth embodiment.

According to the execution of the route guide program A12, the route guide unit C51 and a table update unit C102 serving as stay time learning means are realized in the vehicle-mounted navigation device A1. The route guide unit C51 is the same as that with the same name of the vehicle-mounted navigation device A1 according to the first embodiment. The route guide unit C51 is denoted by the identical reference sign and an explanation thereof is omitted.

Present location information outputted by the GPS receiver A9 is inputted to the table update unit C102. The table update unit C102 updates stay time data in the route point condition table for genre A15.

Operations of the vehicle-mounted navigation device A1 according to the fourth embodiment will be explained. The vehicle-mounted navigation device A1 registers, changes, or deletes a route point, creates a guide route, and actually guides the user to a route in accordance with the guide route on the basis of the constitution described above. Processing for registering, changing, or deleting a route point is the same as that in the operations of the vehicle-mounted navigation device A1 according to the first embodiment. Explanations of the processing are omitted.

In the guide route creation processing, first, the route point selection unit C42 selects proposed route points as route points from the proposed route point search data A13 and the proposed route point registration data A14 and registers the route points selected in the route point list C48. The destination selection unit C43 selects a destination out of the route points registered in the route point list 48.

Subsequently, the passenger specifying unit C101 outputs, according to input of the number of passengers and a passenger type, information on the number of passengers and the passenger type. The number of passengers and the passenger type are outputted to the route pattern creation unit C45 and the hard disk drive A4. The hard disk drive A4 stores the number of passengers and the passenger type.

The route pattern creation unit C45 creates a route pattern on the basis of the route point list C48, the destination, and the number of passengers and the passenger type in the vehicle. The route pattern judgment unit C46 judges propriety of the route pattern created by the route pattern creation unit C45. The route pattern display selection unit C47 selects one route pattern out of the route patterns registered in the route pattern list C49 and causes the hard disk drive A4 to store the route pattern selected by the user as a guide route (the guide route data C52).

According to the processing described above, the vehicle-mounted navigation device A1 creates a guide route. The guide route created is stored in the hard disk drive A4.

In guiding the user to a route in accordance with the guide route, in the vehicle-mounted navigation device A1, the route guide unit C51 reads, on the basis of information on present latitude and longitude and the like obtained by the GPS receiver A9, map data near a present location and guide route data in the map data A18 and displays, on the liquid crystal monitor A5, a guide screen in which the map data and the guide route data are superimposed.

When a vehicle moves, a value of the present latitude and longitude outputted from the GPS receiver A9 changes according to the movement. The route guide unit C51 updates the display of the map and the guide route such that the present location continues to be displayed on the liquid crystal monitor A5. Therefore, the user reaches from a start point to the destination via the respective route points by moving the vehicle such that the present location moves on the guide route.

The table update unit C102 monitors present location information inputted from the GPS receiver A9. When the present location information coincides with a location (a point) of any one of the route points, the table update unit C102 starts time measurement using time information included in a reception radio wave of the GPS. The location information of the GPS receiver and the location (the point) of the route point do not need to strictly coincide with each other. It is sufficient to judge that the location information and the location coincide with each other when it is judged that a difference between the location information and the location is equal to or smaller than a predetermined distance.

Even when the time measurement is started, the table update unit C102 continues to monitor present location information inputted from the GPS receiver A9.

When it is judged that the location information of the GPS receiver A9 and the location (the point) of the route point do not coincide with each other, the table update unit C102 measures time during which the user stays at the route point using time information included in a reception radio wave of the GPS at that time and updates the stay time in the route point condition table for genre A15 with the measured time.

Specifically, first, the table update unit C102 specifies a record in the route point condition table for genre A15 on the basis of a genre of the route point where time is measured. Moreover, the table update unit C102 specifies, on the basis of the number of passengers and the passenger type stored in the hard disk drive A4, data of a stay time including the number of passengers and the passenger type. The table update unit C102 updates a value of the data specified with, for example, the measured time. Besides, it is also possible that the number of times of visit to the route point is also stored and the value is updated with an average of measured times at all times of visit.

The stay time may be measured according to time of a timer or the like installed in the vehicle. The stay time at the route point may be time from time when the user arrives at the route point and turns off an ignition key until time when the ignition key is turned on.

The fourth embodiment is a modification of the first embodiment. The same modification is possible for the second and the third embodiment.

As described above, in the vehicle-mounted navigation device A1 according to the fourth embodiment, it is possible to create a guide route passing through plural route points taking into account stay times at the respective route points and guide the user in this guide route. Moreover, the stay times at the respective route points are taken into account as stay times corresponding to the number of passengers and a passenger type in the vehicle. Therefore, the user can stay at the respective route points for the stay times corresponding to needs based on the number of passengers and the passenger type in the vehicle, arrive at the respective route points at desired times, and spend a day enjoying sightseeing, meals, and the like to the full at the respective route points.

In particular, in the vehicle-mounted navigation device A1 according to the fourth embodiment, actual stay times at the respective route points are measured and the stay time data in the route point condition table for genre A15 is updated with the time measured. Therefore, a value of stay time data in each genre is a value corresponding to an actual situation of stay of the user using the vehicle-mounted navigation device A1. Every time the user visits the route points, the user can spend time at the respective route points for a stay time more comfortable for the user.

In this example of the fourth embodiment, a value of the stay time data in the route point condition table for genre A15 is updated by changing the value to time measured at a stay point. Besides, the value may be updated with a simple average or the like of the value of the stay time data registered in the route point condition table for genre A15 and the time measured. It is also possible that an update date is also stored, and, when a predetermined period (e.g., one year) has not elapsed from the last update, the value is updated on the basis of an original value and a measured value and, when the predetermined time has elapsed, the value is replaced with the measured time.

Besides, for example, it is also possible that a stay time is acquired, via a radio communication network or the like, from a data server connected to the network on a real time basis and the stay time in the route point condition table for genre A15 is updated with this stay time. The stay time in the route point condition table for genre A15 may be updated by causing a recording medium to store, in advance, a stay time acquired from the network in a personal computer or the like and causing the vehicle-mounted navigation device A1 to read data of the recording medium.

Stay time may be stored individually for respective route points separately from the route point condition table for genre A15. In that case, it is possible to have a general stay time of a genre and a stay time peculiar to the route point separately. Thus, it is possible to set a stay time corresponding to the stay point more carefully.

Moreover, in storing stay times individually for respective route points separately from the route point condition table for genre A15, it is possible to expect a high learning effect even when a learning level is low by updating the stay times with the measured time or the like. In other words, when it is possible to set stay times at the respective route points individually, classifications of genres in the route point condition table for genre A15 tend to cause inconvenience even if the classifications are set wider. For example, in the embodiments described above, genres are set according to classifications such as hotel and department store. However, it is possible to set genres according to wider classifications such as meals (lunch and dinner), tea time (10 o'clock and 15 o'clock), and rest (rest room, tea, and tobacco), shopping, and sightseeing. A stay time for each genre based on the wider classifications is updated with a measured time or the like. Thus, for example, when the user goes shopping at a department store, in the shopping at a supermarket classified into a genre identical with the department store, it is possible to expect a learning effect of the last shopping.

The embodiments described above are examples of a preferred embodiment of the invention II. However, the invention II is not limited to this. Various modifications and alterations of the invention II are possible.

In the first embodiment, the plural stay times are stored in the route point condition table for genre A15 of the vehicle-mounted navigation device A1. Besides, for example, it is also possible that plural stay times are stored on a database separate from the vehicle-mounted navigation device A1 and the vehicle-mounted navigation device selects a stay time by accessing this database via the Internet or the like.

In the embodiments of the invention II, the passenger specifying units C44, C81, C91, and C101 grasp the number of passengers and a passenger type since the number of passengers and the passenger type are inputted at the time of route search or in the past. Besides, for example, it is also possible that IDs of cellular phones (e.g., telephone numbers and MAC addresses) owned by people who could be passengers are stored in the hard disk drive A4 or the like in advance as registration information and the passenger specifying units C44, C81, C91, and C101 grasp and output the number of passengers and a passenger type by communicating with the cellular phone or the like owned by passengers by radio.

In the embodiments, the plural stay times are classified according to the numbers of passengers and passenger types in the route point condition table for genre A15. Besides, for example, the plural stay times may be classified according to various classifications such as a stay time for each driver of a vehicle, a stay time for each male or female, a stay time for each fellow passenger group, a stay time for each age, a stay time by season, a stay time by day of week, and a stay time by time frame. This makes it possible to provide a stay time corresponding to a user of a vehicle more carefully.

In the embodiments, even when the number of passengers and a passenger type are processed as a set, the processing may be appropriately performed with one of the number of passengers and the passenger type.

According to the invention II, there is an operational effect that it is possible to find a guide route passing through plural route points such that a user can stay at the respective route points in a desired state.

[Invention III]

A hardware configuration of a vehicle-mounted navigation device according to an embodiment of the invention III is as shown in the block diagram in FIG. 22 as in the invention II.

The vehicle-mounted navigation device according to the invention III includes a CPU (Central Processing Unit), a RAM (Random Access Memory), a hard disk drive, a liquid crystal monitor serving as display means, an I/O (Input/Output) port, and a system bus connecting these devices.

The hard disk drive is a data storage device that stores programs and data.

Figure 38:
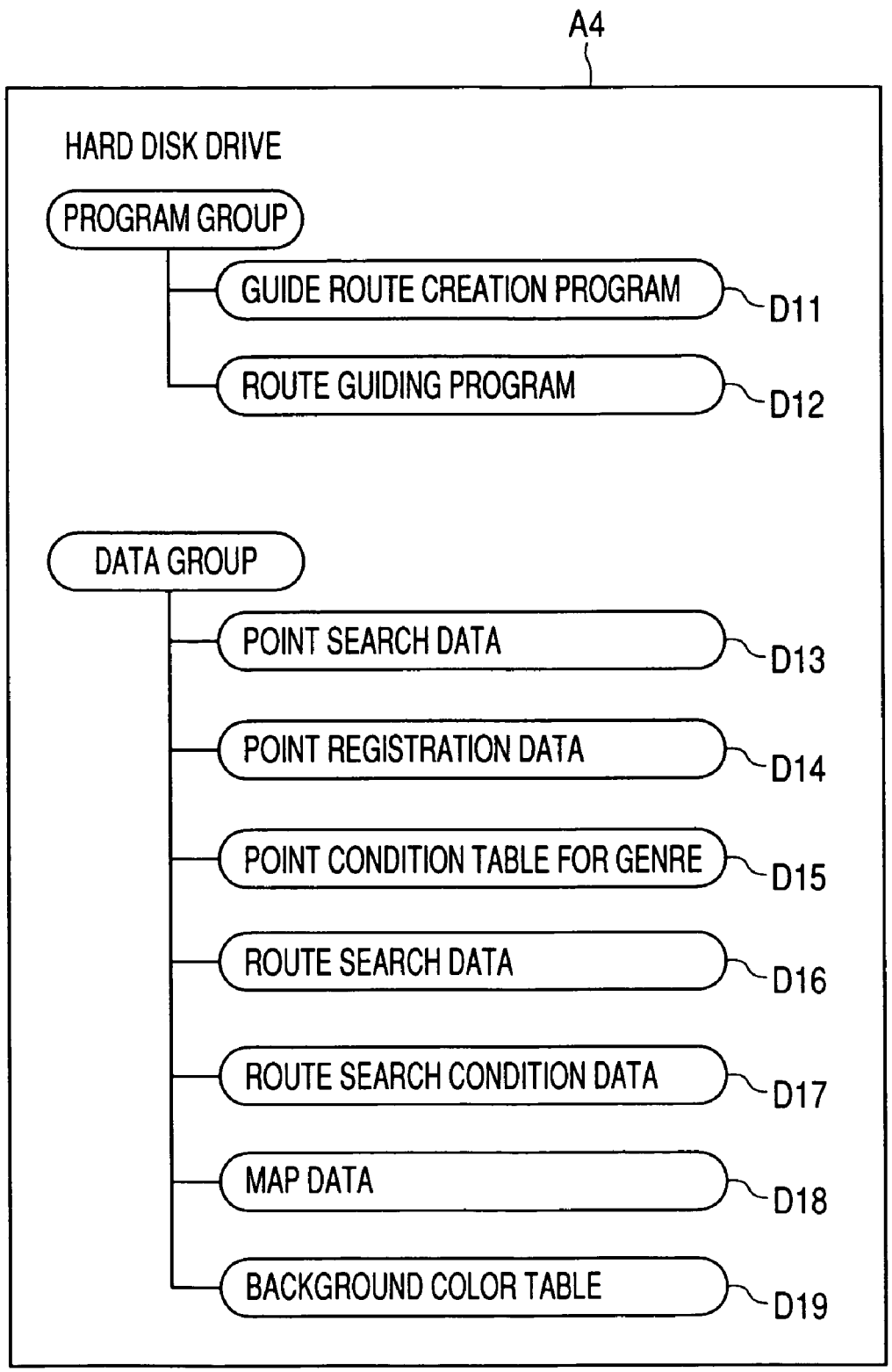
FIG. 38 is a diagram for explaining content stored in a hard disk drive.

FIG. 38 is a diagram for explaining content stored in this hard disk drive.

A program group and a data group are stored in the hard disk drive. The program group in the hard disk drive includes a guide route creation program D11 and a route guiding program D12. The data group in the hard disk drive includes point search data D13, point registration data D14, point condition table for genre D15, route search data D16, route search condition data D17, map data D18, and background color table D19.

It is also possible that the point search data D13, the point condition table for genre D15, the route search data D16, the map data D18, and the like are recorded in a computer readable recording medium, which can be inserted in and removed from the vehicle-mounted navigation device, and the vehicle-mounted navigation device reads these data from this recording medium. The program group and the data group may be recorded in different recording media.

The point search data D13 has a record for each proposed point. Information on one proposed point is included in each record in the point search data D13. For example, a name, a genre, advisability of selection as a destination, a guide time frame, a value indicating a point, and the like of the proposed point are included therein. Proposed points in the point search data D13 are registered in advance, for example, before shipment of the vehicle-mounted navigation device. For example, restaurants, amusement facilities, and the like are included in the proposed points.

FIG. 26 is a diagram for explaining an example of the point search data D13 in FIG. 38. In FIG. 26, registration information of each record is shown in each row. For example, information on an accommodation facility named "○△ hotel" is included in a record shown in a first row in FIG. 26. As specific registration information of the accommodation facility, a name "○△ hotel", a genre "hotel", data "○" indicating the accommodation facility is selectable as a destination, a guide time frame "15:00 to", and a value of a point "1234" are included therein.

A value indicating a point of a proposed point registered in the point search data D13 may be a value based on latitude and longitude of the proposed point or may be another value associated with the value based on the latitude and longitude, for example, a value of a map code (registered trademark). Further, the value may be a value based on latitude and longitude of the proposed point itself or may be a value based on latitude and longitude of a point associated with a proposed point such as a car park cooperating with the proposed point.

The point registration data D14 has plural records for each proposed point registered by the user. Information on one proposed point is included in each record in the point registration data D14. For example, a name, a genre, a guide time frame, a value indicating a point, and the like of the proposed point are included therein. As such a proposed point, for example, there is a home.

The point condition table for genre D15 has plural records for each genre. The genre is an item for classifying proposed points. Information on one genre is included in each record in the point condition table for genre D15. For example, information on a name of the genre and a stay time is included therein. As a name of a genre, for example, there are restaurant, famous place, hotel, and the like.

Figure 39:
FIG. 39 is a diagram for explaining an example of a point condition table for genre in FIG. 38.

FIG. 39 is a diagram for explaining an example of the point condition table for genre D15 in FIG. 38. In FIG. 39, each record is shown in each row. Each record in the point condition table for genre D15 includes genre data indicating a name of a genre and stay time data. For example, in a record shown in a first row in FIG. 39, "hotel" is set as a name of a genre and "18 hours" is set as stay time data.

The route search data D16 has plural kinds of node information and plural kinds of link information. The node information is information on a point such as an intersection and is constituted by identification information of the point, a value indicating the point, a list of identification numbers of links connected to a node of the node information, and the like. The link information is information on a route such as a road for connecting nodes and is constituted by identification information of the route, a list of identification numbers of the nodes connected, and the like.

The route search condition data D17 is data indicating search conditions in searching for a recommended route, for example, data indicating selection standards for selecting one route out of plural routes such as a shortest distance, a shortest moving time, preference of general roads, and preference of toll roads. The selection standards are not limited to one standard item and may be combinations of plural standard items.

The map data D18 is data obtained by converting a map of a predetermined region such as the entire Japan, the Kanto district, or Tokyo into image data consisting of plural dots. The respective dots have luminance information. There are a road map, a housing map, and the like as the map. The map data D18 has values indicating points of the respective dots of the map data D18.

The background color table D19 is a table that stores colors forming the basis in displaying a guide map D52 described later in association with each time frame and the like in one day. Specifically, for example, blue is designated as a base color in a time frame of 6:00 to 17:00 in the daytime and gray is designated as a base color in a time frame 17:00 to 6:00 at night.

Figure 40:
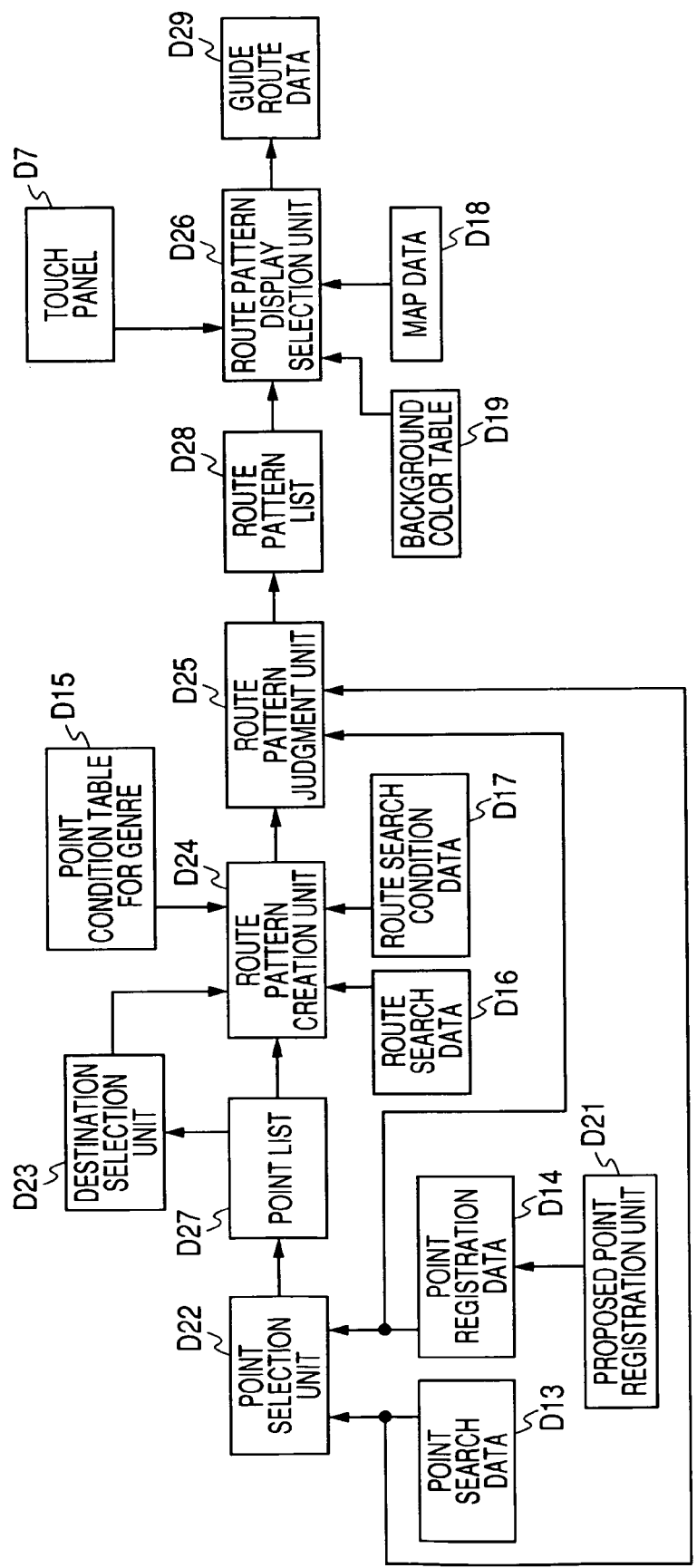
FIG. 40 is a block diagram showing a guide route creation function realized in the vehicle-mounted navigation device when the central processing unit executes the guide route creation program.

The guide route creation program D11 is executed by the central processing unit to realize a guide route creation function in the vehicle-mounted navigation device. FIG. 40 is a block diagram showing the guide route creation function that is realized in the vehicle-mounted navigation device when the central processing unit (CPU) in FIG. 22 executes the guide route creation program D11.

When the central processing unit executes the guide route creation program D11, a proposed point registration unit D21, a point selection unit D22 serving as point selecting means, a destination selection unit D23, a route pattern creation unit D24 serving as route pattern creating means, a route pattern judgment unit D25, and a route pattern display selection unit D26 are realized in the vehicle-mounted navigation device.

The proposed point registration unit D21 registers a new proposed point in the point registration data D14, changes content of records registered in the point registration data D14, and deletes a record registered in the point registration data D14.

The point selection unit D22 selects points to be visited from the point search data D13 and the point registration data D14 as route points and registers the points selected in a point list D27. It is possible to register one or more route points in the point list D27.

The destination selection unit D23 selects a destination out of the points registered in the point list D27. In the following description, points other than a destination in the point list D27 are described as route points when the points are distinguished from the destination.

The route pattern creation unit D24 creates route patterns for moving from a start point (e.g., a present location) to the destination via the route points. The route pattern creation unit D24 searches for a route from a start point to a first route point, routes among the route points, and a route from a last route point to the destination on the basis of the route search data D16. The route patterns include routing order information concerning a routing order of the points and guide time information such as arrival times at the respective route points.

The route pattern judgment unit D25 judges propriety of the route patterns created by the route pattern creation unit D24 (i.e., whether the user arrives at all the route points and the destination in an appropriate situation). The route pattern judgment unit D25 creates a route pattern list D28 and registers a route pattern judged as conforming to the route pattern list D28. The route pattern judgment unit D25 may register all the route patterns created by the route pattern creation unit D24 in the route pattern list D28 together with a result of the judgment on propriety.

The route pattern display selection unit D26 displays a route pattern registered in the route pattern list D28. In this case, the route pattern display selection unit D26 displays the route pattern to be superimposed on the map data D18 according to a request. The route pattern display selection unit D26 performs demonstration of a guide route according to a request.

The route pattern display selection unit D26 causes the hard disk drive to store a route pattern selected by the user as the guide route data D29.

The route guide program D12 is executed by the central processing unit to realize a route guide function in the vehicle-mounted navigation device.

Figure 41:
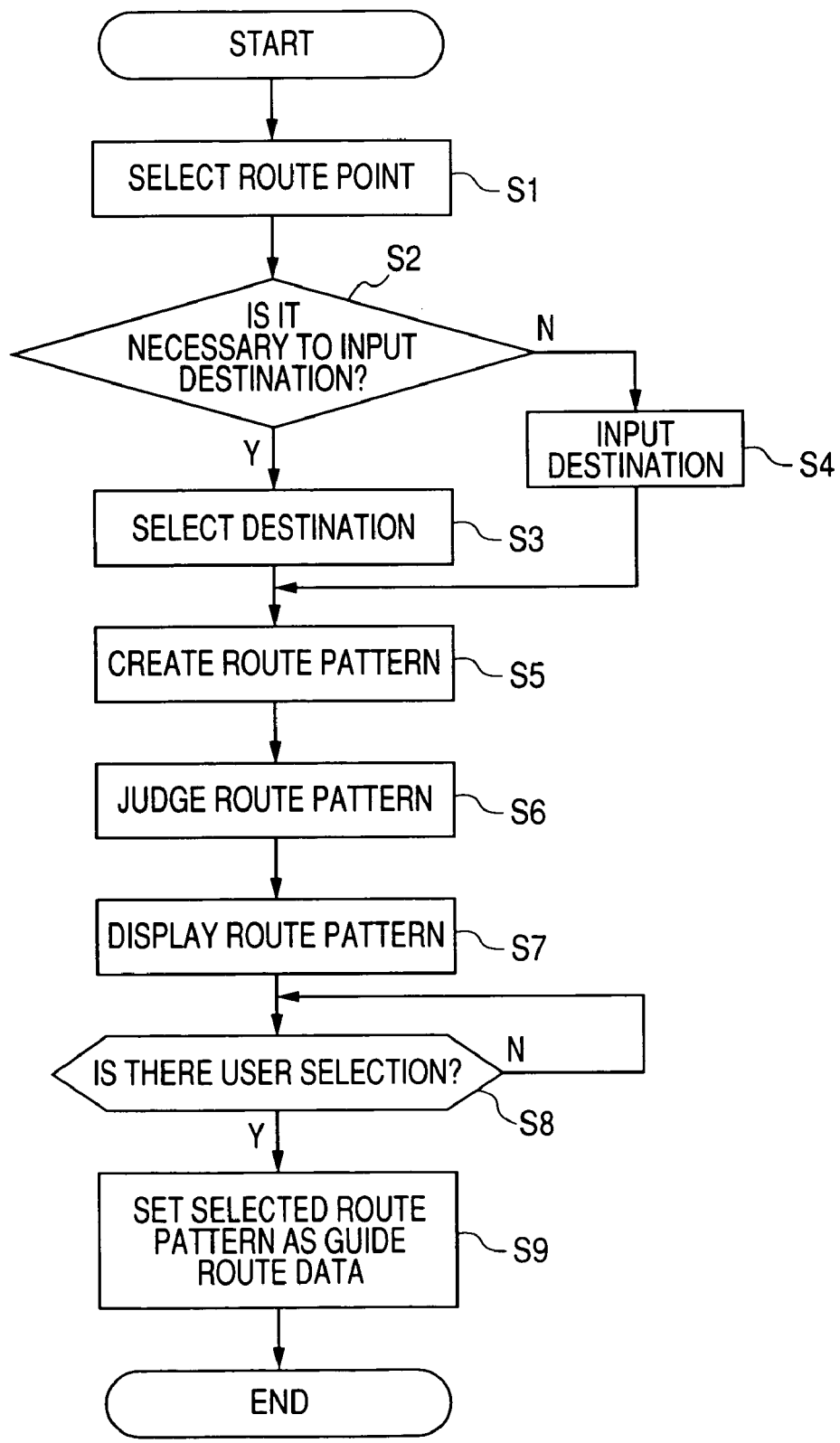
FIG. 41 is a flowchart showing guide route creation processing in the vehicle-mounted navigation device.

In creating a guide route, the vehicle-mounted navigation device executes guide route creation processing. FIG. 41 is a flowchart of the guide route creation processing in the vehicle-mounted navigation device in FIG. 22.

In the guide route creation processing, first, the point selection unit D22 selects points where the user desires to visit from the point search data D13 and the point registration data D14 and registers the points selected in the point list D27 (step S1).

Specifically, the point selection unit D22 causes the liquid crystal monitor to display information in the point search data D13 and registered information in the point registration data D14. The point selection unit D22 causes the liquid crystal monitor to display a list of proposed points according to display operation of the touch panel by the user and selects a proposed point displayed as a point according to selection operation of the touch panel by the user. The point selection unit D22 creates the point list D27 in the RAM or the hard disk drive and registers the point selected in the point list D27. The user can select plural points. When plural points are selected by the user, the point selection unit D22 registers all the points in the point list D27.

The destination selection unit D23 selects a destination out of the points registered in the point list D27. Specifically, for example, the destination selection unit D23 judges whether a point selectable as a destination is registered in the point list D27 with reference to the point search data D13 (step S2).

When a point selectable as a destination is registered in the point list D27, the destination selection unit D23 selects the point as a destination (step S3).

When a point selectable as a destination is not registered in the point list D27, the destination selection unit D23 displays a screen for causing the user to input a destination on the liquid crystal monitor and selects one point as a destination according to operation of the touch panel by the user in the display state (step S4). When a point selectable as a destination is not registered in the point list D27, the destination selection unit D23 may select, for example, a point registered last in the point list D27 as a destination.

The route pattern creation unit D24 creates a route pattern on the basis of the point list D27 and the destination (step S5). Specifically, for example, first, the route pattern creation unit D24 determines a routing order of the route points registered in the point list D27.

The route pattern creation unit D24 sets, for example, a present time as a departure time and adds a moving time from the start point to a first route point to the departure time. This moving time may be a traveling time on the route found in the route search data D16 in accordance with the route search condition data D17 or may be a traveling time simply calculated according to a distance from the start point to the first route point. Time of a result of this calculation is an arrival time at the first route point.

Moreover, the route pattern creation unit D24 selects stay time data at the route point from the point condition table for genre D15 and adds the stay time selected to the arrival time at the first route point. Time of a result of this calculation is a departure time from the first route point.

The route pattern creation unit D24 adds a moving time to the next route point to the departure time from the first route point. Time of a result of this calculation is an arrival time at a second route point.

The route pattern creation unit D24 repeats the processing for adding stay times at the respective route points and the processing for adding moving times among the route points and a moving time from the last route point to the destination described above until an arrival time at the destination is obtained and creates a route pattern from the start point to the destination.

When two or more route points (three or more points) are registered in the point list D27, the route pattern creation unit D24 changes a routing order of the route points to perform the same time calculation and create plural route patterns.

The route pattern creation unit D24 may create route patterns for all combinations of the routing orders or may create route patterns for a part of the combinations. For example, when there are two points close to each other, the route pattern creation unit D24 does not have to create a route pattern for a routing order in which a route passes through a distant point between the points. Consequently, it is possible to reduce an amount of processing of the route pattern creation unit D24.

FIG. 31 is a table showing an example of plural route patterns created by the route pattern creation unit D24 in FIG. 40. A record of each route pattern includes data indicating a routing order of plural points and data indicating arrival times at the respective points. In FIG. 31, three route patterns passing through the five points A to E in the figure are shown. For example, a route pattern in a first row is a route pattern passing through the points in an order of "B→C→D→E→A". An arrival time at the route point B is "10:30", an arrival time at the route point C is "12:00", an arrival time at the route point D is "14:00", an arrival time at the route point E is "15:00", and an arrival time at the destination A is "18:00".

Subsequently, the route pattern judgment unit D25 judges propriety of the route patterns created by the route pattern creation unit D24 (step S6).

Specifically, for example, the route pattern judgment unit D25 judges, with reference to data of guide time frames in the point search data D13 and the point registration data D14 (i.e., time frames in which guide is possible, for example, a business time frame), whether the arrival times at the respective points match the respective guide time frames. When the arrival times at all the points match the guide time frames, the route pattern judgment unit D25 judges that the route patterns are conforming. When the arrival times at one or more points do not match the guide time frames, the route pattern judgment unit D25 judges that the route patterns are nonconforming.

The route pattern creation unit D25 creates the route pattern list D28 and registers the route patterns judged as conforming in the route pattern list D28.

For example, when data of the three route patterns shown in FIG. 31 is supplied from the route pattern creation unit D24 to the route pattern judgment unit D25, if the three route patterns in FIG. 31 and the guide time frames of the point search data D13 in FIG. 40 are compared, in the route pattern in the first row in FIG. 31, the arrival time at the route point B and the arrival time at the route point D are not included in the guide time frame. Thus, the route pattern is judged as nonconforming. In a route pattern in a second row in FIG. 31, since the arrival time at the route point B is not included in the guide time frame, the route pattern is judged as nonconforming. In a route pattern in a third row in FIG. 31, since arrival times at all the points are within the guide time frames, the route pattern is judged as conforming. Therefore, the route pattern judgment unit D25 registers only the route pattern in the third row among these three route patterns in the route pattern list D28.

Subsequently, the route pattern display selection unit D26 performs processing for selecting one route pattern out of the route patterns registered in the route pattern list D28.

Specifically, for example, first, the route pattern display selection unit D26 displays the route patterns registered in the route pattern list D28 on the liquid crystal monitor A5 (step S7). FIG. 24 is a diagram showing an example of a display screen for a route pattern displayed on the liquid crystal monitor A5 in FIG. 22.

The display screen shown in FIG. 24 is a display screen for the route pattern in the third row in FIG. 31. On the display screen shown in FIG. 24, a start point, plural route points, and a destination are arranged to be displayed from the left side to the right side on the screen. On the display screen shown in FIG. 24, names, stay times, and arrival times of the respective points are displayed as information on the respective points.

On the display screen shown in FIG. 24, a before button B41, a next button B42, a select button B43, and a detail button B44 are displayed in a lower part of the display screen. When the user operates the before button B41 on the touch panel, the route pattern display selection unit B26 displays, on the display screen, a route pattern registered immediately before the route pattern currently displayed in the route pattern list B28. When the user operates the next button B42 on the touch panel, the route pattern display selection unit D26 displays, on the display screen, a route pattern registered immediately after the route pattern currently displayed in the route pattern list D28.

When the user operates the detail button B44 on the touch panel, the route pattern display selection unit D26 displays, on the liquid crystal monitor, detailed information of the route pattern currently displayed.

The detailed display screen shown in FIG. 25 has a display frame D51 for a guide map on the left part of the screen. An image obtained by superimposing a guide map D52 serving as a map image, a route line D53 indicating a guide route, an image D54 indicating plural points from a start point to a destination, and an image D55 indicating a vehicle and serving as an image indicating a position of the vehicle-mounted navigation device one on top of another is displayed in the display frame D51 for a guide map.

In order to create the image displayed in the display frame D51 for a guide map, the route pattern display selection unit D26 reads image data including plural points and an entire guide route from the map data D18. The route pattern display selection unit D26 compares a departure time from a start point and the background color table D19 to select a base color corresponding to the departure time from the start point. The route pattern display selection unit D26 creates, as the base color selected, data of the guide map D52 from the image data read from the image data D18.

The route pattern display selection unit D26 creates image data obtained by superimposing the route line D53 indicating a guide route based on the guide route data D29, the image D54 indicating plural points, and the image D55 indicating the vehicle on the guide map D52 based on the data of the guide map D52. When the detailed display screen shown in FIG. 25 is displayed for the first time, the image D55 indicating the vehicle is allocated near the image D54 indicating a point of the start point. The route pattern display selection unit D26 displays this image data generated on the liquid crystal monitor A5.

On the detailed display screen shown in FIG. 25, a start point, plural route points, and a destination are displayed to be arranged from the upper side to the lower side on the right side of the screen. The user can learn a route pattern in detail on this screen.

Moreover, on the detailed display screen shown in FIG. 25, images of a play button D57, a stop button D58, a reverse play button D59, a fast-forward button D60, and a rewind button D61 are displayed in the lower part of the screen.

When the user selects the play button D57 using the touch panel A7, the route pattern display selection unit D26 starts periodical update for the image data displayed in the display frame D51 for a guide map.

Specifically, the route pattern display selection unit D26 serving as moving means moves the image D55 indicating the vehicle from the start point along the route line D53 indicating the guide route. After moving the image D55 indicating the vehicle, the route pattern display selection unit D26 serving as arrival time calculating means calculates an arrival time of the vehicle at a moving location thereof. Moreover, the route pattern display selection unit D26 serving as updating means compares the time calculated and the background color table D19 to select a base color of the guide map D52 and changes the base color of the guide map D52 to the base color selected.

The route pattern display selection unit D26 periodically repeats the processing for moving the image D55 indicating the vehicle and the processing for updating a color tone of the guide map D52 until the image D55 indicating the vehicle reaches the destination along the route line D53 indicating the guide route.

Figure 42:
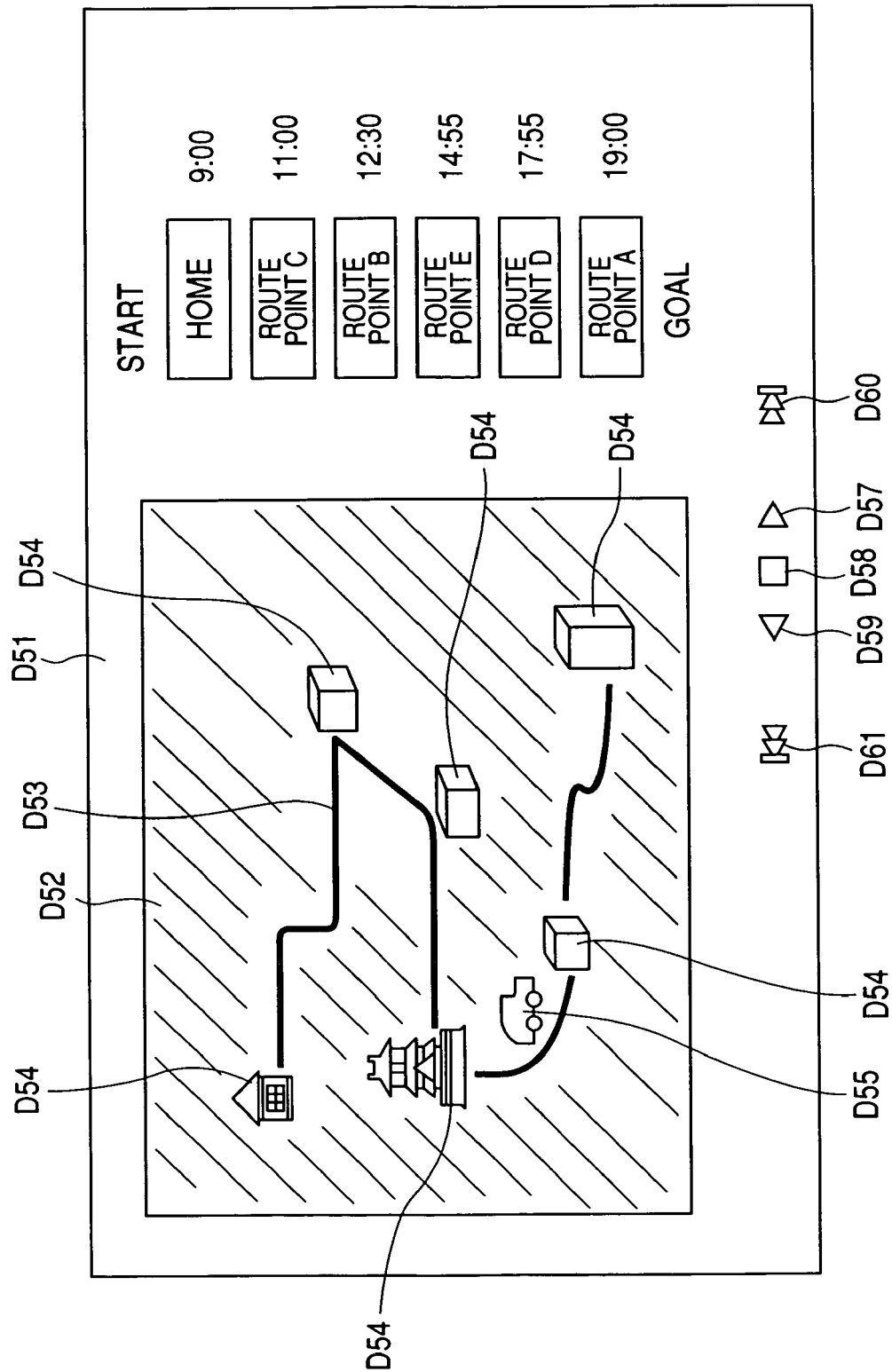
FIG. 42 is a diagram showing an example of a detailed display screen for a route pattern displayed on a liquid crystal monitor when an image showing a vehicle is near a guide route between a route point E and a route point D.

Consequently, the image D55 indicating the vehicle moves along the route line D53 indicating the guide route on the guide map D52 and a color of the guide map D52 changes according to the arrival time at the moving location of the image D55 indicating the vehicle. In the case of the example in FIG. 25, the image D55 indicating the vehicle passes 17:00, which is a switching time for a background color in the background color table D19, on the guide route between the route point E and the route point D. Therefore, in a period in which the image D55 indicating the vehicle moves between the route point E and the route point D, the color of the guide map D52 changes a color based on blue indicating the daytime to a color based on gray indicating the night. FIG. 42 is a diagram showing an example of a detailed display screen of a route pattern that is displayed on the liquid crystal monitor A5 in FIG. 22 when the image D55 indicating the vehicle is near the guide route between the route point E and the route point D.

When the user selects the stop button D58 using the touch panel A7, the route pattern display selection unit D26 stops the periodical update of the image data displayed in the display frame D51 for a guide map. When the user selects the reverse play button D59 using the touch panel A7, the route pattern display selection unit D26 moves the image D55 indicating the vehicle to return to the start point along the route line D53 indicating the guide route and updates a color tone of the guide map D52 according to an arrival time of the vehicle at the moving location. When the user selects the fast-forward button D60 using the touch panel A7, the route pattern display selection unit D26 moves the image D55 indicating the vehicle to a part close to the image D54 indicating the next point on the guide route and updates the color tone of the guide map D52 according to an arrival time of the vehicle at the moving location. When the user selects the rewind button D61 using the touch panel A7, the route pattern display selection unit D26 moves the image D55 indicating the vehicle to a part close to the image D54 indicating an immediately preceding point on the guide route and updates the color tone of the guide map D52 according to an arrival time of the vehicle at the moving location.

Since the color tone of the guide map D52 changes according to a moving location on the guide map D52 of the image D55 indicating the vehicle, the user can intuitively learn in which part of the guide route the morning comes or the night falls.

The image D55 indicating the vehicle may be moved for each node of the guide route, may be moved for each predetermined plural links serving as the guide route, may be moved for each predetermined moving distance or moving time, or may be moved for each intersection where the vehicle should take a turn on the guide route.

It is possible to calculate an arrival time at an arrangement position of the image D55 indicating the vehicle by sequentially adding time required of links that the vehicle passed up to the moving location and stay times at route points that the vehicle passed up to the moving position to a departure time at the start point in an order of the passage.

In this case, by moving the image D55 indicating the vehicle, for example, for each plural kinds, for each predetermined moving distance, or for each intersection that the vehicle should take a turn on the guide route, it is possible to reduce the number of times of display of the image D55 indicating the vehicle is updated and reduce the number of times of update processing for the color tone of the guide map D52 based on the movement.

On the display screen for the route pattern shown in FIG. 24, when the user operates the selection button D43 on the touch panel A7 (step S8), the route pattern display selection unit D26 serving as route selecting means causes the hard disk drive A3 to store the displayed route pattern as the guide route data D29 (step S9).

According to the processing described above, the vehicle-mounted navigation device creates the guide route data D29. The guide route data D29 created is stored in the hard disk drive A3.

When the user is guided to a route in accordance with the guide route data D29, in the vehicle-mounted navigation device, the route guide unit D31 reads, on the basis of a present location specified on the basis of information on present latitude and longitude or the like obtained by the GPS receiver 8, data of a predetermined range including the present location in the map data D18 and displays a map and a present location based on the data read on the liquid crystal monitor A5. The route guide unit D31 reads data in the display range from the guide route data D29 and displays a route line of the guide route based on the data to be superimposed on the map.

When the vehicle moves, a value of the present latitude and longitude outputted from the GPS receiver A8 also changes according to the movement. The route guide unit D31 updates the display of the map and the guide route such that the present location continues to be displayed on the liquid crystal monitor A5.

Therefore, the user reaches from the start point to the destination through the respective route points by moving the vehicle such that the present location moves on the guided route.

As described above, in the vehicle-mounted navigation device according to the embodiment of the invention III, it is possible to create the guide route data 29 of a guide route, which passes through plural route points, taking into account stay times at the respective route points and guide the user using this guide route data D29. Therefore, the user can stay at the respective route points for the stay times corresponding to needs, arrive at the respective route points at desired times, and spend a day enjoying sightseeing, meals, and the like to the full at the respective route points. The user can also arrive at the destination at a desired time.

Moreover, before the user selects the guide route data D29, which actually guides the user, out of plural route patterns, the vehicle-mounted navigation device according to this embodiment causes the user move the image D55 indicating the vehicle on the respective guide routes and view an image in which a color tone of the guide map D52 is changed according to an arrival time at a moving location of the image D55 indicating the vehicle.

Consequently, the user can intuitively learn a matter that is less easily grasped simply by displaying plural points together with guide times at the respective points, that is, in which part of a guide route the morning comes or the night falls. As a result, the user can easily and accurately select a route pattern in which the user visits, in the day time, a route point preferable for visit in the daytime, a route pattern in which the user passes, in a time frame desired by the user, a route preferable for passage in the evening, and the like out of the plural route patterns.

Therefore, the vehicle-mounted navigation device according to this embodiment can create the guide route data D29 that allows the user to take pleasure in a stay time at a point where the user wants to visit and a moving time between points as a whole.

The embodiment described above is an example of a preferred embodiment of the invention III. However, the invention III is not limited to this and various modifications and alterations of the invention III are possible.

In the embodiment, the route pattern display selection unit D26 changes a color tone of the guide map D52 serving as a background according to an arrival time at a moving location of the image D55 indicating the vehicle. Besides, for example, the route pattern display selection unit D26 may change luminance of the guide map D52 serving as a background according to an arrival time at a moving location of the image D55 indicating the vehicle. In this case, information associating luminance values only has to be stored in the background color table D19.

In the embodiment, the route pattern display selection unit D26 changes a color tone of the guide map D52 in the daytime and at night on the basis of the background color table D19. Besides, for example, the route pattern display selection unit D26 serving as altitude calculating means may calculate an altitude of a moving location of the image D55 indicating the vehicle and change a color tone and/or luminance of the guide map D52 according to the altitude of the moving position. The route pattern display selection unit D26 may change, when the image D55 indicating the vehicle passes a tunnel or the like, a color tone of the guide map D52. In this case, altitudes of the respective points and color tones of a map image only have to be associated in the background color table D19. For example, a cold color is used when the altitude is high and a warm color is used when the altitude is low.

In the embodiment, in the background color table D19, a day is divided into plural time frames in the daytime and at night and base colors are stored for the respective time frames. The route pattern display selection unit D26 selects a color of a time frame matching an arrival time at a moving location of the image D55 indicating the vehicle from the background color table D19. Besides, for example, it is also possible that not shown communicating means serving as acquiring means is connected to the I/O port A5, the communicating means acquires weather information from the Internet or a radio, and the route pattern display selection unit D26 selects a weather matching a moving position of the image D55 indicating the vehicle from the weather information acquired and changes a color tone of the guide map D52 according to the weather. In this case, weathers at points and color tones of a map image only have to be associated in the background color table D19.

For example, when a weather in a moving location of the image D55 indicating the vehicle is fine, the route pattern display selection unit D26 only has to set a color toner of the guide map D52 to blue. When a weather in a moving location of the image D55 indicating the vehicle is cloudy, the route pattern display selection unit D26 only has to set a color tone of the guide map D52 to light gray. When a weather in a moving location of the image D55 indicating the vehicle is rainy, the route pattern display selection unit D26 only has to set a color tone of the guide map D52 to dark gray.

In controlling a color tone of the guide map D52 on the basis of weather information in this way, when the weather information is provided for each prefecture, the route pattern display selection unit D26 may execute processing for changing a color tone of the guide map D52 only when a moving location of the image D55 indicating the vehicle crosses a prefecture boundary.

In the embodiment, the route pattern display selection unit D26 updates a color tone of the guide map D52 according to a moving location of the image D55 indicating the vehicle. Besides, for example, the route pattern display selection unit D26 may display, in the display frame D51 of the guide map, images indicating the day and the night corresponding to an arrival time at a moving location of the image D55 indicating the vehicle, for example, a mark of the sun in a time frame in the daytime, a mark of the sun and the horizon in the evening, a mark of the moon at night, and the like or display an image indicating a weather corresponding to a moving location of the image D55 indicating the vehicle. The time frames may be sectioned smaller than the distinction of the day and the night. It is also possible that a table of color tones in which weathers and time frames are combined is created and a color tone corresponding to an arrival time and a weather in a moving location of the image D55 indicating the vehicle is read out from the table. The route pattern display selection unit D26 may change, according to a residual quantity of gas, which can be calculated on the basis of a mileage and fuel information of the vehicle, a color of the image D55 indicating the vehicle to blue when the residual quantity is sufficient and to yellow when the residual quantity is small.

According to the invention III, there is an effect that it is possible to intuitively check, in checking a guide route before route guide, that is, before departure, in what kind of state each point on the guide route is when the user arrives at the point.

[Invention IV]

First Embodiment

Figure 43:
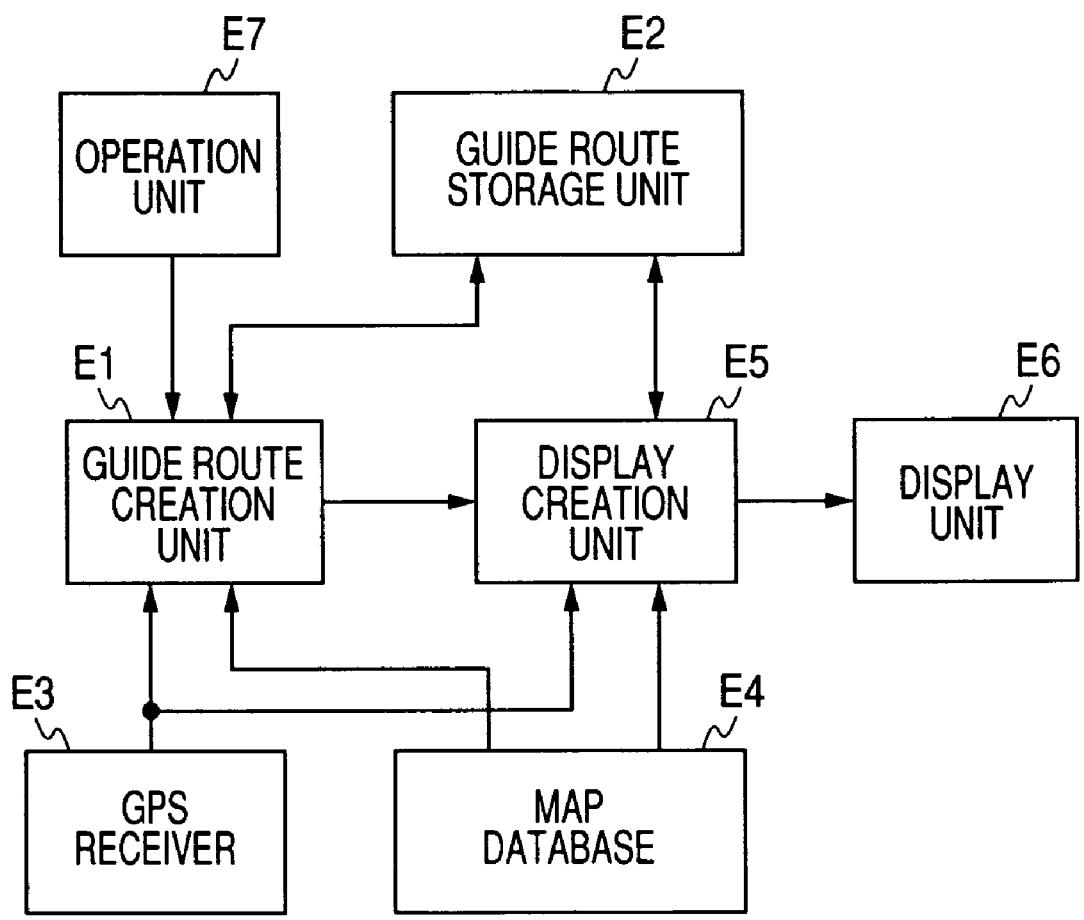
FIG. 43 is a block diagram showing a constitution of a navigation device according to a first embodiment of the invention II.

FIG. 43 is a block diagram showing a constitution of a navigation device according to a first embodiment of the invention IV. In the navigation device shown in FIG. 43, a guide route creation unit E1 is a section functioning as a guide route search device that creates guide route data and is realized by a dedicated circuit, a microprocessor that executes a program, and the like.

The guide route storage unit E2 is a recording medium that functions as storing means for storing guide route data and candidates of guide routes. This guide route storage unit E2 is realized by a semiconductor memory, a magnetic recording medium such as a hard disk drive, or the like. The guide route storage unit E2 may accumulate guide route data used for guide in the past.

A GPS (Global Positioning System) receiver E3 is a device that receives a radio wave of location information from a GPS artificial satellite not shown in the figure and outputs latitude and longitude data indicating a location on the earth of the GPS receiver E3, time data, and the like. The GPS receiver E3 receives radio waves of location information from, for example, four or more artificial satellites to output latitude and longitude data indicating a location on the earth of the GPS receiver E3.

A map database E4 is a recording medium that stores in advance map information concerning a predetermined place on the earth such as the entire Japan or the Kanto district. The map database E4 is realized as, for example, a portable recording medium such as a hard disk drive or a DVD (Digital Versatile Disc), a reading device therefor, and the like. The map database E4 has display map data in which natural features, roads, and the like in the predetermined region on the earth are imaged, latitude and longitude data for specifying an arbitrary location in the predetermined region on the earth, and road data for route search in the predetermined region on the earth.

The road data for route search includes, for example, road attribute data indicating each road between intersections and intersection data indicating intersections. In the road attribute data, moving time data of the road is included together with distance data of the road. Plural moving time data corresponding to, for example, seasons and time zones may be included in the road attribute data.

A display creation unit E5 is a section that functions as guide data creating means for creating display data for route guide and is realized by a dedicated circuit, a microprocessor that executes a program, and the like. A display unit E6 is a device that functions as displaying means for displaying display data, that is, photographs, figures, characters, and the like for guide and output means. For example, the display unit E6 includes a liquid crystal display.

An operation unit E7 is a section that is operated by a user and functions as inputting means for outputting an electric signal corresponding to operation by the user. This operation unit E7 is realized as a hardware switch arranged on a device housing, an operation unit display formed by the display unit E6, a software switch of a touch panel arranged on a display screen of the display unit E6, and the like. As the operation unit E7, a separate remote controller and a communication circuit communicating with the remote controller may be provided. The touch panel is an input device that is arranged on the display screen of the display unit E6 and an entire or a most part of which is formed by a transparent or translucent planar member. When pressed by a finger or the like of the user, the touch panel detects a pressed position and outputs the pressed position. Therefore, a user interface is constituted by the touch panel and the display unit.

Figure 44:
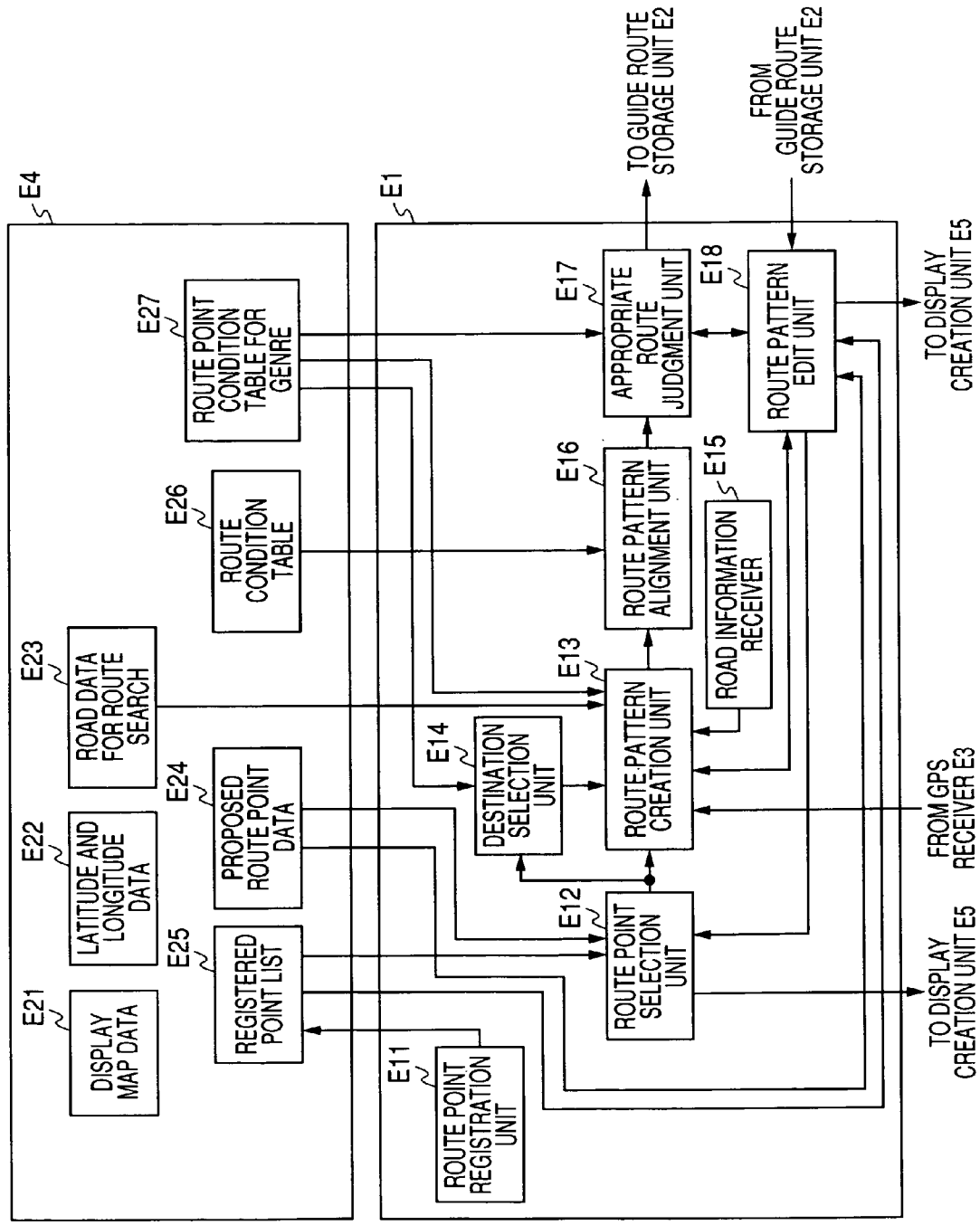
FIG. 44 is a block diagram showing details of a guide route creation unit and a map database in FIG. 43.

FIG. 44 is a block diagram showing details of the guide route creation unit E1 and the map database E4 in FIG. 43. As shown in FIG. 44, data described below are stored in the map database E4 other than display map data E21, latitude and longitude data E22, road data for route search E23.

Proposed route point data E24 is data of points registered in advance as candidates of route points selectable by the user. A registered point list E25 is data of points additionally registered by the user as candidates of route points.

A route condition table E26 is a table including conditions for searching for a guide route leading from a start point to a destination via route points (route search). For example, a condition such as a shortest moving time, a shortest moving distance, or minimum cost is registered in the route point condition table E26. Plural conditions may be registered in the route point condition table E26. The condition may be a condition obtained by combining conditions concerning plural items (a distance and time) such as a shortest moving time in a range of 150 km or less.

A route point condition table for genre E27 is a table including data of conditions at route points set for each genre of route points.

In the guide route creation unit E1 shown in FIG. 44, the route point registration unit E11 creates data of a point to be registered, adds the data to the registered point list E25, and registers the data in the map database E4. Data of a point is constituted by, for example, name data indicating a name of the point and latitude and longitude data of the point.

A route point selection unit E12 selects, on the basis of operation by the user, one or plural route points included in the proposed route point data E24 and the registered point list E25 and creates a route point list constituted by those route points. This route point selection unit E12 functions as route point designating means. A destination selection unit E14 selects, on the basis of operation by the user, one of the route points included in the route point list as a destination.

A route pattern creation unit E13 functions as search means for creating a route pattern on the basis of the route point list and searching for a route passing through the respective route points along the route pattern. A road information receiver E15 is a receiver that receives road information according to a VICS (Vehicle Information and Communication System) or the like.

A route pattern alignment unit E16 arranges one or plural route patterns created by the route pattern creation unit E13 in accordance with the conditions in the route condition table E26 to create a route pattern list.

An eligible route judgment unit E17 functions as judging means for judging whether the respective route patterns in the route pattern list satisfy the route point conditions in the route point condition table for genre E27 and selecting a route pattern that satisfies the route point conditions.

A route pattern edit unit E18 edits, according to operation by the user on the operation unit E7, a route pattern usable as guide route data. This route pattern edit unit E18 functions as route pattern editing means. Specifically, for example, the route pattern edit unit E18 adds a route point to a route pattern.

When the guide route creation unit E1 is realized by a microprocessor and a program, the respective functional units E11 to E18 are realized by CPUs or MPUs that execute programs therefor. Output data of the functional units are temporarily stored in a memory such as a RAM built in or externally connected to the microprocessor, read out to a functional unit at a post stage, and used.

An example of the proposed route point data E24 in FIG. 44 is shown in FIG. 3. For details of content in FIG. 3, please refer to the explanation of the embodiments of the invention I.

An example of the route point condition table for genre E27 in FIG. 44 is shown in FIG. 4. For details of content in FIG. 4, please refer to the explanation of the embodiments of the invention I.

Operations of the navigation device shown in FIG. 43 will be explained.

First, the route point selection unit E12 of the guide route creation unit E1 reads out name data of proposed route points in the proposed route point data E24 and name data of points registered in the registered point list E25 and causes the display unit E6 to display names of the proposed route points and the points registered by the user via the display creation unit E5 on the basis of the name data. When the names of the proposed route points and the points registered by the user are selected by operation by the user on the operation unit E7, the route point selection unit E12 sets records of route points or registered points corresponding to the selected names as route point data and sets one or plural route point data as a route point list. When route points are selected, genre search, address search, telephone number search, and the like may be executed. The route point selection unit E12 may cause the display unit E6 to display a map via the display creation unit E5 on the basis of the display map data in the map database E4, cause the user to select a location on the map of the registered points on the touch panel serving as the operation unit E7, and specify a point corresponding to a display position selected (i.e., a pressed location) as a route point.

When a name of a point desired by the user is not displayed on the display unit E6, the user can register the desired point in the registered point list E25. In that case, the route point registration unit E11 creates registered point data from the input data inputted according to operation on the operation unit E7 and additionally registers the registered point data in the registered point list E25. The route point selection unit E12 causes the display unit E6 to display a name of the point on the basis of the registered point data additionally registered. Thereafter, the user can select the place as route point data. In additionally registering a point desired by the user, the user may input a value of latitude and longitude data of the registered point data. However, the route point registration unit E11 may cause the display unit E6 to display a map on the basis of the display map data in the map database E4, cause the user to select a location on the map of the registered points on the touch panel serving as the operation unit E7, and use a value of latitude and longitude data corresponding to a display position selected (i.e., a pressed position) as a value of latitude and longitude data of the registered point data. Besides, for example, when a present location is a registered point, the route point registration unit E11 may use a value of the latitude and longitude data outputted by the GPS receiver E3 as a value of latitude and longitude data of the registered point data.

In this way, one or plural route points desired by the user are selected by the route point selection unit E12.

Subsequently, the destination selection unit E14 of the guide route creation unit E1 selects one of one or plural route points included in the route point list created by the route point selection unit E12 as a destination. Specifically, the destination selection unit E14 specifies a genre of each route point data included in the route point list and refers to the route point condition table for genre E27. When a route destination is marked "○ (allowed)" in final destination availability data of the route point data, the destination selection unit E14 sets the route point as a destination.

Besides, when a home is included in the route point list as a route point, the destination selection unit E14 may set the home as a destination. In general, route point data of a home is often registered in the registered point list E25. Therefore, the destination selection unit E14 may select route point data matching the route point data registered in the registered point list E25 among the route point data included in the route point list from the route point selection unit E12 as a destination. In particular, it is also possible that a flag indicating a home is provided in the registered point data of the home in advance and the destination selection unit E14 selects route point data matching the route point data including the flag as a destination. The destination selection unit E14 may select a route point registered first or last in the registered point list E25 as a destination.

Moreover, the destination selection unit E14 may select a route point of a genre, a final time of a guide time of which is set latest in the route point condition table for genre E27, as a destination. For example, when a guide time is set as "15:00 to 24:00" as in the genre "hotel" shown in FIG. 3, a final time is set as 24:00 at the end of a day. Thus, a route point with the genre "hotel" is selected as a destination.

When a destination cannot be specified in the way described above, the destination selection unit E14 may select a route point serving as a destination on the basis of operation by the user on the operation unit E7.

In this way, a destination (a final arrival point) is selected from the route points in the route point list by the destination selection unit E14.

Subsequently, the route pattern creation unit E13 creates plural route patterns leading from the start point to the destination passing through all the route points included in the route point list from the route point selection unit E12 in order. Latitude and longitude data of the start point may be a point of present latitude and longitude data outputted by the GPS receiver E3 or may be latitude and longitude data of the start point selected by the user. The route pattern creation unit E13 creates permutations of all the route points included in the route point list as route patterns. For example, when the number of route points other than the destination is four, the number of route patterns is twenty-four.

For each of the route patterns, the route pattern creation unit E13 searches for, using the road data for route search E23, a route leading from the start point to the destination via the route points according to the order of the route points in the route pattern. In that case, time required for movement among the respective points, that is, the start point, the route points, and the destination is also calculated. In the route search for each of the route patterns, the route pattern creation unit E13 specifies stay times associated with genres of the respective route points with reference to the stay time data in the route point condition table for genre E27 in FIG. 4 and performs route search with the stay times included in the time required of the route. The route pattern creation unit E13 calculates moving times among the points taking into account traffic jam information received by the route information receiver E15. Consequently, for the respective route patterns, guide schedules including arrival times at the respective points and departure times from the respective points are specified and included in the data of the route patterns.

In principle, the route pattern creation unit E13 creates route patterns for all combinations of passing orders of the route points other than the destination. However, for example, a route pattern passing through plural route points in an order in which a loop is formed, a route pattern passing through plural route points in an order in which in which a route passes an identical region plural times, and the like are not created.

In this way, one or plural route patterns are created from the route point list by the route pattern creation unit E13.

Subsequently, the route pattern alignment unit E16 creates a route pattern list in which one or plural route patterns created by the route pattern creation unit E13 in an order based on the conditions in the route condition table E26.

When a new route pattern is created by the route pattern creation unit E13, the route pattern alignment unit E16 adds this route pattern to the route pattern list as occasion demands. In particular, the route pattern alignment unit E16 rearranges the new route pattern and the route patterns already included in the route pattern list.

An example of a route pattern list created by the route pattern alignment unit E16 in the first embodiment is shown in FIG. 5 as in the invention I. For details of content of the route pattern list, please refer to the explanation of the embodiments of the invention I.

Subsequently, the eligible route judgment unit E17 selects route patterns, all route points and a target of which satisfy the conditions in the route point condition table for genre E27, among the route patterns included in the route pattern list from the route pattern alignment unit E16 and causes the guide route storage unit E2 to store one or plural route patterns selected as candidates of guide route data.

For example, in the case of the route pattern list shown in FIG. 5, the eligible route judgment unit E17 performs the following processing. First, the eligible route judgment unit E17 performs eligibility judgment for the route pattern of the first record. A first route point B of the first record is classified into the genre of "restaurant" in FIG. 3. A guide time to a route point with the genre "restaurant" is "11:00 to 13:00, 18:00 to 20:00" in FIG. 4. In the route pattern list in FIG. 5, an arrival time at the route point B is "10:30". Therefore, since the arrival time at the route point B is not included in the guide time to the restaurant that is a route point condition set in the route point, the eligible route judgment unit E17 judges the route pattern of the first record as ineligible.

Subsequently, the eligible route judgment unit E17 performs eligibility judgment for a route pattern of a second record. Since a first route point of the second record is also B, the eligible route judgment unit E17 judges the route pattern of the second record as ineligible.

Moreover, the eligible route judgment unit E17 performs eligibility judgment for a route pattern of a third record. A first route point C of the third record is classified into the genre of "department store" in FIG. 3. A guide time to a route point with the genre "department store" is not set in FIG. 4. Therefore, the eligible route judgment unit E17 judges that the first route point C of this route pattern satisfies the route point conditions. The eligible route judgment unit E17 performs eligibility judgment for a second route point B of this route pattern. The second route point B is classified into the genre of "restaurant". An arrival time at the restaurant "12:30" satisfies the guide time to the restaurant in FIG. 4. Thus, the eligible route judgment unit E17 judges that the second route point B satisfies the route point conditions. Similarly, the eligible route judgment unit E17 judges that a third route point E, a fourth route point D, and a fifth route point (a destination) A satisfy the route point conditions. Therefore, the eligible route judgment unit E17 judges the route patter of the third record as eligible and causes the guide route storage unit E2 to store the route pattern as a candidate of guide route data.

According to the series of search operations for a guide route, one or plural route patterns satisfying the conditions in the route point condition table for genre E27 are stored in the guide route storage unit E2 as guide route data.

When the one or plural route patterns usable as guide route data are obtained, the display creation unit E5 causes the display unit E6 to display a list of the route patterns. When operation for selecting one route pattern desired by the user from the route patterns displayed on the display unit E6 as guide route data is applied to the operation unit E7, the eligible route judgment unit E17 decides the one route pattern as guide route data actually used for route guide. Route information corresponding to the selected route pattern (information on plural road links selected in the search by the route pattern creation unit E13) is also stored in the guide route storage unit E2. Data concerning the route patterns not selected do not have to be deleted from the guide route storage unit E2 because the data are likely to be selected later.

Moreover, in the navigation device according to the first embodiment, it is possible to add a route point to a route pattern usable as guide route data before deciding one route pattern as the guide route data.

Figure 45:
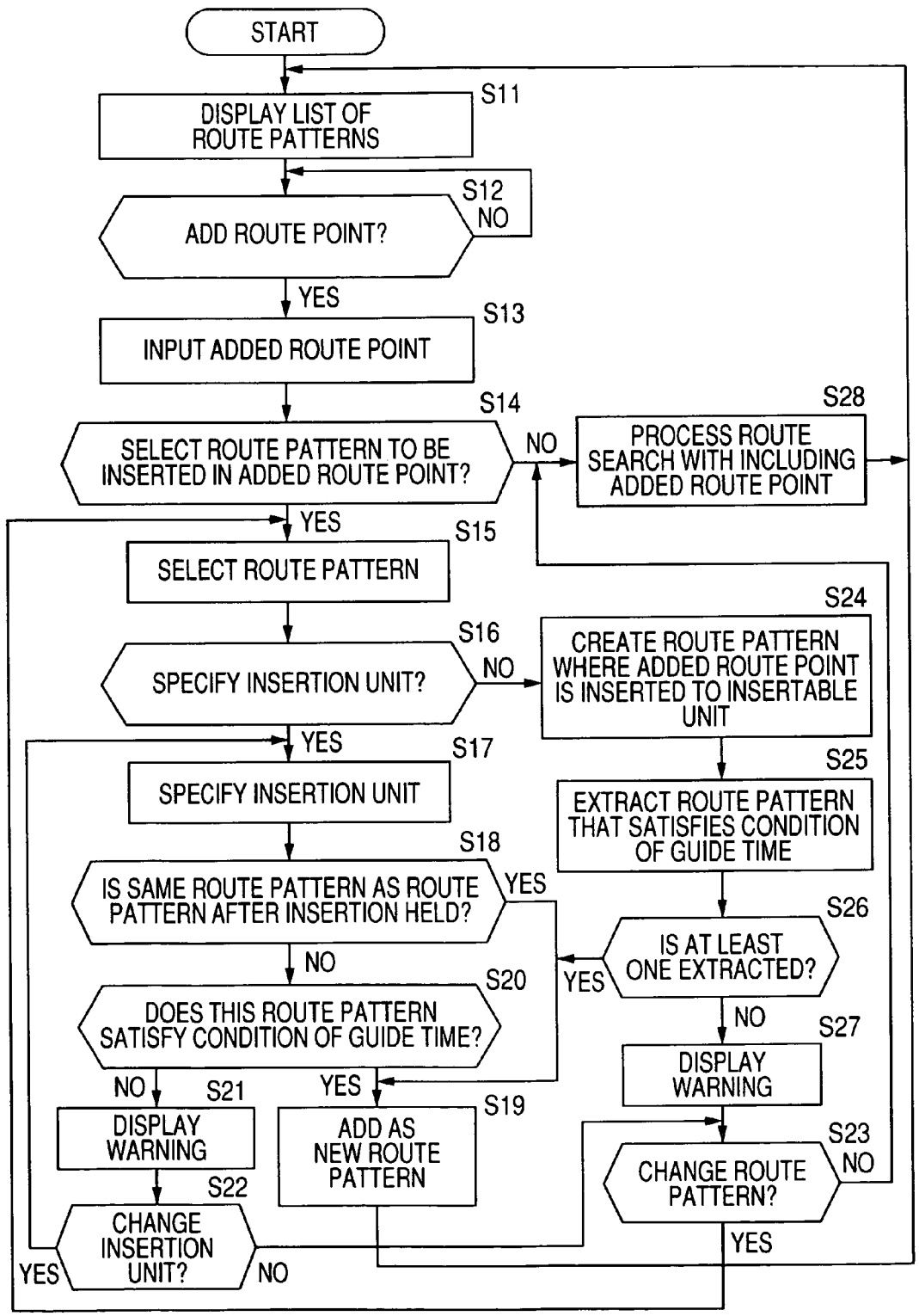
FIG. 45 is a flowchart for explaining processing at the time when a route point is added to a route pattern usable as guide route data in a first embodiment of the invention IV.

Processing in adding a route point to a route pattern usable as guide route data will be hereinafter explained. FIG. 45 is a flowchart for explaining processing in adding a route point to a route pattern usable as guide route data in the first embodiment. FIG. 46 is a diagram showing an example of display by the display unit E6 in adding a route point to a route pattern usable as guide route data in the first embodiment.

First, as described above, the display creation unit E5 causes the display unit E6 to display one or plural route patterns usable as guide route data (step S11).

In a state in which one or plural route patterns usable as guide route data are displayed on the display unit E6 in this way, it is watched whether user operation for selection of one route pattern actually used for route guide as described above, user operation for addition of a route point, and the like are applied to the operation unit E7 (step S12).

When the route pattern edit unit E18 finds that the user operation for addition of a route point is applied to the operation unit E7, the route pattern edit unit E18 selects, in the same manner as the route point selection unit E12, one additional route point from the points included in the proposed route point data E24 and the registered point list E25 on the basis of operation by the user (step S13).

Subsequently, the route pattern edit unit E18 causes the display unit E6 to display, via the display creation unit E5, an image or a text for causing the user to select a mode for selecting a route pattern to which a route point is added or a mode for not selecting the route pattern (step S14).

When the route pattern edit unit E18 finds that the operation for selecting the mode for selecting a route pattern to which a route point is added is applied to the operation unit E7, the route pattern edit unit E18 causes the display unit E6 to display, via the display creation unit E5, an image or a text for causing the user to select a route pattern to which a route point is added from a list of route patterns usable as guide route data (step S15). FIG. 46(A) shows an example of a selection screen in step S15. In FIG. 46(A), a test for facilitating operation "Please select a route pattern." and three route patterns 101-1 to 101-3 are displayed on the display unit E6. In FIG. 46(A), the touch panel serving as the operation unit E7 is mounted on a display screen of the display unit E6. The user performs selection operation for a route pattern by touching the touch panel with a finger or the like.

Thereafter, when the route pattern edit unit E18 finds that the operation for selecting a route pattern to which a route point is added is applied to the operation unit E7, the route pattern edit unit E18 specifies the route pattern as a route pattern to be processed and, for the route pattern selected, causes the display unit E6 to display, via the display creation unit E5, an image or a text for causing the user to select a mode for designating an insertion place for an additional route point (i.e., where among points the additional route point is inserted) or a mode for not designating an insertion place (step S16).

When the route pattern edit unit E18 finds that the operation for selecting a mode for designating an insertion place of an additional route point is applied to the operation unit E7, the route pattern edit unit E18 causes the display unit E6 to display, via the display creation unit E5, an image or a text for causing the user to select an insertion place from a list of places where a route point can be inserted in the route pattern. Thereafter, when the route pattern edit unit E18 finds that the operation for selecting an insertion place is applied to the operation unit E7, the route pattern edit unit E18 specifies the insertion place in the route pattern and inserts an additional route point in the insertion place to create a new route pattern (step S17). FIG. 46(B) shows an example of a selection screen in step S17. In FIG. 46(B), a text for facilitating operation "Please select an insertion place.", an image indicating points "B", "C", "D", "E", and "A" in the route pattern 101-1, and images E121 indicating sections among the points are displayed on the display unit E6. In FIG. 46(B), the touch panel serving as the operation unit E7 is mounted on the display screen of the display unit E6. The user performs selection operation for an insertion place by touching the touch panel with a finger or the like.

At this moment, it is unclear whether the new route pattern is a route pattern usable as guide route data. This is because it is possible that, although the original route pattern is a route pattern usable as guide route data, a route point not satisfying the route point conditions is created as a result of adding a route point. Therefore, it is judged whether the new route pattern is a route pattern usable as guide route pattern.

First, the route pattern edit unit E18 searches for a route pattern usable as guide route data stored in the guide route storing unit E2 and judges whether a route pattern identical with this new route pattern is stored in the guide route storage unit E2 (step S18).

When the route pattern edit unit E18 judges that a route pattern identical with the new route pattern is stored in the guide route storage unit E2, the route pattern edit unit E18 sets the new route pattern as a route pattern usable as guide route data and adds the route pattern to list display of route patterns on the basis of the guide route data of the route pattern identical with the new route pattern stored in the guide route storage unit E2 (step S19). FIG. 46(C) shows an example of list display after the processing in step S19. In FIG. 46(C), a new route pattern E131 created by adding a route point F to the route pattern E101-1 is added to the list display shown in FIG. 46(A). As shown in FIG. 46(C), on the display unit E6, the route pattern E131 created anew is displayed at the top.

On the other hand, when it is judged in step S18 that a route pattern identical with this new route pattern is not stored in the guide route storage unit E2, the route pattern edit unit E18 supplies the new route pattern to the route pattern creation unit E13. Concerning the new route pattern, first, the route pattern edit unit E18 causes the route pattern creation unit E13 to search for a route leading from a start point to a destination passing through route points according to an order of the route points. In that case, the route pattern edit unit E18 also causes the route pattern creation unit E13 to calculate time required for movement among the respective points, that is, the start point, the route points, and the destination. The route pattern creation unit E13 supplies a result of route search for the new route pattern (a guide schedule, etc.) to the route pattern edit unit E18.

The route pattern edit unit E18 supplies data of the new route pattern to the eligible route judgment unit E17. The eligible route judgment unit E17 judges whether all the route points in the new route pattern satisfy the route point conditions (step S20). The eligible route judgment unit E17 supplies a result of the judgment to the route pattern edit unit E18.

When the eligible route judgment unit E17 judges that all the route points in the new route pattern satisfy the route point conditions, the eligible route judgment unit E17 causes the guide route storage unit E2 to store the new route pattern as a route pattern usable as guide route data and as a candidate of the guide route data together with route information. When the eligible route judgment unit E17 judges that all the route points in the new route pattern satisfy the route point conditions, the route pattern edit unit E18 sets the new route pattern as a route pattern usable as guide route data and adds the route pattern to the list display of route patterns on the basis of the guide route data of the new route pattern stored in the guide route storage unit E2 (step S19).

On the other hand, when it is judged in step S20 by the eligible route judgment unit E17 that any one of the route points in the new route pattern does not satisfy the route point conditions, the route pattern edit unit E18 causes the display unit E6 to display, via the display creation unit E5, a warning indication indicating that the new route pattern cannot be used as guide route data (step S21). Moreover, the route pattern edit unit E18 causes the display unit E6 to display, via the display creation unit E5, an image or a text for causing the user to select whether the insertion place of an additional route point should be changed (step S22). When the route pattern edit unit E18 finds that operation for selecting a change of the insertion place of an additional route point is applied to the operation unit E7, the route pattern edit unit E18 returns to step S17 and selects an insertion place again on the basis of operation by the user. Processing after that is the same as the processing described above.

On the other hand, when the route pattern edit unit E18 finds that operation for not selecting a change of the insertion place of an additional route point is applied to the operation unit E7, the route pattern edit unit E18 causes the display unit E6 to display, via the display creation unit E5, an image or a text for causing the user to select whether the route pattern to which a route point is added should be changed (step S23). When the route pattern edit unit E18 finds that operation for selecting a change of the route pattern to which a route point is added is applied to the operation unit E7, the route pattern edit unit E18 returns to step S15 and selects a route pattern again on the basis of operation by the user. Processing after that is the same as the processing described above.

When the route pattern edit unit E18 finds that the operation for selecting a mode for not designating an insertion place of an additional route point is applied to the operation unit E7 in step S16, the route pattern edit unit E18 adds route points to all places where it is possible to insert route points to the route pattern selected in step S15 and creates one or plural new route patterns (step S24). At this moment, it is unclear whether the new route patterns are route patterns usable as guide route data.

Subsequently, the route pattern edit unit E18 executes the same processing as steps S18 and S20 on each of the new route patterns created and extracts a route pattern in which the route point conditions are satisfied in all route points (including a destination) (step S25). The route pattern edit unit E18 judges whether at least one route pattern in which the route point conditions are satisfied in all the route points (including the destination) is extracted (step S26). When at least one route pattern in which the route point conditions are satisfied in all the route points (including the destination) is extracted, the route pattern edit unit E18 set the new route pattern as a route pattern usable as guide route data and adds the route pattern in the list display of route patterns on the basis of guide route data of the new route pattern stored in the guide route storage unit E2 (step S19).

On the other hand, when the route pattern in which the route point conditions are satisfied in all the route points (including the destination) is not extracted at all, the route pattern edit unit E18 causes the display unit E6 to display, via the display creation unit E5, a warning indication indicating that the route pattern usable as guide route data is not obtained at all (step S27). The route pattern edit unit E18 causes the display unit E6 to display, via the display creation unit E5, an image or a text for causing the user to select whether the route pattern to which a route point is added should be changed (step S23). When the route pattern edit unit E18 finds that the operation for selecting a change of the route pattern to which a route point is added is applied to the operation unit E7, the route pattern edit unit E18 returns to step S15 and selects a route pattern again on the basis of operation by the user. Processing after that is the same as the processing described above.

When the route pattern edit unit E18 finds that the operation for selecting a mode for not selecting a route pattern to which a route point is added is applied to the operation unit E7 in step S14 and when the route pattern edit unit E18 finds that the operation for not changing the route pattern to which a route point is added is applied to the operation unit E7 in step S23, the route pattern edit unit E18 adds the additional route point selected in step S13 to the route point (the registered point) selected by the route point selection unit E12. Thereafter, the route pattern edit unit E18 causes the route pattern creation unit E13, the destination selection unit E14, the route pattern alignment unit E16, and the eligible route judgment unit E17 to execute creation, alignment, and eligibility judgment of route patterns (step S28). A list of route patterns usable as guide route data obtained by the processing is displayed instead of a list displayed before the addition of the route point (step S11).

Figure 47:
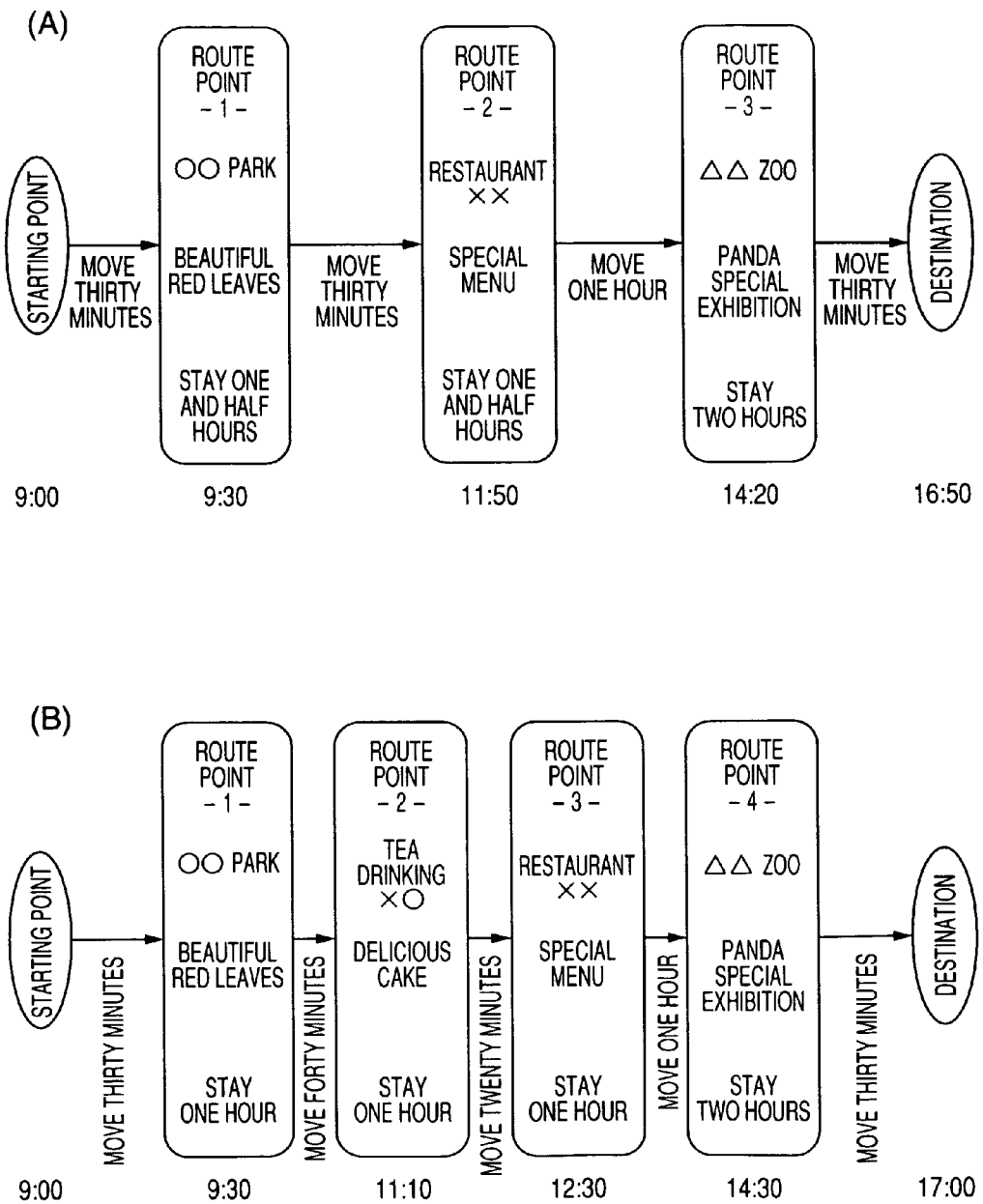
FIG. 47 is a diagram showing another example of display of a route pattern in the first embodiment of the invention IV.

After the candidates of guide route data are displayed in this way, addition of a route point (including a destination) is executed according to operation by the user. In the example of display in FIG. 46, route patterns are simplified to be displayed. However, names, stay times, and arrival times at the respective route points and moving times among the respective points may be displayed for the route patterns. FIG. 47 is a diagram showing another example of display of route patterns in the first embodiment. FIG. 47(A) shows an example of display of a route pattern in which there are three route points, namely, "○○ park", "restaurant XX", and "△△ zoo". FIG. 47(B) shows an example of display of a route pattern in which a new route point "café X○" is added between "○○ park" and "restaurant XX" of the route pattern shown in FIG. 47(A). In FIG. 47, comments indicating characteristics of the respective route points are also displayed.

A navigation operation using the guide route data stored in the guide route storage unit E2 will be explained.

The GPS receiver E3 repeatedly outputs latitude and longitude data of a present location at predetermined timing. The display creation unit E5 creates, on the basis of the latitude and longitude data of the present location from the GPS receiver E3, display data corresponding to the location as occasion demands. For example, the display creation unit E5 reads out display map data within a predetermined latitude and longitude range around latitude and longitude indicated by the latitude and longitude data of the present location from the map database E4. The latitude and longitude indicated by the latitude and longitude data of the present location does not have to be in the center of the readout range.

The display creation unit E5 reads guide route data (route patterns and route information) passing through the latitude and longitude range from the guide route storage unit E2. The display creation unit E5 superimposed a present location mark on the center of a map of the display map data read and creates display data by superimposing the read guide route data on a map of routes and route points of the display map data. The display unit E6 displays an image or a text for guide on the basis of this display data.

When the GPS receiver E3, that is, the navigation device moves, latitude and longitude indicated by latitude and longitude data outputted from the GPS receiver E3 also change. When the latitude and longitude of the latitude and longitude data outputted from the GPS receiver E3 change, display map data read by the display creation unit E5 from the map database E4 and guide route data read from the guide rouge storage unit E2 also change. Therefore, according to the movement of the navigation device, a map and a guide route displayed on the display unit E6 change such that the center of a displayed image is a present location.

Route guide processing is executed in this way. As a result, the user can efficiently move from a start point to a destination via plural route points by holding this navigation device to move such that a present location overlaps a guide route.

As described above, according to the first embodiment, the route point selection unit E12 designates one or plural route points on the basis of operation by the user and the route pattern creation unit E13 searches for plural route patterns leading from a start point to a destination via the route points designated by the route point selection unit E12 in which orders of visiting the route points are different from one another. The eligible route judgment unit E17 judges whether the route points in the route patterns found by the route pattern creation unit E13 satisfy route point conditions set in advance. Immediately after executing correction of a route pattern in which route points are judged as satisfying the route point conditions, the route pattern edit unit E18 causes the eligible route judgment unit E17 to judge whether route points in the route pattern after correction satisfy the route point conditions. Consequently, even if candidates of a guide route is created once, the user can correct the guide route looking at the candidates of the guide route, it is possible to find a guide route on which the user reaches a destination via one or plural route points desired by the user while visiting the route points desired by the user at appropriate timing. In other words, a guide route more complying with an intention of the user is provided. Since only the corrected route pattern is subjected to judgment on eligibility, only short processing time is required compared with the case in which a route pattern is created again on the basis of an order of all the route points after the correction.

According to the first embodiment, in executing addition of a route point, the route pattern edit unit E18 inserts a new route point in each of plural insertion places, in which route points can be inserted, in a route pattern in which route points are judged as satisfying the route point conditions by the eligible route judgment unit E17 to create plural route patterns and causes the eligible route judgment unit E17 to judge, for each of the plural route patterns created, whether the route points satisfy the route point conditions. Consequently, even when the user wants to add another route point after candidates of a guide route are created once, it is possible to obtain a guide route on which the user reaches a destination via one or plural route points desired by the user while visiting route points desired by the user including the route point at appropriate timing.

According to the first embodiment, the route point conditions are conditions that the user arrives at route points during business hours of facilities in the route points and that the user stays at the route points for predetermined stay times. Thus, it is possible to obtain a guide route on which the user visits route points desired by the user at appropriate timing.

According to the first embodiment, after correction of a route pattern displayed by the display unit E6, the route pattern diet unit E18 causes the eligible route judgment unit E17 to judge whether route points in the route pattern after the correction satisfy the route point conditions and, only when the route points in the route pattern after the correction satisfy the route point conditions, causes the display unit E6 to display the route pattern after the correction.

Consequently, even if a route pattern is corrected, the corrected route pattern is not displayed when the route pattern does not satisfy the route point conditions. Therefore, in list display of route patterns, only a route pattern on which the user reaches a destination via one or plural route points desired by the user while visiting route points desired by the user at appropriate timing is always displayed. It is possible to prevent the user from selecting an inappropriate route pattern by mistake.

Since only a corrected route pattern is subjected to judgment on eligibility after correction of route points, data of other route patterns are kept stored and displayed. It is possible to also correct the other route patterns after that. Therefore, candidates of a guide route matching preference of the user are obtained simply and in various ways.

Second Embodiment

A navigation device according to a second embodiment of the invention IV has, in addition to the functions of the navigation device according to the first embodiment, a function of creating, in creating route patterns from plural route points, route points by fixing an order of visiting at least two route points designated by a user.

Figure 48:
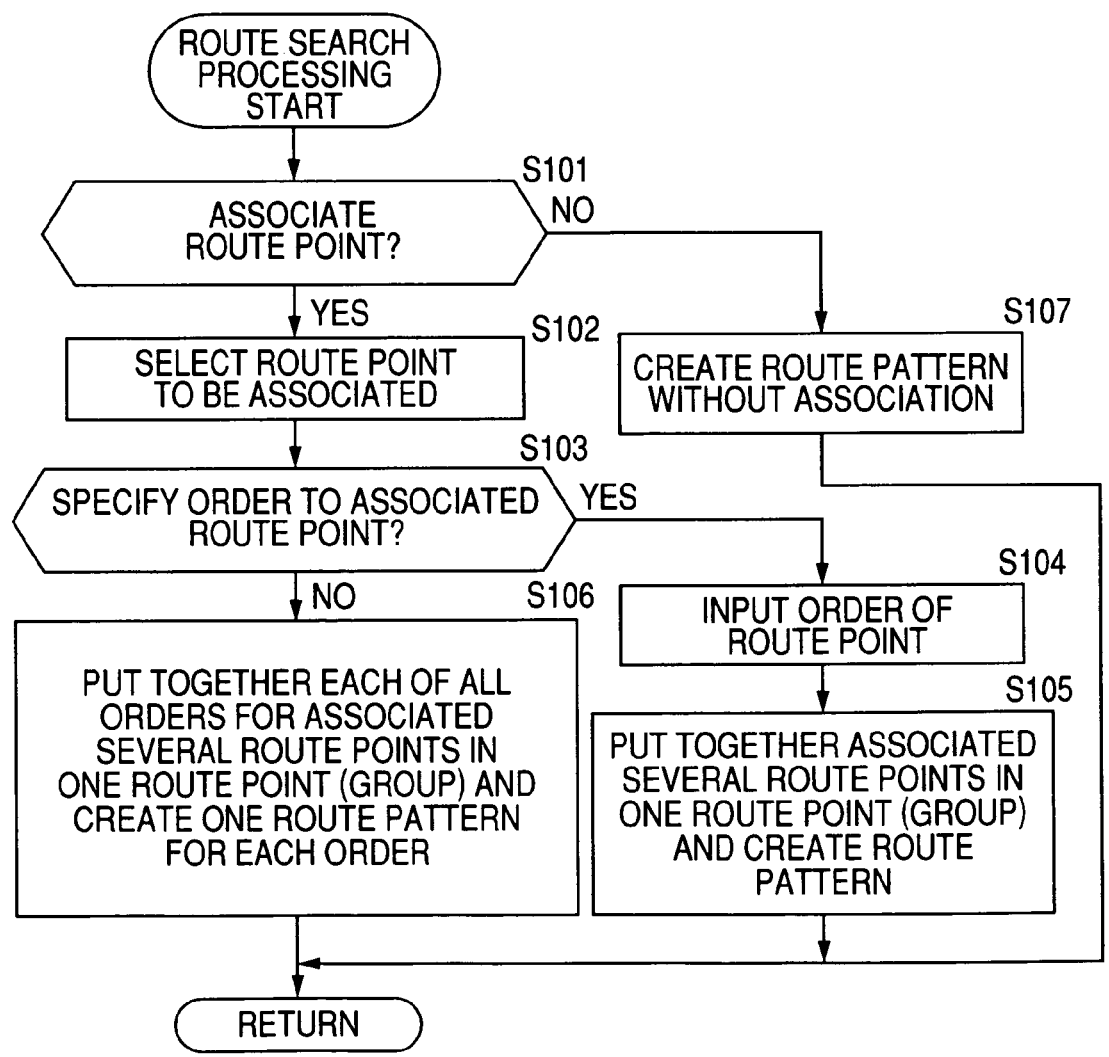
FIG. 48 is a flowchart for explaining an operation of a route pattern creation unit of a guide route creation unit in a second embodiment of the invention IV.

A basis constitution of the navigation device according to the second embodiment of the invention IV is the same as that in the first embodiment. Thus, an explanation of the basic constitution is omitted. However, the route pattern creation unit E13 of the guide route creation unit E1 operates as described below. FIG. 48 is a flowchart for explaining an operation of the route pattern creation unit E13 of the guide route creation unit E1 in the second embodiment.

In selecting route points, the route point selection unit E12 causes the display unit E6 to display, via the display creation unit E5, an image or a text for causing the user to select whether an order of visiting the route points should be designated (step S101). When operation for designating an order of visiting the route points is detected by the operation unit E7, the route point selection unit E12 causes the display unit E6 to display, via the display creation unit E5, an image or a text for causing the user to designate plural route points that the user desires to continuously visit among all the route points selected (including a destination) (step S102).

When the operation for selecting route points by the user is detected by the operation unit E7, the route point selection unit E12 causes the display unit E6 to display, via the display creation unit E5, an image or a text for causing the user to select whether a visiting order should be designated for the selected route points to be continuously visited (including the destination) (step S103).

When the operation for designating a visiting order for the route points to be continuously visited is detected by the operation unit E7, the route point selection unit E12 causes the display unit E6 to display, via the display creation unit E5, an image or a text for facilitating input of the visiting order of the route points to be continuously visited (step S104).

When the visiting order is inputted for the route points to be continuously visited, the route point selection unit E12 puts together the route points to be continuously visited, which are arranged in the visiting order, in one route point group and treats the route point group in the same manner as another route point to create a route pattern (step S105). For example, when route points A, B, C, and D are selected, the route point A is set as a destination, and the route point B and the route point C are designated to be continuously visited in an order of the route point B and the route point C, a route point group (B→C) is treated in the same manner as one route point. A route pattern D→(B→C)→A and a route pattern (B→C)→D→A are created and route patterns D→C→B→A, C→B→D→A, C→D→B→A, and B→D→C→A are not created.

On the other hand, when the operation for not designating a visiting order for the route points to be continuously visited is detected by the operation unit E7 or when the operation for designating a visiting order for the route points to be continuously visited is not designated by the operation unit E7 with a predetermined time in step S103, the route point selection unit E12 creates all permutations for the selected route points to be continuously visited, puts the respective permutations of the route points to be continuously visited in one route point group and treats the route point group as another route point to create a route pattern (step S106). For example, when the route points A, B, C, and D are selected, the route point A is set as a destination, and the route point B and the route point C are designated to be continuously designated, a route point group (B→C), in which a visiting order is an order of the route point B and the route point C, is treated in the same manner as one route point. A route point group (C→B), in which a visiting order is an order of the route point C and the route point B, is treated in the same manner as another route point. Therefore, a route pattern D→(B→C)→A, a route pattern (B→C)→D→A, a route pattern D→(C→B)→A, and a route pattern (C→B)→D→A are created and route patterns C→D→B→A and B→D →C→A are not created.

When the operation for not designating a visiting order of route points is detected by the operation unit E7 and when the operation for designating a visiting order of route points is not detected by the operation unit E7 in step S101, the route point selection unit E12 creates route patterns without constraint on an order of the route points as in the case of the first embodiment (step S107). For example, when the route points A, B, C, and D are selected, the route point A is set as a destination, and route points to be continuously visited are not designated, a route pattern B→C→D→A, a route pattern B→D→C→A, a route pattern C→B→D→A, a route pattern C→D→B→A, a route pattern D→B→C→A, and a route pattern D→C→B→A are created.

In this way, in the second embodiment, it is possible to set constraint on a visiting order between route points and only route points satisfying the constraint are created. When the route pattern edit unit E18 selects an additional route point, it is possible to set constraint on a visiting order between the additional route point and another route point in the same manner. Only route patterns satisfying the constraint are created in step S28.

Other operations of the navigation device according to the second embodiment only have to be the same as those in the first embodiment. Therefore, explanations of the operations are omitted.

Third Embodiment

A navigation device according to a third embodiment of the invention IV executes deletion of a route point for a route pattern usable as guide route data.

Figure 49:
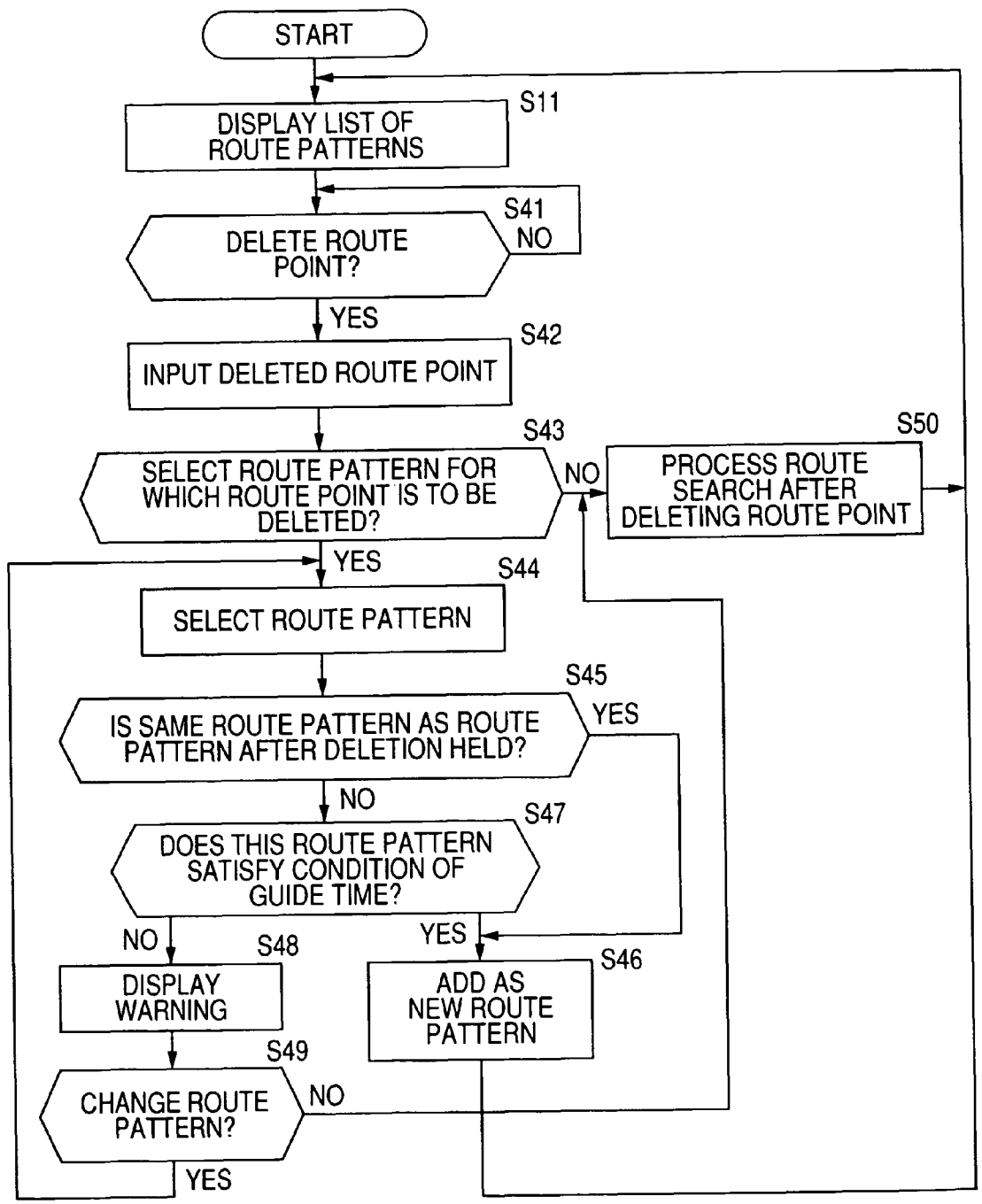
FIG. 49 is a flowchart for explaining processing at the time when a route point is deleted from a route pattern usable as guide route data in a third embodiment of the invention IV.
Figure 50:
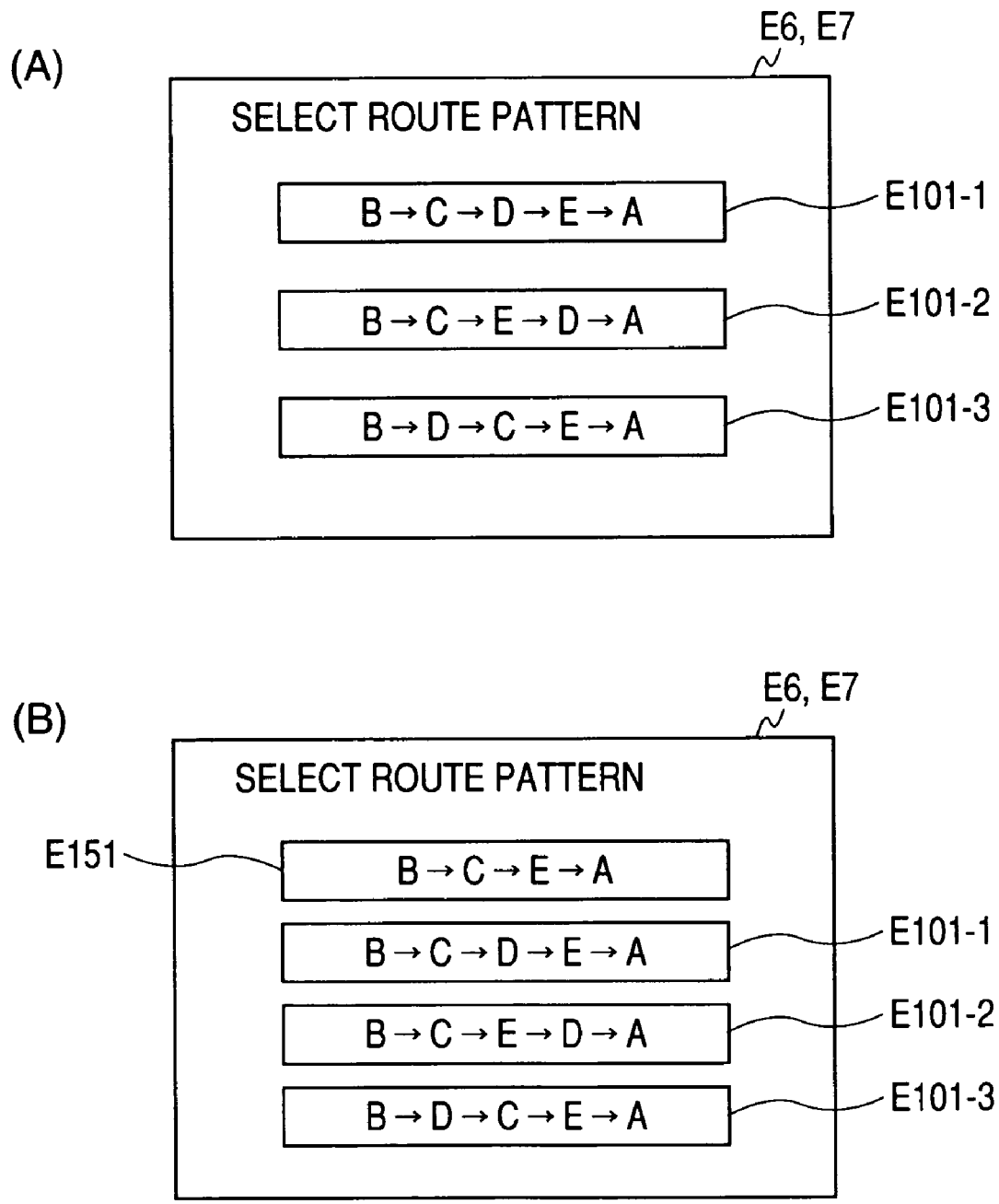
FIG. 50 is a diagram showing an example of display by a display unit at the time when a route point is deleted from a route pattern usable as guide route data in the third embodiment of the invention IV.

A basic constitution of the navigation device according to a third embodiment of the invention IV is the same as that in the first or the second embodiment. Thus, an explanation of the constitution is omitted. However, the route pattern edit unit E18 of the guide route creation unit E1 operates as described below. FIG. 49 is a flowchart for explaining processing in deleting a route point from a route pattern usable as guide route data in the third embodiment. FIG. 50 is a diagram showing an example of display by the display unit E6 in deleting a route point from a route pattern usable as guide route data in the third embodiment.

As in the first embodiment, after one or plural candidates of guide route data are created and stored in the guide route storage unit E2, the display creation unit E5 causes the display unit E6 to display one or plural route patterns usable as guide route data (step S11).

In a state in which one or plural route patterns usable as guide route data are displayed on the display unit E6 in this way, it is watched whether user operation for selection of one route pattern actually used for route guide, user operation for deletion of a route point, and the like are applied to the operation unit E7 (step S41).

When the route pattern edit unit E18 finds that the user operation for deletion of a route point is applied to the operation unit E7, the route pattern edit unit E18 selects, on the basis of operation by the user, one route point to be deleted out of route points included in route patterns previously selected and displayed as a list (step S42).

Subsequently, the route pattern edit unit E18 causes the display unit E6 to display, via the display creation unit E5, an image or a text for causing the user to select a mode for selecting a route pattern from which a route point is deleted or a mode for not selecting a route pattern from which a route point is deleted (step S43).

When the route pattern edit unit E18 finds that the operation for selecting a mode for selecting a route pattern from which a route point is deleted is applied to the operation unit E7, the route pattern edit unit E18 causes the display unit E6 to display, via the display creation unit E5, an image or a text for causing the user to select a route pattern from which a route point is deleted from a list of route patterns usable as guide route data (step S44). FIG. 50(A) shows an example of a selection screen in step S44. In FIG. 50(A), a text for facilitating operation "Please select a route pattern." and three route patterns E101-1 to E101-3 are displayed on the display unit E6. In FIG. 50(A), the touch panel serving as the operation unit E7 is mounted on the display screen of the display unit E6 and the user performs selection operation for a route pattern by touching the touch panel with a finger or the like.

Thereafter, when the route pattern edit unit E18 finds that the operation for selecting a route pattern from which a route point is deleted is applied to the operation unit E7, the route pattern edit unit E18 specifies the route pattern as a route pattern to be subjected to processing and deletes a route point, which is selected as the route point to be deleted, from plural route points in the route pattern selected to create a new route pattern.

At this moment, it is unclear whether this new route pattern is a route pattern usable as guide route data. This is because it is possible that, although the original route pattern is a route pattern usable as guide route data, a route point not satisfying the route point conditions is created as a result of deleting a route point. Therefore, it is judged whether the new route pattern is a route pattern usable as guide route pattern.

First, the route pattern edit unit E18 searches for a route pattern usable as guide route data stored in the guide route storing unit E2 and judges whether a route pattern identical with this new route pattern is stored in the guide route storage unit E2 (step S45).

When the route pattern edit unit E18 judges that a route pattern identical with the new route pattern is stored in the guide route storage unit E2, the route pattern edit unit E18 sets the new route pattern as a route pattern usable as guide route data and adds the route pattern to list display of route patterns on the basis of the guide route data of the route pattern identical with the new route pattern stored in the guide route storage unit E2 (step S46). FIG. 50(B) shows an example of list display after the processing in step S46. In FIG. 50(B), a new route pattern E151 created by deleting a route point D from the route pattern E100-1 is added to the list display shown in FIG. 50(A). As shown in FIG. 50(B), on the display unit E6, the route pattern E151 created anew is displayed at the top.

On the other hand, when it is judged in step S45 that a route pattern identical with this new route pattern is not stored in the guide route storage unit E2, the route pattern edit unit E18 supplies the new route pattern to the route pattern creation unit E13. Concerning the new route pattern, first, the route pattern edit unit E18 causes the route pattern creation unit E13 to search for a route leading from a start point to a destination passing through route points according to an order of the route points. In that case, the route pattern edit unit E18 also causes the route pattern creation unit E13 to calculate time required for movement among the respective points, that is, the start point, the route points, and the destination. The route pattern creation unit E13 supplies a result of route search for the new route pattern (a guide schedule, etc.) to the route pattern edit unit E18.

The route pattern edit unit E18 supplies data of the new route pattern to the eligible route judgment unit 17. The eligible route judgment unit E17 judges whether all the route points in the new route pattern satisfy the route point conditions (step S47). The eligible route judgment unit E17 supplies a result of the judgment to the route pattern edit unit E18.

When the eligible route judgment unit E17 judges that all the route points in the new route pattern satisfy the route point conditions, the eligible route judgment unit E17 causes the guide route storage unit E2 to store the new route pattern as a route pattern usable as guide route data and as a candidate of the guide route data together with route information. When the eligible route judgment unit E17 judges that all the route points in the new route pattern satisfy the route point conditions, the route pattern edit unit E18 sets the new route pattern as a route pattern usable as guide route data and adds the route pattern to the list display of route patterns on the basis of the guide route data of the new route pattern stored in the guide route storage unit E2 (step S46).

On the other hand, when it is judged in step S47 by the eligible route judgment unit E17 that any one of the route points in the new route pattern does not satisfy the route point conditions, the route pattern edit unit E18 causes the display unit E6 to display, via the display creation unit E5, a warning indication indicating that the new route pattern cannot be used as guide route data (step S48). Moreover, the route pattern edit unit E18 causes the display unit E6 to display, via the display creation unit E5, an image or a text for causing the user to select whether the route pattern from which a route point is deleted should be changed (step S49). When the route pattern edit unit E18 finds that operation for selecting a change of the route pattern from which a route point is deleted is applied to the operation unit E7, the route pattern edit unit E18 returns to step S44 and selects a route patter again on the basis of operation by the user. Processing after that is the same as the processing described above.

When the route pattern edit unit E18 finds in step S43 that the operation for selecting a mode for not selecting a route pattern from which a route point is deleted is applied to the operation unit E7 and when the route pattern edit unit E18 finds in step S49 that the operation for not changing the route pattern from which a route point is deleted is applied to the operation unit 7, the route pattern edit unit E18 deletes the route point to be deleted selected in step S42 from the route points (the registered points) selected by the route point selection unit E12. Thereafter, the route pattern edit unit E18 causes the route pattern creation unit E13, the destination selection unit E14, the route pattern alignment unit E16, and the eligible route judgment unit E17 to execute creation, alignment, and eligibility judgment of route patterns (step S50). A list of route patterns usable as guide route data obtained by the processing is displayed instead of the list displayed before the deletion of the route point (step S11).

Figure 51:
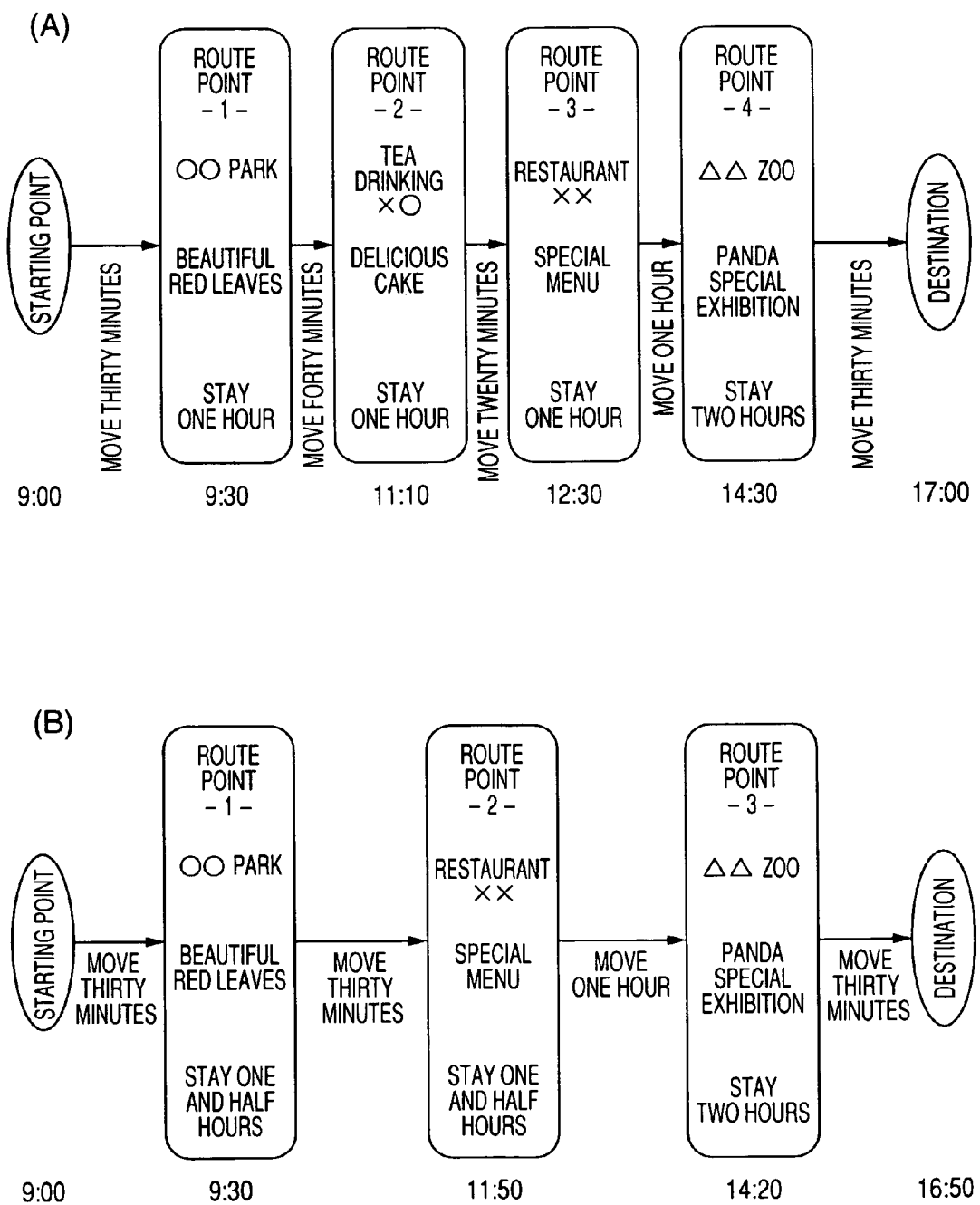
FIG. 51 is a diagram showing another example of display of a route pattern in the third embodiment of the invention IV.

After displaying candidates of guide route data in this way, deletion of a route point (including a destination) is executed according to operation by the user. In the example of display in FIG. 50, route patterns are simplified to be displayed. However, names, stay times, and arrival times at the respective route points and moving times among the respective points may be displayed for the route patterns. FIG. 51 is a diagram showing another example of display of route patterns in the third embodiment. FIG. 51(A) shows an example of display of a route pattern in which there are four route points, namely, "○○ park", "café X○", "restaurant XX", and "ΔΔ zoo". FIG. 51(B) shows an example of display of a route pattern in which the route point "café X○" is deleted from the route pattern shown in FIG. 51 (A). In FIG. 51, comments indicating characteristics of the respective route points are also displayed.

Other operations of the navigation device according to the third embodiment only have to be the same as those in the first or the second embodiment. Therefore, explanations of the operations are omitted.

Fourth Embodiment

A navigation device according to a fourth embodiment of the invention IV executes rearrangement of route points for a route pattern usable as guide route data.

Figure 52:
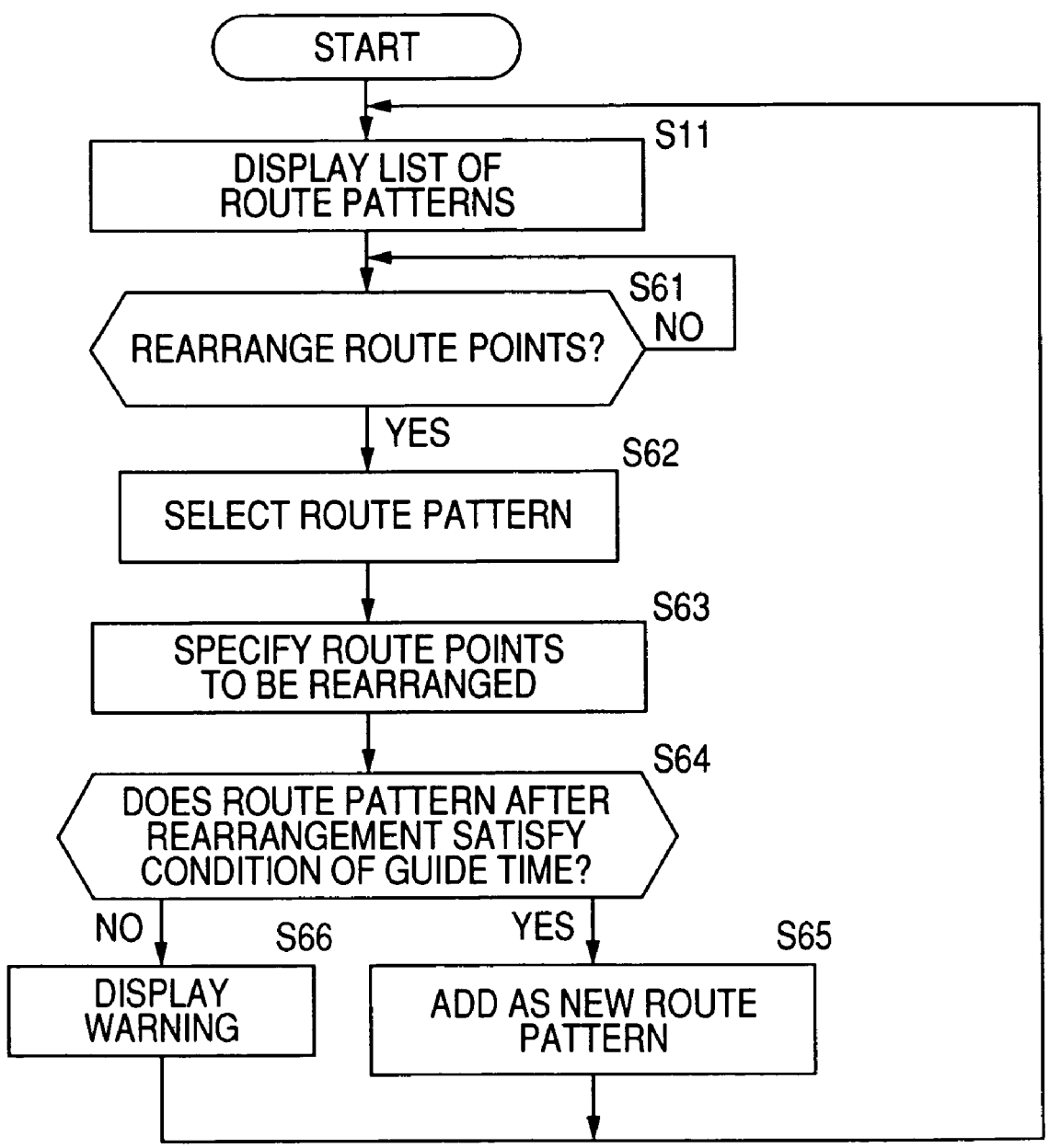
FIG. 52 is a flowchart for explaining processing at the time when route points are rearranged in a route pattern usable as guide route data in a fourth embodiment of the invention IV.
Figure 53:
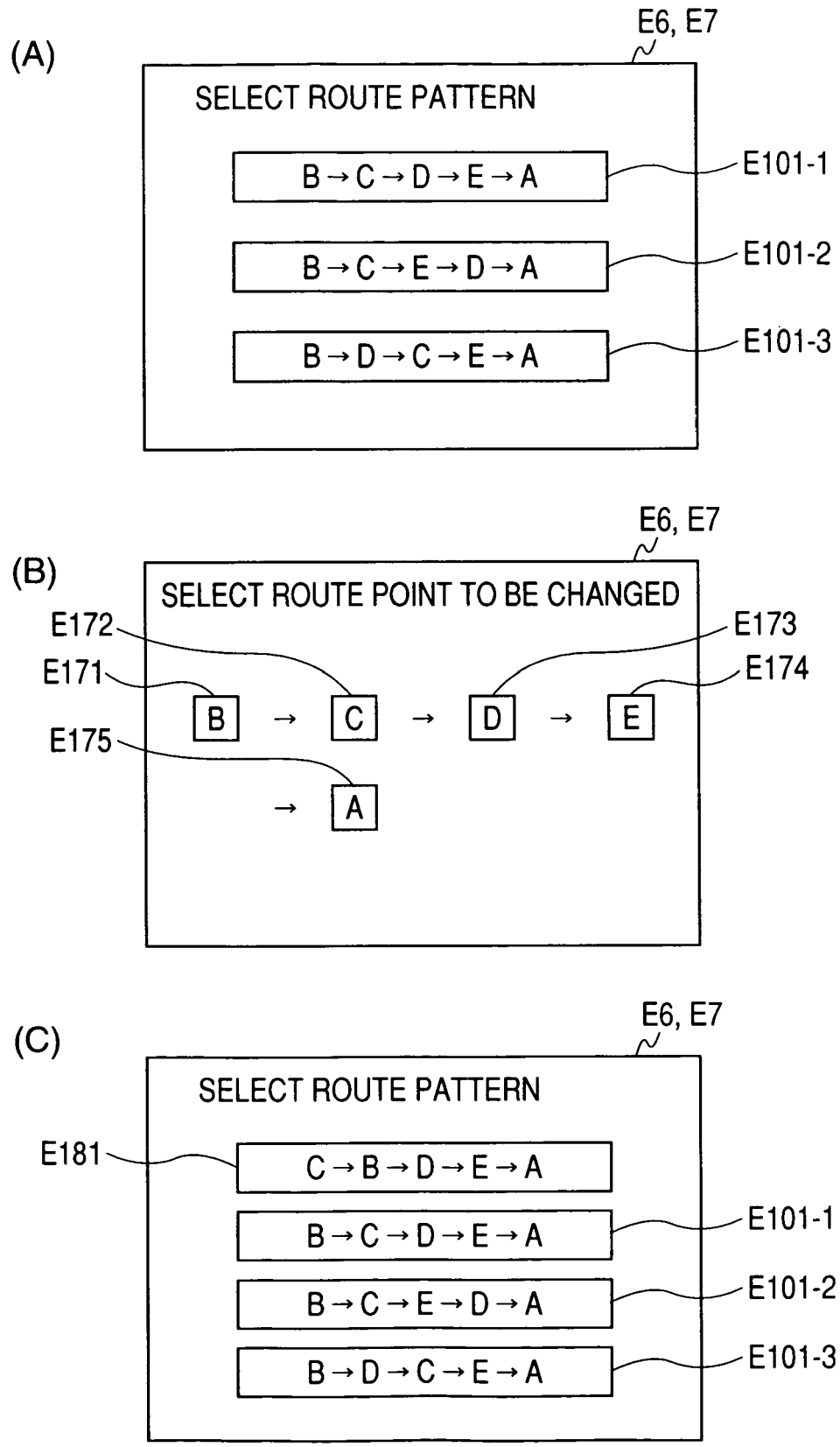
FIG. 53 is a diagram showing an example of display by a display unit at the time when route points are rearranged in a route pattern usable as guide route data in the fourth embodiment of the invention IV.

A basic constitution of the navigation device according to the fourth embodiment of the invention IV is the same as that of any one of the first to the third embodiments of the invention IV. Thus, an explanation of the basic constitution is omitted. However, the route pattern edit unit E18 of the guide route creation unit E1 operates as described below. FIG. 52 is a flowchart for explaining processing in rearranging route points in a route pattern usable as guide route data. FIG. 53 is a diagram showing an example of display by the display unit E6 in rearranging route points in a route pattern usable as guide route data in the fourth embodiment.

As in the first embodiment, after one or plural candidates of guide route data are created and stored in the guide route storage unit E2, the display creation unit E5 causes the display unit E6 to display one or plural route patterns usable as guide route data (step S11).

In a state in which one or plural route patterns usable as guide route data are displayed on the display unit E6 in this way, it is watched whether user operation for selection of one route pattern actually used for route guide, user operation for rearrangement of route points, and the like are applied to the operation unit E7 (step S61).

When the route pattern edit unit E18 finds that the user operation for rearranging route points is applied to the operation unit E7, the route pattern edit unit E18 causes the display unit E6 to display, via the display creation unit E5, an image or a text for causing the user to select a route pattern for which route points are rearranged from route patterns displayed as a list (step S62). FIG. 53A shows an example of a selection screen in step S62. In FIG. 53A, a text for facilitating operation "Please select a route pattern." and three route patterns E101-1 to E101-3 are displayed on the display unit E6. In FIG. 53A, the touch panel serving as the operation unit E7 is mounted on the display screen of the display unit E6 and the user performs selection operation for a route pattern by touching the touch panel with a finger or the like.

Thereafter, when the route pattern edit unit E18 finds that operation for selecting a route pattern for which route points are rearranged is applied to the operation unit E7, the route pattern edit unit E18 specifies the route pattern as a route pattern to be subjected to processing and causes the display unit E6 to display, via the display creation unit E5, an image or a text for causing the user to select route points to be rearranged from a list of plural route points included in the route pattern selected. Thereafter, when the route pattern edit unit E18 finds that operation for selecting plural route points to be rearranged is applied to the operation unit 7, the route pattern edit unit E18 specifies the route points in the route pattern and creates a new route pattern for which the route points are rearranged (step S63). For example, when two route points to be rearranged are selected, one new route pattern is created. When three route points to be rearranged are selected, five new route patterns are created. FIG. 53(B) shows an example of a selection screen in step S63. In FIG. 53(B), a text for facilitating operation "Please select route points to be changed." and images E171 to E175 indicating points "B", "C", "D", "E", and "A" for the route pattern E101-1 are displayed in the display unit E6. In FIG. 53(B), the touch panel serving as the operation unit E7 is mounted on the display screen of the display unit E6 and the user performs selection operation for route points by touching the touch panel with a finger or the like.

At this moment, it is unclear whether the new route pattern is a route pattern usable as guide route data. This is because it is possible that, although the original route pattern is a route pattern usable as guide route data, a route point not satisfying the route point conditions is created as a result of rearranging route points. Therefore, it is judged whether the new route pattern is a route pattern usable as guide route pattern.

The route pattern edit unit E18 supplies the new route pattern to the route pattern creation unit E13. Concerning the new route pattern, first, the route pattern edit unit E18 causes the route pattern creation unit E13 to search for a route leading from a start point to a destination passing through route points according to an order of the route points. In that case, the route pattern edit unit E18 also causes the route pattern creation unit E13 to calculate time required for movement among the respective points, that is, the start point, the route points, and the destination. The route pattern creation unit E13 supplies a result of route search for the new route pattern (a guide schedule, etc.) to the route pattern edit unit E18.

The route pattern edit unit E18 supplies data of the new route pattern to the eligible route judgment unit 17. The eligible route judgment unit E17 judges whether all the route points in the new route pattern satisfy the route point conditions (step S64). The eligible route judgment unit E17 supplies a result of the judgment to the route pattern edit unit E18.

When the eligible route judgment unit E17 judges that all the route points in the new route pattern satisfy the route point conditions, the eligible route judgment unit E17 causes the guide route storage unit E2 to store the new route pattern as a route pattern usable as guide route data and as a candidate of the guide route data together with route information. When the eligible route judgment unit E17 judges that all the route points in the new route pattern satisfy the route point conditions, the route pattern edit unit E18 sets the new route pattern as a route pattern usable as guide route data and adds the route pattern to the list display of route patterns on the basis of the guide route data of the new route pattern stored in the guide route storage unit E2 (step S65). FIG. 53(C) shows an example of the list display after the processing in step S65. In FIG. 53(C), a new route pattern E181 created by rearranging the route point B and the route point C in the route pattern E101-1 is added to the list display shown in FIG. 53(A). As shown in FIG. 53(C), on the display unit E6, the route pattern E181 created anew is displayed at the top.

On the other hand, when it is judged in step S64 by the eligible route judgment unit E17 that any one of the route points in the new route pattern does not satisfy the route point conditions, the route pattern edit unit E18 causes the display unit E6 to display, via the display creation unit E5, a warning indication indicating that the new route pattern cannot be used as guide route data (step S66). In this case, the processing returns to step S11 and the original list display is continued.

Other operations of the navigation device according to the fourth embodiment only have to be the same as those in any one of the first to the third embodiments. Therefore explanations of the operations are omitted.

Fifth Embodiment

A navigation device according to a fifth embodiment of the invention IV displays a route pattern usable as guide route data to be superimposed on a map, detects operation for a change of a route point or a route between points with a touch panel, and executes the change of a route point or a route between points on the basis of a result of the detection.

Figure 54:
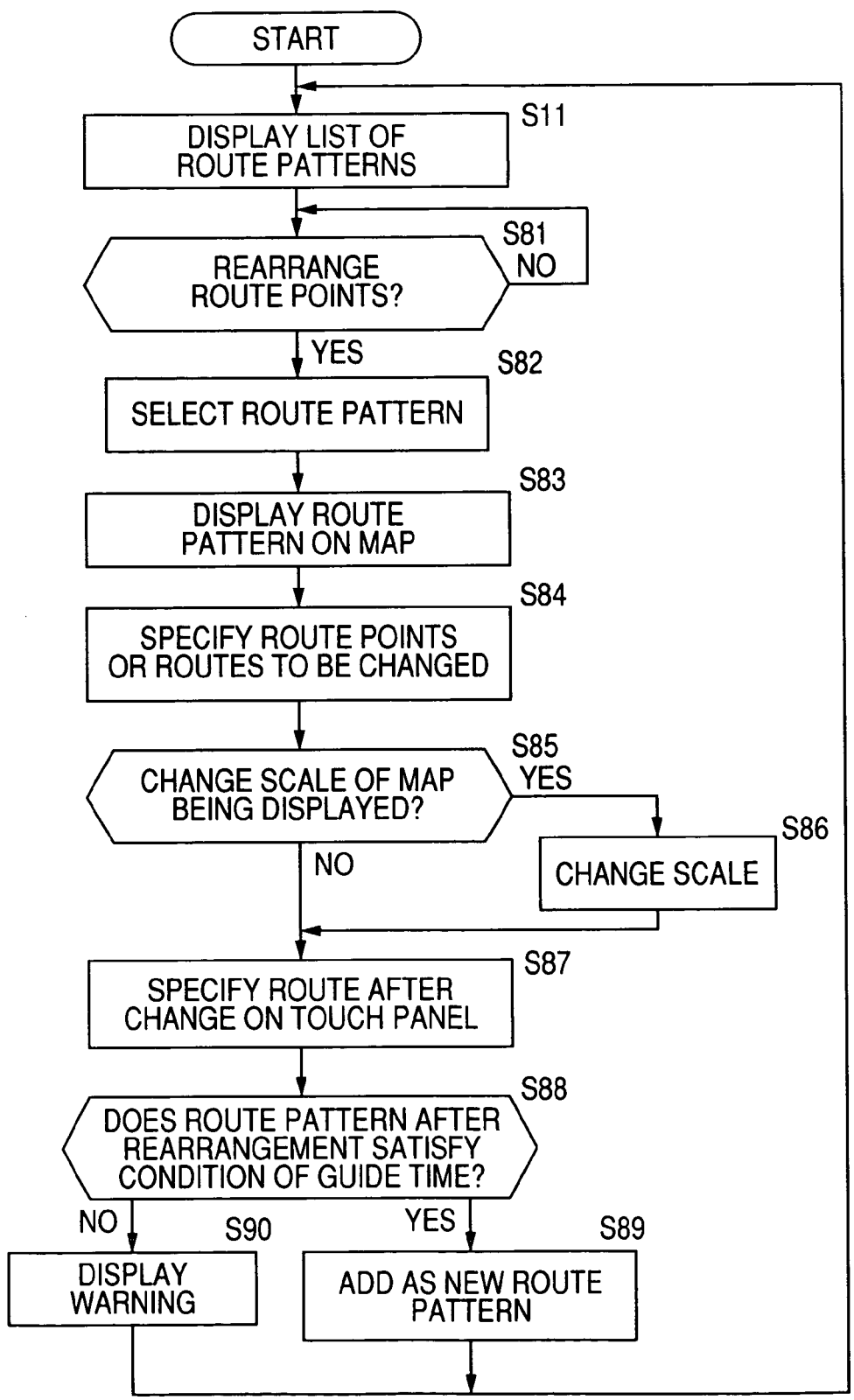
FIG. 54 is a flowchart for explaining processing at the time when a route point or a route between points is changed in a route pattern usable as guide route data in a fifth embodiment of the invention IV.

A basic constitution of the navigation device according to the fifth embodiment of the invention IV are the same as that in any one of the first to the fourth embodiments. Thus, an explanation of the basic constitution is omitted. However, in the navigation device according to the fifth embodiment, the touch panel serving as the operation unit E7 is mounted on the display screen of the display unit E6. Moreover, the route pattern edit unit E18 of the guide route creation unit E1 operates as described below. FIG. 54 is a flowchart for explaining processing in changing a route point or a route between points in a route pattern usable as guide route data.

As in the first embodiment, after one or plural candidates of guide route data are created and stored in the guide route storage unit E2, the display creation unit E5 causes the display unit E6 to display one or plural route patterns usable as guide route data (step S11).

In a state in which one or plural route patterns usable as guide route data are displayed on the display unit E6 in this way, it is watched whether user operation for selection of one route pattern actually used for route guide, user operation for a change of route points, and the like are applied to the operation unit E7 (step S81).

When the route pattern edit unit E18 finds that the user operation for a change of route points is applied to the operation unit E7, the route pattern edit unit E18 causes the display unit E6 to display, via the display creation unit E5, an image or a text for causing the user to select a route pattern for which route points are changed from route patterns displayed as a list (step S82).

Thereafter, when the route pattern edit unit E18 finds that the operation for selecting a route pattern for which route points are changed is applied to the operation unit E7, the route pattern edit unit E18 specifies the route pattern as a route pattern to be subjected to processing. First, the router pattern edit unit E18 reads out the display map data E21 indicating a map including a guide route formed by the route pattern from the map database E4. The route pattern edit unit E18 supplies the display map data E21 to the display creation unit E5 and causes the display unit E6 to display the map. Moreover, the route pattern edit unit E18 supplies data of route points and routes formed by the route pattern selected to the display creation unit E5 and causes the display unit E6 to display the route points and the routes to be superimposed on the map (step S83).

Moreover, the route patter edit unit E18 causes the display unit E6 to display, via the display creation unit E5, to display an image or a text for causing the user to select route points and/or a route to be changed in the map as well as the route points and the routes displayed (step S84). When the user looks at the display, the user presses display parts of a desired route point and/or route with a finger or the like on the display screen on which the touch panel is arranged. When the route pattern edit unit E18 finds that the operation for selecting a route point and/or a route between points is applied to the operation unit E7 (the touch panel), the route pattern edit unit E18 specifies the route point and/or the route between points in the selected route pattern.

Subsequently, the route pattern edit unit E18 causes the display unit E6 to display, via the display creation unit E5, an image or a text for causing the user to select whether a scale of the map displayed should be changed (step S85). When the route pattern edit unit E18 finds that operation for changing a scale is applied to the operation unit E7, the route pattern edit unit E18 reads out the display map data E21 of a scale designated by operation of the user and causes the display unit E6 to display a map of the scale and route points superimposed on the map (step S86). On the other hand, when operation for not changing a scale is detected by the operation unit E7 and when operation for changing a scale within a predetermined time is not detected by the operation unit E7, the route pattern edit unit E18 does not perform the processing for changing the scale of the displayed map.

The route pattern edit unit E18 causes the display unit E6 to display, via the display creation unit E5, an image or a text for causing the user to designate a route point and/or a route after the change on the displayed map (step S87). When the user looks at the display, the user presses the route point and/or the route after the change with a finger or the like on the display screen on which the touch panel is arranged. When a route point is designated, for example, an image indicating a position of a route point selected by the user is displayed on the map by the display unit E6 and, according to a position of the pressing by the user, the image is moved to a position on the map corresponding to the pressing position as occasion demands. A route point is designated on the basis of a position of the image at the time when operation for decision is performed. When a route is designated, first, route points are displayed and the user traces a route on the map from a certain route point to the next route point. The route pattern edit unit E18 tracks a pressing position detected by the touch panel and specifies a route and a visiting order of the route points according to a track of the pressing position and a moving direction.

In this way, a new route pattern and/or route between points is inputted. At this moment, it is unclear whether the new route pattern is a route pattern usable as guide route data. This is because it is possible that, although the original route pattern is a route pattern usable as guide route data, a route point not satisfying the route point conditions is created as a result of changing a route point or a route. Therefore, it is judged whether the new route pattern is a route pattern usable as guide route pattern.

The route pattern edit unit E18 supplies the new route pattern to the route pattern creation unit E13. Concerning the new route pattern, first, the route pattern edit unit E18 causes the route pattern creation unit E13 to search for a route leading from a start point to a destination passing through route points according to an order of the route points. In that case, the route pattern edit unit E18 also causes the route pattern creation unit E13 to calculate time required for movement among the respective points, that is, the start point, the route points, and the destination. When only a route is changed, this route search is omitted and only time required is calculated. The route pattern creation unit E13 supplies a result of route search for the new route pattern (a guide schedule, etc.) to the route pattern edit unit E18.

The route pattern edit unit E18 supplies data of the new route pattern to the eligible route judgment unit E17. The eligible route judgment unit E17 judges whether all the route points in the new route pattern satisfy the route point conditions (step S88). The eligible route judgment unit E17 supplies a result of the judgment to the route pattern edit unit E18.

When the eligible route judgment unit E17 judges that all the route points in the new route pattern satisfy the route point conditions, the eligible route judgment unit E17 causes the guide route storage unit E2 to store the new route pattern as a route pattern usable as guide route data and as a candidate of the guide route data together with route information. When the eligible route judgment unit E17 judges that all the route points in the new route pattern satisfy the route point conditions, the route pattern edit unit E18 sets the new route pattern as a route pattern usable as guide route data and adds the route pattern to the list display of route patterns on the basis of the guide route data of the new route pattern stored in the guide route storage unit E2 (step S89).

On the other hand, when it is judged by the eligible route judgment unit E17 that any one of the route points in the new route pattern does not satisfy the route point conditions in step S88, the route pattern edit unit E18 causes the display unit E6 to display, via the display creation unit E5, a warning indication indicating that the new route pattern cannot be used as guide route data (step S90). In this case, the processing returns to step S11 and the original list display is continued.

Other operations of the navigation device according to the fifth embodiment only have to be the same as those in any one of the first to the fourth embodiments. Therefore, explanations of the operations are omitted.

As described above, according to the fifth embodiment of the invention, the route pattern edit unit E18 changes a route between points and/or an order of route points on the basis of a track and/or a moving direction of a pressing position on the display screen detected by the touch panel of the operation unit E7. Consequently, the user can correct a route and/or an order of route points while checking the route and/or the order of route points on a map. Thus, a guide route more satisfactorily matching a demand of the user is obtained.

Sixth Embodiment

A navigation device according to a sixth embodiment of the invention IV executes a change of route points for a route pattern usable as guide route data. In the sixth embodiment, the processing for deleting a route point in the third embodiment and the processing for adding a route point in the first embodiment are applied. First, a route point to be deleted is selected and a route point to be added used instead of the route point to be deleted is selected. A new route pattern in which the added route pattern is used instead of the deleted route point is created by the route pattern edit unit E18. When all route points in the new route pattern satisfy the route point conditions, the new route pattern (and route information thereof) is added as one of candidates of guide route data.

Figure 55:
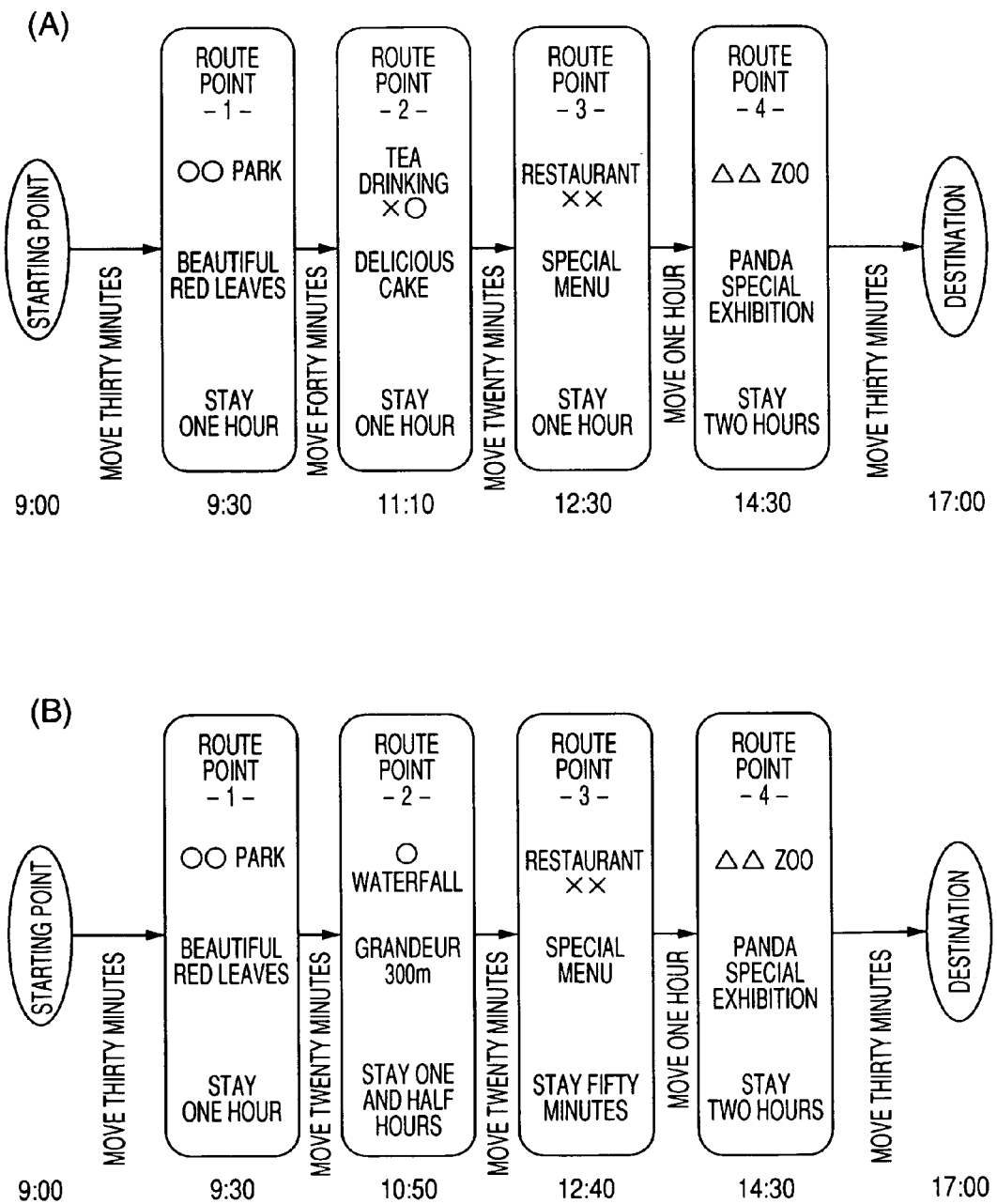
FIG. 55 is a diagram showing another example of display of a route pattern in a sixth embodiment of the invention IV.

FIG. 55 is a diagram showing another example of display of a route pattern in the sixth embodiment. FIG. 55(A) shows an example of display of a route pattern in which there are four route points "○○ park", "café X○", "restaurant XX", and "ΔΔ zoo". FIG. 55(B) shows an example of display of a route pattern in which the route point "café X○" in the route pattern shown in FIG. 55(A) is changed to a route point "○ falls". Moreover, in FIG. 55, comments indicating characteristics of the respective route points are also displayed.

Constitutions and operations of the navigation device according to the sixth embodiment other than those described above only have to be the same as those in any one of the first to the fifth embodiments. Therefore, explanations of the constitutions and the operations are omitted.

The respective embodiments described above are preferred example of the invention IV. However, the invention IV is not limited to these embodiments. Various modifications and alterations are possible as long as the modifications and alterations doe not depart from the sprit of the invention.

For example, each of the embodiments is applicable to the other embodiments. In other words, for example, it is possible to perform all of addition, deletion, change, and rearrangement of route points for candidates of guide route data using one guide route creation unit E1. In the embodiments, the route point selection unit E12 may refer to the proposed route point data E24 and register, only when a route point selected by the user is open, this route point in the route point list. When the selected route point is not open, the route point selection unit E12 causes the display unit E6 to display a warning indication.

In the embodiments, in a route pattern in which any one of route points is judged as not satisfying the route point conditions by the eligible route judgment unit E17, when an arrival time at the route point not satisfying the route point conditions is earlier than a start time of a guide time at the route point, the route pattern edit unit E18 inserts another route point before the route point to create a new route pattern and judge, concerning the new route pattern, whether all route points satisfy the route point conditions using the route pattern creation unit E13 and the eligible route judgment unit E17. As the route point to be inserted, for example, a point with the genre "café" or the like where a stay time is relatively short is selected. A route point where a stay time is shorter than a difference between the start time of the guide time and the arrival time may be selected. In the case in which a route point is automatically added in this way, when all route points in a new route pattern satisfy the route point conditions, the new route pattern is set as a candidate of guide route data.

In the embodiments, when an arrival time at a first route point is earlier than a start time of a guide time of a genre of the route point, the route pattern creation unit E13 may change a departure time from a start point to time delayed by a difference between the start time and the arrival time.

In the embodiments, when route points of a predetermined genre continue in respective patterns included in a route pattern list formed by the route pattern alignment unit E16, the eligible route judgment unit E17 may judge that the route pattern does not satisfy the route point conditions. For example, when route points of a genre corresponding to the food and drink genre continue in the route point condition table for genre E27 shown in FIG. 4, the eligible route judgment unit E17 may judge that the route pattern does not satisfy the route point conditions.

In the embodiments, after plural route patterns created by the route pattern creation unit E13 are arranged by the route pattern alignment unit E16 in accordance with the conditions in the route condition table E26, the eligible route judgment unit E17 judges eligibility of the respective route patterns in order. Instead of this, it is also possible that the route pattern alignment unit E16 is not provided and, in every judgment of a route pattern, the eligible route judgment unit E17 refers to the route condition table E26, searches for plural route patterns in accordance with the conditions in the route condition table E26, sequentially extracts one route pattern out of the plural route patterns, and judges eligibility for the route pattern extracted.

In the embodiments, the route condition table E26 and the route point condition table for genre E27 are provided in advance. However, the navigation device may cause the user to input search conditions for a guide route and route point conditions at respective route points at the time of route search and use the search conditions and the route point conditions inputted.

In the embodiments, the route point conditions are applied for each genre. However, it goes without saying that the route point conditions may be applied for each route point. The route point conditions for each genre and the route point conditions for each route point may be applied together.

In the first embodiment of the invention IV, in the case in which a new route point is inserted in a certain inserting place in a guide route in which route points are judged as satisfying the route point conditions, when it is judged that the guide route after correction is judged as not satisfying the route point conditions, a new route point may be automatically inserted in another inserting place in the guide route.

In the embodiments, it is also possible that, in rearranging route points, the route points are arranged to be displayed, when the user performs operation for dragging to move a certain route point to a route between other points, the route point is displayed according to a pressing position of the touch panel in response to the operation, and, when display of the route between the points and display of the route point are superimposed in display, a route pattern obtained by moving the route point is created as a new route pattern in the route between the points.

In the embodiments, it is also possible that, in displaying a warning indication and in other cases, an image or a text for an option of suspension of processing is simultaneously displayed on the display unit E6 and, when operation for suspension of the processing by the user is detected, the route pattern edit unit E18 ends correction processing for a route pattern and continues list display of an original route pattern.

In the embodiments of the invention IV, the guide route creation unit E1 is built in the navigation device. Instead of this, in a communication system adopting a client/server model, the navigation device may be realized as a client terminal including the display creation unit E5, the display unit E6, the operation unit E7, and the not-shown communication circuit and the guide route creation unit E1 and/or the map database E4 may be realized in a server. In that case, the navigation device mainly functions as a user interface, transmission and reception of necessary data are performed via a communication path formed by a communication system, and processing such as route search is performed in the guide route creation unit E1 in the server. Besides, the server and the client terminal may cooperate with each other to realize the guide route creation unit 1. It is also possible that a personal computer or the like is used as the client terminal, a reader for a predetermined storage medium such as a memory card is provided in the navigation device, a route pattern of a guide route obtained by the guide route creation unit E1 in the server is stored in the predetermined storage medium by the client terminal, and the storage medium is inserted in and read by the reader of the navigation device to use the guide route creation unit E1 on the server offline.

According to the invention IV, there is an operational effect that it is possible to obtain a guide route search device, a navigation device, and a guide route search method for finding a guide route on which a user reaches a destination via one or plural route points desired by the user while visiting route points desired by the user at appropriate timing.

INDUSTRIAL APPLICABILITY

It is possible to use the guide route search device, the navigation device, and the guide route search method according to the invention in, for example, a vehicle-mounted navigation device mounted on a vehicle such as an automobile, a navigation device for pedestrians, other navigation devices, and the like.

The invention claimed is:

1. A guide route search device, comprising:
   a designating unit configured to designate at least two or more destinations;
   a creating unit configured to create plural route patterns in which orders of visit to the plural destinations are different from one another, wherein the creation unit comprises a unit for adding a new route point to the route pattern such that, when a route point at which the user arrives at a time earlier than the guide time as a route point condition is present in a route pattern, the user arrives at the route point at the guide time by searching for a genre, a stay time of which coincides with an adjustment time for said time earlier in a route point condition table for genre including genre name data, guide time data and stay time data, and a route point that is on a guide route between a start point and a route point with too early arrival time is searched in a proposed route point data base, including genre data indicating a genre of the facility in the proposed route point, which matches the genre data of the genre found in the route point condition table for genre;
   judgment unit configured to judge whether the plural route patterns are route patterns that satisfy destination conditions in all the destinations; and
   a route pattern edition unit, for route patterns in which destinations are judged as satisfying the destination conditions by the judgment unit, any one of addition of destinations, deletion of destinations, change of destinations, and rearrangement of destinations as correction of the route patterns and causing the judgment unit to judge whether destinations in the route patterns after the correction satisfy the destination conditions,
   wherein the designating unit configured to select a proposed route point from a proposed route point database, including genre data indicating a genre of the facility in the proposed route point and business hour data of the facility in the proposed route point, wherein the creating unit configured to output business hour data as time frame comparison data corresponding to a genre of the route point and comparing this time frame comparison data with guide time data associated with the same genre of a route point condition table for genre, including genre name data and associated guide time data, and wherein, when a time frame not included in the business hour data of the route point is included in a time frame of the guide time data, a guide point condition update unit deletes the guide time by the excess time frame not included in the business hour data and updates the guide time data of the route point condition for genre table to be included in the business hour data of the route point.

2. The guide route search device according to claim 1, further comprising a selection unit configured to select a guide pattern that satisfies the destination conditions in all the destinations as a guide route.

3. The guide route search device according to claim 1, further comprising:
an adjustment unit configured to perform, for route patterns judged as not satisfying the destination conditions at least at one destination by the judgment unit, adjustment of a non-traveling time such that the route patterns satisfy the destination conditions in all the destinations; and
a selection unit configured to select a specific route pattern out of the route patterns judged as satisfying the destination conditions in all the destinations by the judgment unit and the route patterns updated by the adjustment unit.

4. The guide route search device according to claim 1, further comprising:
an update unit configured to update, for route patterns judged as not satisfying the destination conditions at least at one destination by the judgment unit, the route patterns such that the route patterns satisfy the destination conditions in all the destinations; and
a display unit configured to display at least two route patterns out of the route patterns judged as satisfying the destination conditions in all the destinations by the judgment unit and the route patterns updated by the updating means.

5. The guide route search device according to claim 2, further comprising:
a display unit configured to display the guide route selected by the selecting means on a map image together with an image indicating a location of the guide route search device itself before route guide;
a movement unit configured to move the image indicating a location of the guide route search device itself along the guide route;
a time calculation unit configured to calculate an arrival time at a location of the image moved by the moving means; and
an update unit adapted to change a color and/or brightness of the map image according to the arrival time calculated.

6. The guide route search device according to claim 5, wherein the judgment unit includes a destination condition update unit configured to update, when the destination for each genre is not in a business hour of the destination, updating the destination conditions for each genre such that the destination conditions for each genre are in a business hour of the route point.

7. The guide route search device according to claim 2, wherein that the selection unit judges whether route points of identical or similar genres continue in the route pattern and, when destinations of identical or similar genres do not continue, selects the route pattern as the guide route.

8. The guide route search device according to claim 1, wherein the route pattern edition unit has a sub-unit for inserting, in which a new destination is inserted in a certain insertion place in route patterns in which destinations are judged as satisfying the destination conditions by the judgment unit, when it is judged by the judgment unit that destinations in the route patterns after correction do not satisfy the destination conditions, the new destination in another insertion place on the guide route.

9. The guide route search device according to claim 1, characterized in that, the guide route search device has a sub-unit for inserting, in response to the addition of a destination by the route pattern edition unit, a new destination in each of plural insertion places, in which a destination can be inserted, on route patterns in which destinations are judged as satisfying the destination conditions by the judgment unit to create plural route patterns, by a creation unit contained in the hardware processor; and
causes the judgment unit to judge whether destinations satisfy the destination conditions for each of the plural route patterns created, by a judgment unit contained in the hardware processor.

10. A computer program product stored on a computer-readable medium for causing a guide route search method to operate, the guide route search method comprising the steps of:
designating at least two or more destinations;
creating plural route patterns in which orders of visiting the plural destinations are different from one another, wherein the step of creating plural route patterns comprises the step of adding a new route point to the route pattern such that, when a route point at which the user arrives at a time earlier than the guide time as a route point condition is present in a route pattern, the user arrives at the route point at the guide time by searching for a genre, a stay time of which coincides with an adjustment time for said time earlier in a route point condition table for genre including genre name data, guide time data and stay time data, and a route point that is on a guide route between a start point and a route point with too early arrival time is searched in a proposed route point data base, including genre data indicating a genre of the facility in the proposed route point, which matches the genre data of the genre found in the route point condition table for genre;
judging whether the plural route patterns are route patterns that satisfy destination conditions in all the destinations, and
editing a route pattern, for route patterns in which destinations are judged as satisfying the destination conditions in the judging step, any one of addition of destinations, deletion of destinations, change of destinations, and rearrangement of destinations as correction of the route patterns and causing the judging step to judge whether destinations in the route patterns after the correction satisfy the destination conditions,
wherein the step of designating at least two or more destinations comprises selecting a proposed route point from a proposed route point database, including genre data indicating a genre of the facility in the proposed route point and business hour data of the facility in the proposed route point, wherein the step of creating plural route patterns comprises outputting business hour data as time frame comparison data corresponding to a genre of the route point and comparing this time frame comparison data with guide time data associated with the same genre of a route point condition table for genre, including genre name data and associated guide time data, and wherein, when a time frame not included in the business hour data of the route point is included in a time frame of the guide time data, a guide point condition update unit deletes the guide time by the excess time frame not included in the business hour data and updates the guide time data of the route point condition for genre table to be included in the business hour data of the route point.

* * * * *